US007191346B2

(12) United States Patent
Abe et al.

(10) Patent No.: US 7,191,346 B2
(45) Date of Patent: Mar. 13, 2007

(54) DATA TRANSFER SYSTEM, DATA TRANSFER APPARATUS, DATA RECORDING APPARATUS, EDIT CONTROLLING METHOD AND DATA PROCESSING METHOD

(75) Inventors: Miki Abe, Kanagawa (JP); Takafumi Hosoi, Tokyo (JP); Hiromi Matsuda, Kanagawa (JP); Masao Tanaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 921 days.

(21) Appl. No.: 10/167,923

(22) Filed: Jun. 12, 2002

(65) Prior Publication Data

US 2003/0031319 A1 Feb. 13, 2003

(30) Foreign Application Priority Data

Jun. 13, 2001 (JP) ............................ 2001-178511

(51) Int. Cl.
*H04L 9/00* (2006.01)
*G06Q 99/00* (2006.01)

(52) U.S. Cl. .......................... 713/194; 726/30; 705/50

(58) Field of Classification Search .................... None
See application file for complete search history.

(56) References Cited

U.S. PATENT DOCUMENTS

| | | | | |
|---|---|---|---|---|
| 5,835,601 | A * | 11/1998 | Shimbo et al. | 713/165 |
| 6,539,468 | B1 * | 3/2003 | Inoue et al. | 712/36 |
| 6,748,539 | B1 * | 6/2004 | Lotspiech | 726/20 |
| 6,832,319 | B1 * | 12/2004 | Bell et al. | 713/193 |
| 6,865,552 | B1 * | 3/2005 | Inoue et al. | 705/57 |
| 6,987,854 | B2 * | 1/2006 | Maillard | 380/210 |

* cited by examiner

*Primary Examiner*—Christopher Revak
(74) *Attorney, Agent, or Firm*—Finnegan, Henderson, Farabow, Garrett & Dunner, L.L.P.

(57) ABSTRACT

Disclosed is a method for causing either encrypted first content data or unencrypted second content data, to be selectively recorded to a storage medium in a data recording apparatus. When the data recording apparatus is to return the encrypted first content data to the data transfer apparatus, the return is inhibited if the data are judged to have been edited. Upon return of the encrypted first content data, a content ID held by the data recording apparatus regarding the first content data is matched against a content ID held by the data transfer apparatus regarding the received data. Where the encrypted first content data are known to have been edited, the content ID matching process is omitted.

23 Claims, 36 Drawing Sheets

FIG. 2A

EXAMPLE 1 OF EKB (ENABLING KEY BLOCK):
NODE KEYS OF VERSION T ARE
SENT TO DEVICES DV0, DV1 AND DV2.

| VERSION t | |
|---|---|
| INDEX | ENCRYPTED KEY |
| 0 | E (K(t)0, K(t)R) |
| 00 | E (K(t)00, K(t)0) |
| 000 | E (K000, K(t)00) |
| 001 | E (K(t)001, K(t)00) |
| 0010 | E (K0010, K(t)001) |

FIG. 2B

EXAMPLE 2 OF EKB (ENABLING KEY BLOCK):
NODE KEYS OF VERSION T ARE
SENT TO DEVICES DV0, DV1 AND DV2.

| VERSION t | |
|---|---|
| INDEX | ENCRYPTED KEY |
| 000 | E (K000, K(t)00) |
| 001 | E (K(t)001, K(t)00) |
| 0010 | E (K0010, K(t)001) |

FIG. 3

TYPICAL STRUCTURE OF EKB (ENABLING KEY BLOCK)

| OFFSET ADDRESS | DESCRIPTION | SIZE (IN BYTES) |
|---|---|---|
| 0 | NO. OF NODE KEYS | 4 |
| 4 | DEPTH OF NODE KEYS | 4 |
| 8 | EBK VERSION | 4 |
| 12 | RESERVED | 4 |
| 16 | EACH ENCRYPTED NODE KEY | 16×M |
| 16+16×M | RESERVED | 16 |
| 32+16×M | ENCRYPTED EKB VERSION | 8 |
| 40+16×M | DIGITAL SIGNATURE | 5 |

FIG. 10

| | | 16 bit | | 16 bit | | |
|---|---|---|---|---|---|---|
| | | MSB LSB | MSB LSB | MSB LSB | MSB LSB | |
| HEADER | | 00000000 | 11111111 | 11111111 | 11111111 | 0 |
| | | 11111111 | 11111111 | 11111111 | 11111111 | 1 |
| | | 11111111 | 11111111 | 11111111 | 00000000 | 2 |
| | | Cluster H | Cluster L | Sector(00h) | MODE(02h) | 3 |
| | | 00000000 | 00000000 | 00000000 | 00000000 | 4 |
| | | 00000000 | 00000000 | 00000000 | 00000000 | 5 |
| | | 00000000 | 00000000 | 00000000 | 00000000 | 6 |
| | | Maker code | Model code | First TNO | Last TNO | 7 |
| | | 00000000 | 00000000 | 00000000 | Used Sectors | 8 |
| | | 00000000 | 00000000 | 00000000 | 00000000 | 9 |
| | | 00000000 | 00000000 | 00000000 | Disc Serial No. | 10 |
| POINTER AREA | | Disc | ID | P-DFA | P-EMPTY | 11 |
| | | P-FRA | P-TNO1 | P-TNO2 | P-TNO3 | 12 |
| | | P-TNO4 | P-TNO5 | P-TNO6 | P-TNO7 | 13 |
| | | | | | | |
| | | P-TNO248 | P-TNO249 | P-TNO250 | P-TNO251 | 74 |
| | | P-TNO252 | P-TNO253 | P-TNO254 | P-TNO255 | 75 |
| | | 00000000 | 00000000 | 00000000 | 00000000 | 76 |
| | | 00000000 | 00000000 | 00000000 | 00000000 | 77 |
| TABLE AREA (255-PART TABLE) | (01h) | START ADDRESS | | | TRACK MODE | 78 |
| | | END ADDRESS | | | LINK INFORMATION | 79 |
| | (02h) | START ADDRESS | | | TRACK MODE | 80 |
| | | END ADDRESS | | | LINK INFORMATION | 81 |
| | (03h) | START ADDRESS | | | TRACK MODE | 82 |
| | | END ADDRESS | | | LINK INFORMATION | 83 |
| | | | | | | |
| | (FCh) | START ADDRESS | | | TRACK MODE | 580 |
| | | END ADDRESS | | | LINK INFORMATION | 581 |
| | (FDh) | START ADDRESS | | | TRACK MODE | 582 |
| | | END ADDRESS | | | LINK INFORMATION | 583 |
| | (FEh) | START ADDRESS | | | TRACK MODE | 584 |
| | | END ADDRESS | | | LINK INFORMATION | 585 |
| | (FFh) | START ADDRESS | | | TRACK MODE | 586 |
| | | END ADDRESS | | | LINK INFORMATION | 587 |

U-TOC SECTOR 0

TYPICAL DNK(DEVICE NODE KEY)OF SET0

| |
|---|
| LEAF ID = SET0 |
| E(K000,KR)<br>AS ROOT KEY KR ENCRYPTED USING LEAF KEY |
| E(K000,K0)<br>AS ROOT KEY K0 ENCRYPTED USING LEAF KEY |
| E(K000,K00)<br>AS ROOT KEY K00 ENCRYPTED USING LEAF KEY |
| LEAF KEY = K000 |

FIG. 15

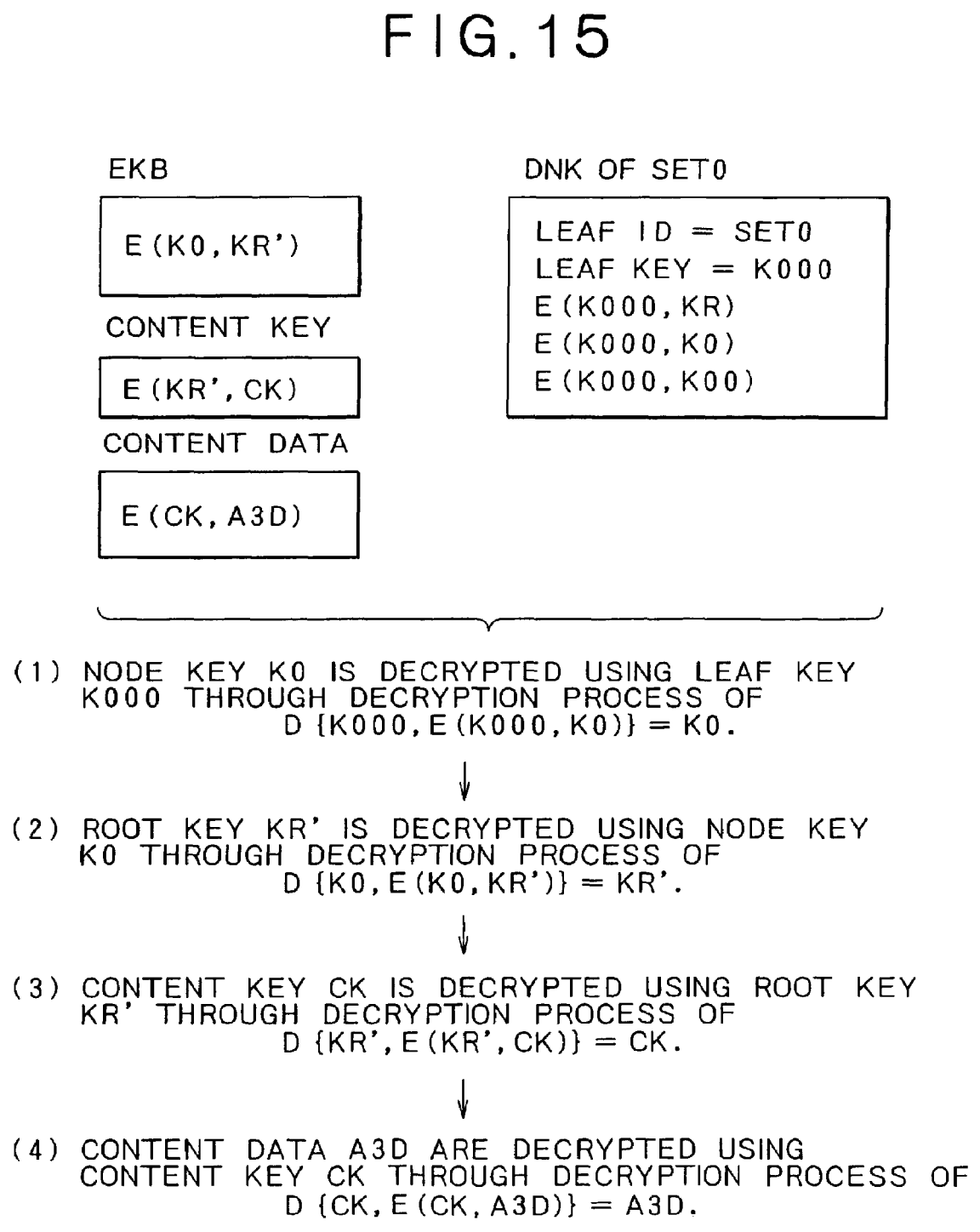

EKB

E (K0, KR')

CONTENT KEY

E (KR', CK)

CONTENT DATA

E (CK, A3D)

DNK OF SET0

LEAF ID = SET0
LEAF KEY = K000
E (K000, KR)
E (K000, K0)
E (K000, K00)

(1) NODE KEY K0 IS DECRYPTED USING LEAF KEY K000 THROUGH DECRYPTION PROCESS OF D {K000, E (K000, K0)} = K0.

↓

(2) ROOT KEY KR' IS DECRYPTED USING NODE KEY K0 THROUGH DECRYPTION PROCESS OF D {K0, E (K0, KR')} = KR'.

↓

(3) CONTENT KEY CK IS DECRYPTED USING ROOT KEY KR' THROUGH DECRYPTION PROCESS OF D {KR', E (KR', CK)} = CK.

↓

(4) CONTENT DATA A3D ARE DECRYPTED USING CONTENT KEY CK THROUGH DECRYPTION PROCESS OF D {CK, E (CK, A3D)} = A3D.

FIG.16

CHECK OUT CONTROL COMMAND

| OFFSET (IN BYTES) | MSB 7 | 6 | 5 | 4 | 3 | 2 | 1 | LSB 0 |
|---|---|---|---|---|---|---|---|---|
| 00h | CTS | | | | C TYPE:CONTROL | | | |
| ⋮ | ⋮ | | | | | | | |
| 0Ah | OP CODE:CHECK OUT | | | | | | | |
| 0Bh | RESULT | | | | | | | |
| 0Ch | RESERVED | | | | | | | |
| 0Dh | LIST ID | | | | | | | |
| 0Eh | | | | | | | | |
| 0Fh | OBJECT POSITION NUMBER | | | | | | | |
| 10h | | | | | | | | |
| 11h ⋮ 18h | DES CBC (ks, 0) | | | | | | | |

FIG. 17

CHECK OUT RESPONSE COMMAND

| OFFSET (IN BYTES) | MSB 7 | 6 | 5 | 4 | 3 | 2 | 1 | LSB 0 |
|---|---|---|---|---|---|---|---|---|
| 00h | CTS | | | | RESPONSE : ACCEPTED | | | |
| ⋮ | ⋮ | | | | | | | |
| 0Ah | OP CODE : CHECK OUT | | | | | | | |
| 0Bh | RESULT | | | | | | | |
| 0Ch | RESERVED | | | | | | | |
| 0Dh | LIST ID | | | | | | | |
| 0Eh | | | | | | | | |
| 0Fh | OBJECT POSITION NUMBER | | | | | | | |
| 10h | | | | | | | | |

FIG. 18

RECORD OBJECT CONTROL COMMAND

| OFFSET (IN BYTES) | MSB 7 | 6 | 5 | 4 | 3 | 2 | 1 | LSB 0 |
|---|---|---|---|---|---|---|---|---|
| 00h | CTS | | | | C TYPE: CONTROL | | | |
| ⋮ | ⋮ | | | | | | | |
| 0Ah | OP CODE : RECORD OBJECT | | | | | | | |
| 0Bh | RESULT | | | | | | | |
| 0Ch | RESERVED | | | | | | | |
| 0Dh | | | | | | | | |
| 0Eh | | | | | | | | |
| 0Fh | DESTINATION LIST ID | | | | | | | |
| 10h | | | | | | | | |
| 11h | NEW OBJECT POSITION NUMBER | | | | | | | |
| 12h | | | | | | | | |
| 13h | CONTENT TYPE | | | | | | | |
| 14h | DOWNLOSD FORMAT TRACK ATTRIBUTE | | | | | | | |
| 15h | TRACK MODE | | | | | | | |
| 16h | CONTENT SIZE | | | | | | | |
| 17h | | | | | | | | |
| 18h | | | | | | | | |
| 19h | | | | | | | | |
| 1Ah | BULK DATA SIZE | | | | | | | |
| 1Bh | | | | | | | | |
| 1Ch | | | | | | | | |
| 1Dh | | | | | | | | |

FIG. 19

RECORD OBJECT RESPONSE COMMAND (ACCEPTED)

| OFFSET (IN BYTES) | MSB 7 | 6 | 5 | 4 | 3 | 2 | 1 | LSB 0 |
|---|---|---|---|---|---|---|---|---|
| 00h | CTS | | | | RESPONSE : ACCEPTED | | | |
| ⋮ | ⋮ | | | | | | | |
| 0Ah | Op CODE: RECORD OBJECT | | | | | | | |
| 0Bh | RESULT | | | | | | | |
| 0Ch | RESERVED | | | | | | | |
| 0Dh | | | | | | | | |
| 0Eh | | | | | | | | |
| 0Fh | DESTINATION LIST ID | | | | | | | |
| 10h | | | | | | | | |
| 11h | NEW OBJECT POSITION NUMBER | | | | | | | |
| 12h | | | | | | | | |
| 13h | CONTENT TYPE | | | | | | | |
| 14h | DOWNLOAD FORMAT TRACK ATTRIBUTE | | | | | | | |
| 15h | TRACK MODE | | | | | | | |
| 16h | CONTENT SIZE | | | | | | | |
| 17h | | | | | | | | |
| 18h | | | | | | | | |
| 19h | | | | | | | | |
| 1Ah | BULK DATA SIZE | | | | | | | |
| 1Bh | | | | | | | | |
| 1Ch | | | | | | | | |
| 1Dh | | | | | | | | |
| 1Eh ⋮ 3Dh | SESSION DATA (32 BYTES) (CONTENT ID) | | | | | | | |

FIG. 20

CHECK IN CONTROL COMMAND

| OFFSET (IN BYTES) | MSB 7 | 6 | 5 | 4 | 3 | 2 | 1 | LSB 0 |
|---|---|---|---|---|---|---|---|---|
| 00h | CTS | | | | C TYPE: CONTROL | | | |
| ⋮ | ⋮ | | | | | | | |
| 0Ah | OP CODE: CHECK IN | | | | | | | |
| 0Bh | RESULT | | | | | | | |
| 0Ch | SUBFUNCTION | | | | | | | |
| 0Dh | LIST ID | | | | | | | |
| 0Eh | | | | | | | | |
| 0Fh | OBJECT POSITION NUMBER | | | | | | | |
| 10h | | | | | | | | |

FIG. 21

| VALUE | SUBFUNCTION |
|---|---|
| 00h | CONTENT ID |
| 01h | RESERVED |
| OTHERS | PREPAID INFORMATION |

FIG. 22

CHECK IN RESPONSE COMMAND

| OFFSET (IN BYTES) | MSB 7 | 6 | 5 | 4 | 3 | 2 | 1 | LSB 0 |
|---|---|---|---|---|---|---|---|---|
| 00h | CTS | | | | RESPONSE:ACCEPTED | | | |
| ⋮ | ⋮ | | | | | | | |
| 0Ah | OP CODE:CHECK IN | | | | | | | |
| 0Bh | RESULT | | | | | | | |
| 0Ch | SUBFUNCTION | | | | | | | |
| 0Dh | LIST ID | | | | | | | |
| 0Eh | | | | | | | | |
| 0Fh | OBJECT POSITION NUMBER | | | | | | | |
| 10h | | | | | | | | |
| 11h | HASH MAC (CONTENT ID) | | | | | | | |
| 12h | | | | | | | | |
| 13h | | | | | | | | |
| 14h | | | | | | | | |
| 15h | | | | | | | | |
| 16h | | | | | | | | |
| 17h | | | | | | | | |
| 18h | | | | | | | | |

FIG. 23

CHECK IN RESPONSE COMMAND

| OFFSET (IN BYTES) | MSB 7 | 6 | 5 | 4 | 3 | 2 | 1 | LSB 0 |
|---|---|---|---|---|---|---|---|---|
| 00h | CTS | | | | RESPONSE: ACCEPTED | | | |
| ⋮ | ⋮ | | | | | | | |
| 0Ah | OP CODE: CHECK IN | | | | | | | |
| 0Bh | RESULT | | | | | | | |
| 0Ch | SUBFUNCTION | | | | | | | |
| 0Dh | LIST ID | | | | | | | |
| 0Eh | | | | | | | | |
| 0Fh | OBJECT POSITION NUMBER | | | | | | | |
| 10h | | | | | | | | |
| 11h | PREPAID INFORMATION | | | | | | | |
| 12h | | | | | | | | |
| 13h | | | | | | | | |
| 14h | | | | | | | | |
| 15h | | | | | | | | |
| 16h | | | | | | | | |
| 17h | | | | | | | | |
| 18h | | | | | | | | |

FIG. 24

EXCLUSIVE LOGIN CONTROL COMMAND

| OFFSET (IN BYTES) | MSB 7 | 6 | 5 | 4 | 3 | 2 | 1 | LSB 0 |
|---|---|---|---|---|---|---|---|---|
| 00h | CTS | | | | C TYPE: CONTROL | | | |
| 01h | SUBUNIT TYPE | | | | | SUBUNIT ID | | |
| 02h | RESERVED | | | | | | | |
| 03h | PRIORITY | | | | | | | |

FIG. 25

EXCLUSIVE LOGOUT CONTROL COMMAND

| OFFSET (IN BYTES) | MSB 7 | 6 | 5 | 4 | 3 | 2 | 1 | LSB 0 |
|---|---|---|---|---|---|---|---|---|
| 00h | CTS | | | | C TYPE: CONTROL | | | |
| 01h | SUBUNIT TYPE | | | | | SUBUNIT ID | | |
| 02h | RESERVED | | | | | | | |
| 03h | PRIORITY: 00h | | | | | | | |

[CHECK-OUT]

FIG. 30

CONTENT ID CORRESPONDENCE TABLE

| | |
|---|---|
| CONTNT ID 1 DEFINED BY PC APPRICATION | CONTENT ID 1 DEFINED BY SECONDARY STORAGE MEDIUM-HANDLING APPARATUS |
| CONTNT ID 2 DEFINED BY PC APPRICATION | CONTENT ID 2 DEFINED BY SECONDARY STORAGE MEDIUM-HANDLING APPARATUS |
| CONTNT ID 3 DEFINED BY PC APPRICATION | CONTENT ID 3 DEFINED BY SECONDARY STORAGE MEDIUM-HANDLING APPARATUS |

[PREPAID INFORMATION READ-OUT]

STRUCTURE OF THE DISTRIBUTION SYSTEM

FIG. 37

CUSTOMER DATABASE

| | MEDIUM ID | REMAINING AMOUNT | PURCHASE HISTORY |
|---|---|---|---|
| (K1) | ID1 | ¥3,700 | ········ |
| (K2) | ID2 | ¥100 | ········ |
| (K3) | ID3 | ¥1,200 | ········ |
| (K4) | ID4 | ¥5,000 | ········ |
| (K5) | ID5 | ¥0 | ········ |
| | ⋮ | ⋮ | ⋮ |

DATA TRANSFER SYSTEM, DATA TRANSFER APPARATUS, DATA RECORDING APPARATUS, EDIT CONTROLLING METHOD AND DATA PROCESSING METHOD

BACKGROUND OF THE INVENTION

The present invention relates to a data transfer system, a data transfer apparatus, a data recording apparatus, an edit controlling method, and a data processing method for transferring and recording content data such as music data.

There exists a scheme involving a hard disc drive (HDD) of a personal computer used as a primary storage medium on which to record content data such as music data, the recorded content data being subsequently transferred and recorded to another storage medium (i.e., secondary storage medium) from which the recordings such as music are eventually reproduced for enjoyment. The content data in this context refer to those distributed, transferred and/or used primarily as music data, video data, game data, and computer software.

Under the scheme above, the HDD may accommodate content data such as music data reproduced from package media including CD-DAs (Compact Disc Digital Audio) and DVDs (Digital Versatile Disc), or content data downloaded from external music servers via a communication network to which the personal computer is connected. A user may connect a secondary storage medium recording apparatus to the personal computer in order to copy or move content data from the HDD to the secondary storage medium through the attached apparatus. The user may utilize a suitable player compatible with the secondary storage medium to reproduce the content data such as music from the medium loaded in the player.

The secondary storage medium may be any one of diverse memories including memory cards based on semiconductor memories such as flash memories, magneto-optical discs (e.g., Mini-disc), CD-Rs (CD Recordable), CD-RWs (CD Rewritable), DVD-RAMs, DVD-Rs, and DVD-RWs.

Recorders and players serving as recording and reproducing apparatuses compatible with these storage media have gained widespread acceptance today. The apparatuses come in various forms and types including desk-top and portable types. Users may choose any of such apparatuses for content data recording and reproduction depending on their taste and the hardware they already possess.

Where content data are used and enjoyed under the above scheme or in similar styles, the copyright of the content data must be given due consideration. Illustratively, users may accumulate on their HDD the content data acquired from content data distribution services or from separately purchased package media and may copy the accumulated data unlimitedly to secondary storage media. In such cases, the interests of the copyright holders regarding the content date may not be adequately protected. A number of proposals have been submitted to prevent such potential or existing abuses with various technical arrangements and data processing rules for protecting content data in the form of digital data. One such proposal is called the SDMI (Secure Digital Music Initiative).

Data paths stipulated by the SDMI will be described later. The SDMI provides rules governing legitimate transfer and recording of content data from the primary storage medium (i.e., HDD in the personal computer) to secondary storage media with protection of copyrights and general users' benefits (i.e., right to copy for personal use) taken into account. The content data accumulated on the HDD fall into two broad categories: content data distributed illustratively from external servers over a network (called network contents hereunder), and content data reproduced and read from package media such as CD-ROMS, CD-DAs and DVDs loaded in a suitable disc drive incorporated in or externally attached to the personal computer.

The SDMI stipulates technical specifics that need to be complied with for copyright protection and protection of the right to copy for private use before the content data of interest can be transferred and copied from the primary storage medium (i.e., HDD) to a secondary storage medium (e.g., a Mini-disc or a memory card). Some of these specifics are discussed below.

Under the SDMI, content data are transferred from the primary storage medium to an SDMI-compliant secondary storage medium such as memory cards based on semiconductor memories including flash memories. Content data are recorded in encrypted form on the secondary storage medium. Because the content data are recorded to and accumulated on the primary storage medium such as the HDD in encrypted fashion in an SDMI setup, the data are copied unchanged (i.e., as encrypted) from there to the secondary storage medium. A reproducing apparatus into which the secondary storage medium is loaded for playback is equipped with a decrypting function that allows the copied content data to be reproduced from their encrypted state.

Each SDMI-compliant secondary storage medium is arranged to possess as part of its format an area on which to record content IDs identifying content data recorded on the medium. A content ID is generated for each content data item accumulated on the primary storage medium (HDD) in its host apparatus, and each content ID is stored on the medium in association with the applicable content data item. When a given content data item is copied to the secondary storage medium, the content ID corresponding to the content data item in question is also recorded to the secondary storage medium.

The content ID is used for what may be called content right management on both the primary storage medium side and the secondary storage medium side. On the primary storage medium side, the content right refers to the right to transfer (i.e., copy) content data to the secondary storage medium; on the secondary storage medium side, the content right signifies the right to reproduce copied content data. In the description that follows, transfer of content data (transfer of rights) from the primary storage medium to the secondary storage medium will be called "check-out," and return of content data (actually return of rights) from the secondary storage medium to the primary storage medium will be referred to as "check-in."

The SDMI stipulates usage rules over check-out and check-in transfers. For example, a single content data item is allowed to be checked out of the primary storage medium to the secondary storage medium up to three times (i.e., there are three transfer rights). Once checked out of the primary storage medium, the content data item has one of its rights transferred to the secondary storage medium side. That is, the content data item in question has two transfer rights left on the primary storage medium side; in turn, the secondary storage medium side gains a reproduction right to the content. If a content data item is checked in from the secondary storage medium to the primary storage medium, the right to the content data is considered returned. That is, the secondary storage medium side loses the reproduction right to the returned content data, while the primary storage medium side restores one transfer right to the content data in question.

Such check-in/check-out management is carried out on each content data item using the applicable content ID. Upon check-out, the content data item of interest and its content ID are recorded to the secondary storage medium. This enables the secondary storage medium side to reproduce the content data in question (i.e., the reproduction right is obtained). On the primary storage medium side, one of the transfer rights to the content data is reduced (i.e., one content ID is considered transferred) under the usage rules. Upon check-in, the content data item is not actually returned but is erased from the secondary storage medium. On the primary storage medium side, one content ID is considered returned and one transfer right is added to the content data in question under the usage rules; the secondary storage medium side loses the reproduction right to the erased content data item.

SDMI-compliant secondary storage media are subject to content right management in the manner outlined above when content data are checked in and checked out so as to be copied and recorded in their encrypted format. Such management is intended to provide for copyright protection by preventing unrestrained duplication of content data while ensuring users' right to copy for private use.

Content data that are downloaded illustratively from external servers to the HDD acting as the primary storage medium are encrypted using content keys CK. For purposes of description in this specification, the content data recorded in encrypted format on the HDD are assumed to be content data A3D compressed as per ATRAC3 standards (or by any other suitable compression scheme) using content keys CK.

In this specification, a data item y encrypted with a key x is expressed as E(x, y). When the encrypted data item E(x, y) is decrypted using the key x, the decrypted data item is expressed as D{x, E(x, y)}. For example, if ATRAC3-compressed data are denoted by A3D as mentioned above, then the content data A3D encrypted with a content key KC are expressed as E(CK, A3D). When the encrypted data (ECK, A3D) are decrypted using the key CK, the decrypted data are expressed as D{CK, E(CK, A3D)}.

On the HDD serving as the primary storage medium, encrypted content data E(CK, A3D) are stored along with the content key CK that is encrypted using a root key KR (i.e., E(KR, CK)). Illustratively, the encrypted content key E(KR, CK) is downloaded from an external server along with the encrypted content data E(CK, A3D). For content data transfer to the secondary storage medium, the encrypted content data E(CK, A3D) and the encrypted content key E(KR, CK) are transmitted from the HDD acting as the primary storage medium.

An apparatus on the side of the secondary storage medium is assumed to possess the root key KR. Using the root key KR, the apparatus decrypts the content key CK and proceeds to decrypt the encrypted content data by resorting to the decrypted content key CK.

The root key KR may be varied at the discretion of copyright holders and/or depending on the circumstances. It is possible to establish a different root key KR for each different content data item. As will be described later in detail, the SDMI stipulates a function for restricting destinations of distributed content data through appropriate processing of root keys KR.

For the destination-restricting function to be enabled in a preferred setup, data called EKB (enabling key block) are distributed to destination terminals, so that the legitimate terminals for which content data are destined can verify the root key using the EKB. In that setup, the EKB is distributed from the server for storage onto the HDD along with the encrypted content data and encrypted content key.

Suppose now that the Mini-disc, a magneto-optical disc having gained widespread acceptance today, is used as the secondary storage medium. An SDMI-compliant Mini-disc recording apparatus records checked-out content data in their encrypted state E(CK, A3D) to the Mini-disc loaded therein. At the time of reproduction, an SDMI-compliant Mini-disc player first acquires ATRAC3 data (A3D) from the loaded disc through a decryption process D{CK, E(CK, A3D)}=A3D before suitably decoding the data for reproduction and output of music or other sources represented by the data.

Mini-disc systems in general use today are not designed to record encrypted data on the Mini-disc. That is, these Mini-disc systems have no decryption function when operating as Mini-disc players. As a result, even if content data are recorded to a Mini-disc by the SDMI-compliant Mini-disc recording apparatus, the content data cannot be reproduced from that disc by many SDMI-noncompliant Mini-disc players. There is no compatibility in terms of data reproduction between the two types of apparatuses. This poses significant constraints on the legitimate use of SDMI content data purchased by general users and can seriously degrade the value of and the degree of satisfaction for SDMI content providing services in the eyes of general users.

The problem above may be circumvented illustratively by decrypting SDMI content data before they are transferred to an SDMI-noncompliant Mini-disc recording apparatus so that a copy of the data may be recorded in decrypted format on the Mini-disc or any other suitable secondary storage medium. However, this measure can encourage unrestrained copying of content data resulting in illegal duplication practices. That will defeat the initial purpose of the SDMI of protecting copyrights.

As one way of transferring content data, this applicant proposed previously the following method: upon transfer of content data, a data transfer apparatus (incorporating the primary storage medium) authenticates a data recording apparatus (handling the secondary storage medium) that serves as the destination of the transfer. The data transfer apparatus authorizes transfer of the content data on condition that the data recording apparatus is authenticated and that the content provider involved (e.g., copyright holder) gives his or her permission. The content data are then transferred in encrypted format over transmission lines. The transferred content data are decrypted by and recorded to the secondary storage medium. The proposed method was intended to tolerate unencrypted copies of content data for users' benefits while ensuring copyright protection.

The above method proposed by this applicant has turned out to have the following disadvantage: as the secondary storage medium, the Mini-disc having gained widespread acceptance today is incapable of recording content IDs when SDMI content data are to be checked in or checked out. The Mini-disc has no area in which to record content IDs, and the Mini-disc recorders marketed so far have no function for managing content IDs.

It is possible to establish a new area for accommodating content IDs illustratively in the control region (U-TOC) on the Mini-disc. Even so, once the U-TOC is updated through recording or editing by the Mini-disc recorder, all content IDs recorded in the newly allocated area are lost. Content IDs cannot be managed on the side of the Mini-disc while compatibility with the existing devices is maintained for users' benefits. The inability to manage content IDs signifies the failure to control check-in transfers among others.

On the side of the secondary storage medium such as the Mini-disc, it is possible to generate a content ID illustratively based on the content data item itself to be identified by that content ID. The trouble is that the process takes time because of the need to do seeks on the disc to read part of the content data in question. Such content IDs, even if generated on the side of the secondary storage medium, are unusable for management purposes because they do not coincide with the content IDs on the primary storage medium side.

Furthermore, the Mini-disc or like storage medium permits diverse kinds of editing on the content data recorded thereon. As is well known, the Mini-disc allows its recorded content data items (generally called tracks that are units of data representing music or other sources) to be divided, combined, erased, or moved (track number movement).

If content data checked out of the HDD to the Mini-disc are divided, combined or otherwise edited, they will become different from the original content data held on the HDD. This obviously thwarts the check-in function whereby the reproduction right to content data would be restored upon return of the original content data from the secondary storage medium to the primary storage medium. If content IDs are to be generated based on the corresponding content data, then dividing, combining, or otherwise editing the content will result in different content IDs that should be generated. As an additional matter to be considered, regardless of check-out transfers, the Mini-disc may also carry a specific content that may be recorded by each recording apparatus handling the disc in question.

Under these circumstances where users utilize the Mini-disc or other recordable or editable storage medium as per the SDMI standards without recourse to an SDMI-compliant system, there are obstacles to be cleared before consistency can be achieved between the ordinary procedure of recording or editing on the one hand, and check-out and check-in transfers under the SDMI scheme on the other hand.

SUMMARY OF THE INVENTION

The present invention has been made in view of the above circumstances and provides a data transfer system, data transfer apparatus, data recording apparatus, edit controlling method, and data processing method for suitably managing in an efficient manner the editing of content data between a primary storage medium and a secondary storage medium that is arranged to record unencrypted content data.

According to the first aspect of the present invention, there is provided a data recording apparatus for selectively receiving either first content data which are encrypted or second content data which are unencrypted, the received data being recorded to a storage medium constituted by a program area and a management area, the data recording apparatus including:

first receiving means for receiving the encrypted first content data;

second receiving means for receiving the unencrypted second content data;

decrypting means for decrypting the encrypted first content data received by the first receiving means;

recording means for selectively recording either the first content data decrypted by the decrypting means or the second content data received by the second receiving means to the program area of the storage medium, the recording means further recording an identifier to the management area of the storage medium, the identifier identifying either the decrypted first content data recorded in the program area of the storage medium or the second content data received by the second receiving means; and controlling means which, given a command for editing the content data recorded in the program area of the storage medium, either permits or inhibits editing of the recorded content data in accordance with the identifier recorded in the management area of the storage medium.

According to the second aspect of the present invention, there is provided a data recording apparatus connected via a communication line to a data transfer apparatus equipped with a primary storage medium accommodating first content data which are encrypted, the data recording apparatus exchanging the encrypted first content data with the data transfer apparatus over the communication line, the data recording apparatus including:

first receiving means for receiving the encrypted first content data transferred over the communication line from the data transfer apparatus;

second receiving means for receiving second content data which are unencrypted;

decrypting means for decrypting the encrypted first content data received by the first receiving means;

recording means for selectively recording either the first content data decrypted by the decrypting means or the second content data received by the second receiving means to a program area of a storage medium, the recording means further recording a first identifier to a management area of the storage medium, the first identifier identifying either the decrypted first content data recorded in the program area of the storage medium or the second content data received by the second receiving means;

identifier generating means for generating a second identifier based on part of the encrypted first content data;

transmitting means for transmitting the second identifier generated by the identifier generating means to the data transfer apparatus over the communication line;

changing means which, if the decrypted first content data recorded in the program area of the storage medium have been edited, then changes the first identifier recorded in the management area of the storage medium; and controlling means which, if the decrypted first content data recorded in the program area of the storage medium are to be returned to the data transfer apparatus, then either permits or inhibits the return of the decrypted first content data depending on a result of matching between the second identifier held by the data transfer apparatus and the second identifier held by the data recording means; wherein, if the decrypted first content data to be returned are judged to have been edited, then the controlling means either permits or inhibits the return of the first content data not in accordance with the result of the matching but in keeping with the first identifier recorded in the management area of the storage medium.

According to the third aspect of the present invention, there is provided a data transfer apparatus connected via a communication line to a data recording apparatus for selectively receiving either first content data which are encrypted or second content data which are unencrypted, the data transfer apparatus exchanging the encrypted first content data with the data recording apparatus over the communication line, the data transfer apparatus including:

first memory means for storing the encrypted first content data;

transmitting means for transmitting the encrypted first content data from the first memory means to the data recording apparatus over the communication line;

receiving means for receiving at least either a content identifier transmitted from the data recording apparatus or the encrypted first content data returned from the data recording apparatus;

second memory means for storing the content identifier received by the receiving means;

matching means for causing the receiving means to receive the content identifier corresponding to the encrypted first content data when the encrypted first content data are returned from the data recording apparatus, the matching means further matching the received content identifier against the content identifier stored in the second memory means; and controlling means for either permitting or inhibiting the return of the encrypted first content data from the data recording apparatus depending on a result of the matching.

According to the fourth aspect of the present invention, there is provided a data transfer system including:

a data transfer apparatus including first memory means for storing first content data which are encrypted, and transmitting means for transmitting the encrypted first content data from the first memory means; and a data recording apparatus including: first receiving means for receiving the encrypted first content data transmitted by the transmitting means of the data transfer apparatus; decrypting means for decrypting the encrypted first content data received by the receiving means; second receiving means for receiving second content data which are unencrypted; and recording means for selectively recording either the first content data decrypted by the decrypting means or the unencrypted second content data received by the second receiving means to a program area of a storage medium, the recording means further recording to a management area of the storage medium an identifier identifying either the first content data or the second content data;

wherein the data recording apparatus further includes:

content identifier generating means for generating a content identifier based on part of the decrypted first content data recorded in the program area of the storage medium; and transmitting means for transmitting to the data transfer apparatus the content identifier generated by the content identifier generating means; and wherein the data transfer apparatus further includes:

second memory means for storing the content identifier transmitted by the transmitting means of the data recording apparatus;

receiving means which, when the decrypted first content data are to be returned from the storage medium of the data recording apparatus to the data transfer apparatus, receives the content identifier corresponding to the first content data to be returned;

matching means for matching the content identifier received by the receiving means against the content identifier stored in the second memory means; and controlling means for either permitting or inhibiting the return of the first content data from the data recording apparatus depending on a result of the matching by the matching means.

According to the fifth aspect of the present invention, there is provided an edit controlling method for selectively receiving either first content data which are input encrypted upon transfer from a data transfer apparatus or second content data which are input unencrypted, in order to record the received data unencrypted to a program area of a storage medium while recording an identifier corresponding to the recorded content data to a management area of the storage medium, the identifier identifying either the first content data or the second content data, whereby the content data recorded in the program area of the storage medium are edited, the edit controlling method including the steps of:

reproducing from the management area the identifier identifying either the first content data or the second content data;

judging, given a command for editing the content data recorded in the program area, whether the recorded content data are the first content data or the second content data in accordance with the reproduced identifier; and either inhibiting or restricting the editing if the content data to be edited in the program area of the storage medium are judged to be the first content data in the judging step.

According to the sixth aspect of the present invention, there is provided a data processing method for causing encrypted content data to be exchanged between a data transfer apparatus and a data recording apparatus over a communication line which connects the two apparatuses, the data processing method including the steps of:

causing, when the data transfer apparatus transmits the encrypted content data to the data recording apparatus, the data transfer apparatus to receive a content identifier generated by and transferred from the data recording apparatus;

storing the received content identifier into a memory;

judging, when the data recording apparatus is to return the encrypted content data to the data transfer apparatus, whether or not the encrypted content data to be returned have been edited;

inhibiting the return of the encrypted content data, if the encrypted content data are judged to have been edited in the judging step;

matching the content identifier corresponding to the encrypted content data to be returned against the content identifier stored in the memory, if the encrypted content data are not judged to have been edited in the judging step; and permitting the return of the encrypted content data, if the matching in the matching step reveals a match.

BRIEF DESCRIPTION OF THE DRAWINGS

FIGS. 2A and 2B are explanatory views of typical EKBs (enabling key blocks) for use in encryption by the embodiment;

FIG. 3 is an explanatory view of a typical enabling key block (EKB) structure for use in encryption by the embodiment;

FIG. 10 is an explanatory view of U-TOC sector 0 for a Mini-disc system;

FIG. 15 is an explanatory view indicating how content data are decrypted by the embodiment;

FIG. 16 is an explanatory view of a check-out control command for use by the embodiment;

FIG. 17 is an explanatory view of a check-out response command for use by the embodiment;

FIG. 18 is an explanatory view of a record object control command for use by the embodiment;

FIG. 19 is an explanatory view of a record object response command for use by the embodiment;

FIG. 20 is an explanatory view of a check-in control command for use by the embodiment;

FIG. 21 is an explanatory view showing details of "sub-function" data in the check-in control command used by the embodiment;

FIG. 22 is an explanatory view of a check-in response command for use by the embodiment;

FIG. 23 is another explanatory view of the check-in response command used by the embodiment;

FIG. 24 is an explanatory view of an exclusive login control command for use by the embodiment;

FIG. 25 is an explanatory view of an exclusive logout control command for use by the embodiment;

FIG. 30 is an explanatory view of a content ID correspondence table for use by the embodiment;

FIG. 37 is an explanatory view of a customer database for use by the embodiment.

DETAILED DESCRIPTION OF THE PREFERRED EMBODIMENTS

Figure 1:
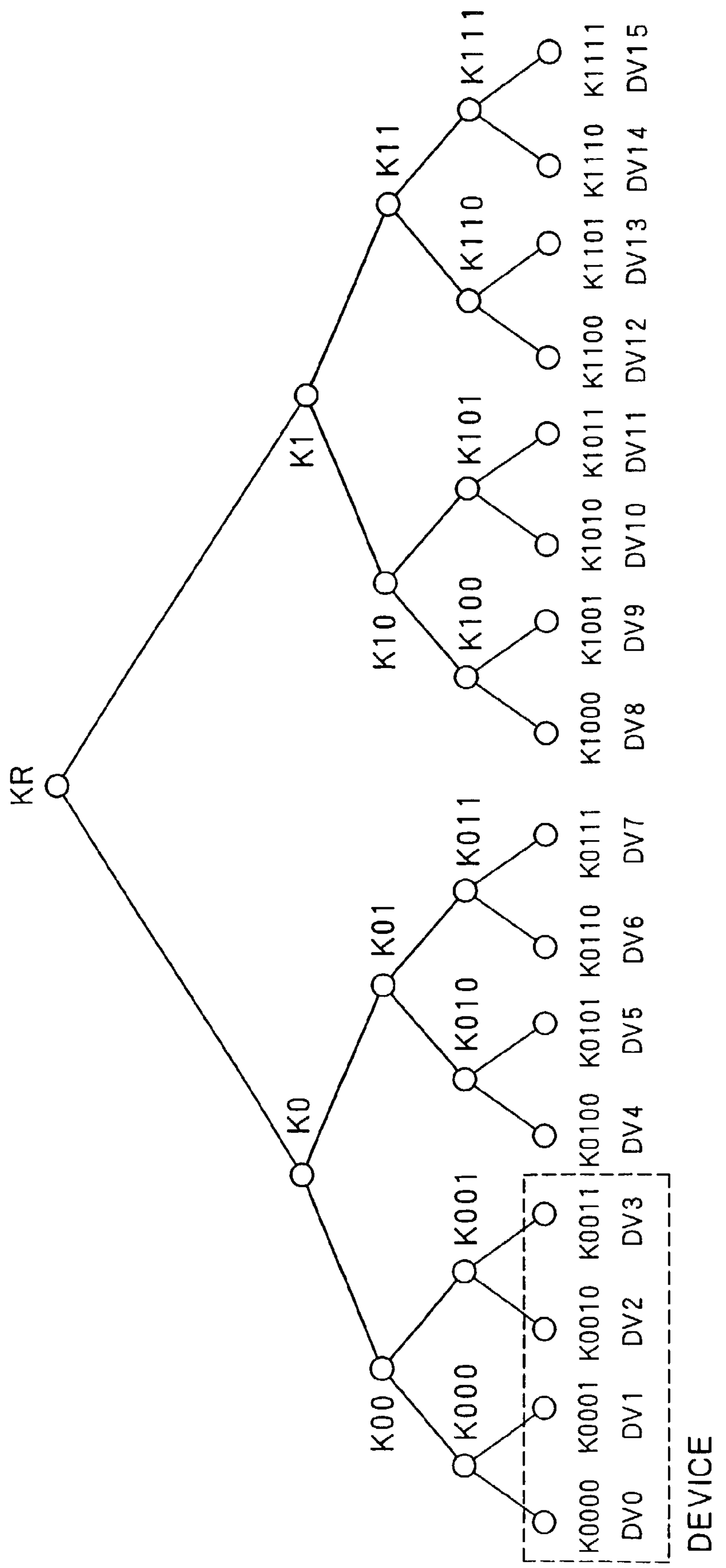
FIG. 1 is an explanatory view of a tree structure constituted by keys for use in encryption by an embodiment of this invention.

Preferred embodiments of this invention will now be described under the following headings:

1. Tree structure of encrypted keys and EKB
2. System configuration
3. Data paths for SDMI contents
4. Typical structure of the data transfer apparatus (PC; primary storage medium-equipped apparatus)
5. Typical structure of the data recording apparatus (recording/reproducing apparatus handling the secondary storage medium)
6. Mini-disc management scheme
7. Authentication process
8. Content encryption scheme
9. Commands
10. Check-out and check-in transfers of contents
11. Scheme for generating and managing content IDs
12. Process of generating content IDs upon check-out and before check-in
13. Content write control flag
14. Accounting information processing 1. Tree Structure of Encrypted Keys and EKB Before a data transfer system of this invention is discussed in detail, a typical structure of encrypted keys used for content distribution by the system will be explained.

Described below with reference to FIGS. 1, 2A, 2B and 3 is a typical structure in which encrypted keys are retained by devices for use in receiving encrypted content data from the distributing side.

FIG. 1 shows a tree structure constituted by encrypted keys. Reference numerals DV0 through DV15 at the bottom of the view denote individual devices that receive content data. These devices represent leaves making up the hierarchical tree structure illustrated.

Each of the devices DV0 through DV15 stores in its memory a key set made up of node keys and a leaf key. A node key is assigned to each of the nodes ranging from the root to the leaves representing the devices, and a leaf key is assigned to each leaf representative of a device. The key set, called DNK (device node key), will be described later in more detail.

In FIG. 1, reference numerals K0000 through K1111 at the bottom denote leaf keys assigned to the devices DV0 through DV15. Reference numerals K0 through K111 represent node keys assigned to the nodes ranging from those immediately below the root (having a root key KR) at the top to the second nodes from the bottom. In the description that follows, the wording "node key" may embrace the root key where appropriate.

In the tree structure of FIG. 1, the device DV0 illustratively has a DNK made up of a leaf key K0000; node keys K000, K00 and K0; and a root key KR. The DNK in its stored state has the node keys K000, K00 and K0 as well as the root key KR encrypted illustratively using the leaf key K0000. In like manner, the device DV5 possesses a leaf key K0101; node keys K010, K01 and K0; and the root key KR. Similarly, the device DV15 owns a leaf key K1111; node keys K111, K11 and K1; and the root key KR.

The tree structure of FIG. 1 is shown comprising 16 devices DV0 through DV15 arranged in horizontally symmetrical fashion of four node layers. However, this is not limitative of the invention. Many more devices may be included in a tree structure with a different number of node layers.

Various information processing apparatuses (devices) may be included in the tree structure of FIG. 1 and may utilize diverse kinds of storage media: DVDs, CDs, MDs and/or flash memories, attached to each apparatus in embedded or detachable fashion. Diverse application services may coexist in a system constituted by these apparatuses. To such a system where the different devices and applications coexist applies the hierarchical tree structure of FIG. 1 throughout which content data and keys are distributed.

In the above system of FIG. 1 wherein various devices and applications reside side by side, a portion indicated by broken lines enclosing the devices DV0, DV1, DV2 and DV3 is established as one group using the same storage medium. A content provider may transmit common content data in encrypted format to the devices constituting the group and may send a common content key to these devices. Each of the devices in the group may output, say, payment data in encrypted format to the content provider or to a suitable financial institution for the settlement of content fees. Organs such as content providers or financial institutions that exchange data with devices regard as one group the devices DV0, DV1, DV2 and DV3 enclosed by broken lines in FIG. 1. There may be a plurality of such groups in the tree structure of FIG. 1. These organs communicating data with each device function as message data distributing means.

The node keys and leaf keys may be controlled by a single key management center for the whole devices, or may be managed per group by the message data distributing means such as content providers and financial institutions which exchange data with each group. The node keys and leaf keys are updated if any of them are found leaked or otherwise compromised. The update process is carried out by the key management center, content providers, financial institutions and other organs involved.

In the above tree structure, as shown in FIG. 1, the four devices DV0, DV1, DV2 and DV3 included in one group share keys K00, K0, and KR as the node keys and root key in their storage. The shared node key structure allows illustratively a common content key to be shared by the devices DV0, DV1, DV2 and DV3 only.

For example, if the shared node key K00 is established as a content key, it is possible to set that key as the common content key for the devices DV0, DV1, DV2 and DV3 without offering any new key to these devices. Suppose that a new content key CK is encrypted using the node key K00 to generate a value E(K00, CK) and that the value is transmitted over a network or carried on a storage medium for distribution to the devices DV0, DV1, DV2 and DV3. In that case, each of the devices DV0, DV1, DV2 and DV3 alone may obtain the content key CK by decrypting the encrypted value E(K00, CK) using the shared node key K00 possessed by each device.

Suppose now that at a give time t, the keys K0011, K001, K00, K0 and KR owned by the device DV3 have been analyzed by a hacker and exposed. In such a case, the device DV3 needs to be detached then and there from the system in order to protect the data exchanged within the system (i.e., within the group of the devices DV0, DV1, DV2 and DV3).

The process of detaching the device DV3 from the system involves replacing the node keys K001, K00, K0 and the root key KR with new keys K(t)001, K(t)00, K(t)0 and K(t)R and sending the updated keys to the devices DV0, DV1 and DV2. Here, the notation "K(t)aaa" signifies that the key K(t)aaa is an updated key of a generation t based on the old key Kaaa.

It may also become necessary to update the node keys and/or the root key KR under other circumstances such as upon request by a copyright holder or due to certain distribution system requirements. The updates must be reported to all legitimate devices concerned.

How the updated keys are distributed will now be described. Typically, a table constituted by block data called an enabling key block (EKB) shown in FIG. 2A is transmitted over a network or carried on a storage medium for distribution to the devices involved. If the device DV3 is detached from its group as mentioned above, then the EKB is distributed to the devices DV0, DV1 and DV2.

The enabling key block (EKB) is made up of encrypted keys used for distributing the updated keys to the device corresponding to each of the leaves constituting the tree structure of FIG. 1. The enabling key block may also be called a key renewal block (KRB).

The enabling key block EKB shown in FIG. 2A is composed of block data having a data structure allowing only those devices in need of updating their node keys to make the updates. What is shown in FIG. 2A is an example of block data formed with a view to distributing the updated node keys of a generation t to the devices DV0, DV1 and DV2 in the tree structure of FIG. 1.

Suppose that the keys K0011, K001, K00, K0 and KR have been illegally exposed. In that case, the devices DV0 and DV1 require updated keys K(t)00, K(t)0 and K(t)R while the device DV2 is in need of updated keys K(t)001, K(t)00, K(t)0 and K(t)R.

The EKB in FIG. 2A is shown comprising a plurality of encrypted keys. The encrypted key at the bottom of the tabular view is E(K0010, K(t)001), which corresponds to the updated node key K(t)001 encrypted with the leaf key K0010 owned by the device DV2. The device DV2 can acquire the node key K(t)001 by decrypting this encrypted key using the leaf key it possesses.

The decrypted key K(t)001 may be used in turn to decrypt the encrypted key E(K(t)001, K(t)00) in the second row from the bottom in FIG. 2A. The decryption process provides the updated node key K(t)00. Likewise, the encrypted key E(K(t)00, K(t)0) in the second row from the top is decrypted to yield the updated node key K(t)0; the encrypted key E(K(t)0, K(t)R) at the top is decrypted to produce the updated root key K(t)R.

Meanwhile, the leaf keys K0000 and K0001 as well as the node key K000 for the devices DV0 and DV1 are not to be updated. These devices are in need of the updated keys K(t)00, K(t)0 and K(t)R and acquire these keys as follows: the updated node key K(t)00 is obtained by decrypting the encrypted key E(K000, K(t)00) in the third row from the top in FIG. 2A; the updated node key K(t)0 is acquired by decrypting the encrypted key E(K(t)00, K(t)0) in the second row from the top; and the updated root key K(t)R is gained by decrypting the encrypted key E(K(t)0, K(t)R) at the top. The devices DV0, DV1 and DV2 obtain the updated root key K(t)R in this manner. The index column in FIG. 2A indicates absolute addresses of the node keys and leaf keys for use as the decrypted keys.

Suppose now that the node keys K(t)0 and K(t)R at the top of the tree structure in FIG. 1 need not to be updated and that the node key K00 alone requires getting updated. In such a case, an enabling key block (EKB) shown in FIG. 2B may be used for distribution of the updated node key K(t)00 to the devices DV0, DV1 and DV2.

The EKB in FIG. 2B is usable illustratively for distributing a new content key to be shared within a specific group of devices. For example, suppose that the devices DV0, DV1, DV2 and DV3 in the group enclosed by broken lines in FIG. 1 and that they need a new common content key CK(t). In that case, the newly updated common content key CK(t) is first encrypted into data E(K(t)00, CK(t)) using the updated node key K(t)00 derived from the old node key K00 shared by the devices DV0, DV1, DV2 and DV3. The encrypted data E(K(t)00, CK(t)) are then distributed to the devices involved along with the EKB shown in FIG. 2B.

The scheme above permits distribution of data that will not be decrypted by devices in any other group, such as the device DV4. The devices DV0, DV1 and DV2 decrypt the encrypted data distributed by use of the updated node key K(t)00 based on the EKB. The decryption provides the content key CK(t) in effect at time t.

Where the keys are arranged into a tree structure as described above, each of the keys may be updated as needed using the above-mentioned EKB. The key structure readily allows the root key (KR) and node keys to be updated depending on the circumstances. This provides content distribution in a flexible but well-regulated manner.

FIG. 3 shows a typical format of the enabling key block (EKB). As indicated in this tabular view, the number of node keys is given in four bytes. The depth of node keys is also given in four bytes. The node key depth represents the number of node layers making up a hierarchical tree of devices to which the EKB is distributed. The version of the EKB is given in four bytes. The version notation serves to identify the most recent EKB and denote compatibility with the content of interest. The "reserved" area is self-explanatory.

Starting from an offset address location of 16 bytes, an encrypted node key (or keys) is indicated. The encrypted key or keys represent the actual content of the EKB in a 16×M byte area. These are encrypted keys such as those discussed with reference to FIGS. 2A and 2B.

An encrypted EKB version and a digital signature are also included. The digital signature signifies an electronic signature affixed by an EKB-issuing organ such as the key management center, content provider, or financial institution for the settlement of content fees. Upon receipt of an EKB, the device checks the digital signature to see whether the EKB is an enabling key block issued rightfully by a legitimate EKB-issuing party.

2. System Configuration

Figure 4:
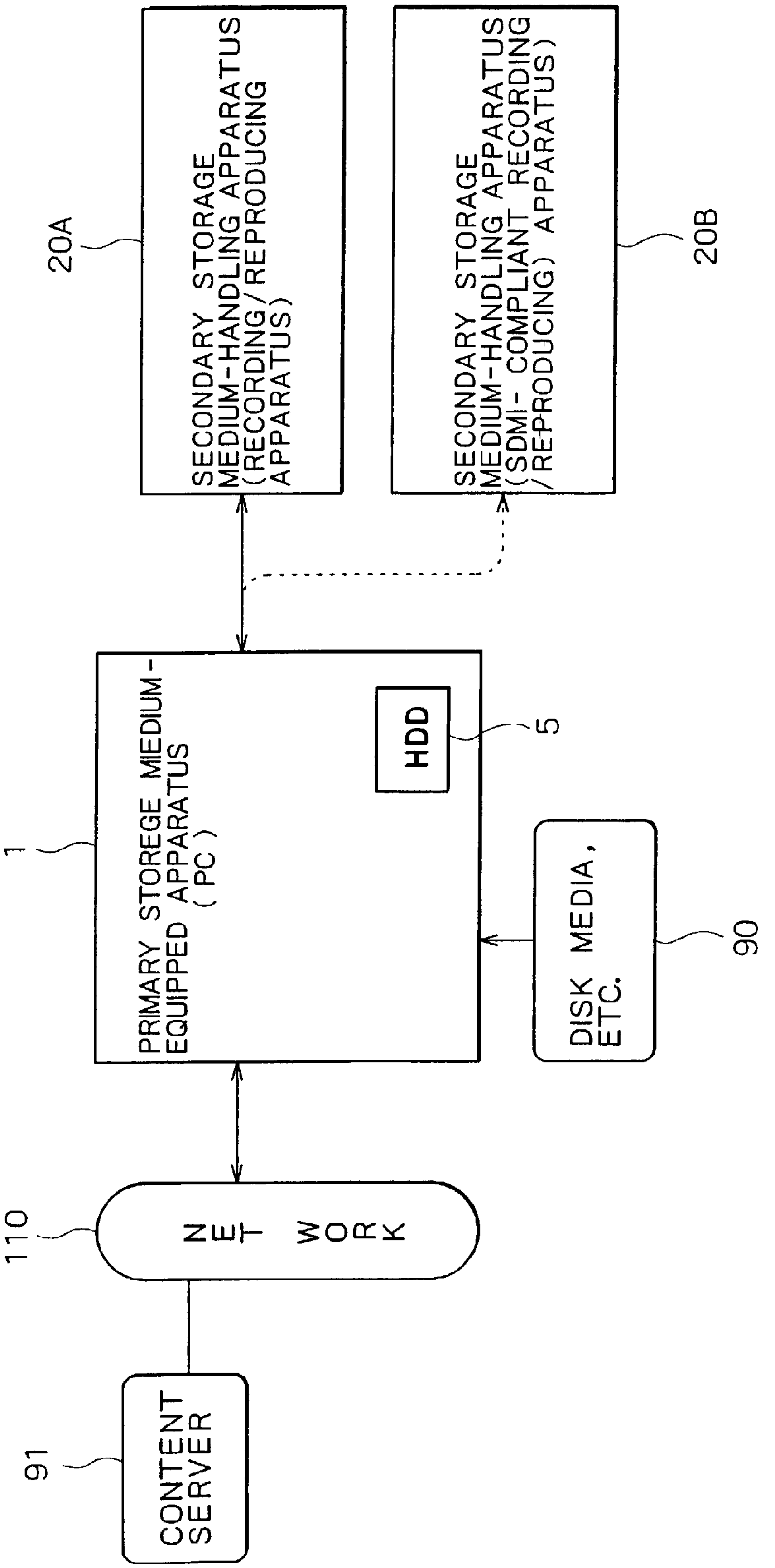
FIG. 4 is a block diagram showing a typical system structure of the embodiment.

A typical configuration of the system that adopts the above-described key structure will now be described. FIG. 4 depicts a typical system configuration. A primary storage medium-equipped apparatus 1 corresponds to the data transfer apparatus of this invention, and a secondary storage medium-handling apparatus 20A corresponds to the data recording apparatus of the invention. The primary storage medium-equipped apparatus 1 and the secondary storage medium-handling apparatus 20A make up a data transfer system.

The primary storage medium-equipped apparatus 1 is constituted illustratively by a personal computer. In this respect, the primary storage medium-equipped apparatus 1 may be referred to as the personal computer 1 hereunder for purposes of description. It should be noted however that the primary storage medium-equipped apparatus 1 is not limited to the personal computer only.

The primary storage medium-equipped apparatus 1 is implemented as the inventive data transfer apparatus when suitable software for executing the storage and transfer of SDMI-compliant content data is started illustratively on a personal computer. A hard disc drive (HDD) 5 incorporated in or attached externally to the personal computer 1 serves as the primary storage medium (and primary storage medium driving means). Although the HDD 5 is regarded as the primary storage medium in the ensuing description, this is not limitative of the invention. The primary storage medium may alternatively be any one of such storage media as optical discs and magneto-optical discs, such memories as semiconductor memories built in the apparatus and a portable semiconductor memory (e.g., memory card), and others.

The primary storage medium-equipped apparatus 1 is connected to a content server 91 via a communication network 110 for communication therewith. The connection allows the apparatus 1 to download content data such as music data from the server. There obviously exist a plurality of content servers 91 whose various data download services may be used as needed by users of personal computers 1. Some of the content data downloaded from the content server 91 to the personal computer 1 are SDMI-compliant data; others are not SDMI-compliant.

Transmission lines constitute the network 110 that may be a wired or wireless public switched network. The transmission lines may alternatively be leased lines installed between the personal computer 1 and the content server 91. Specifically, the network 110 may be the Internet, satellite communication links, an optical fiber network, or other diverse communication lines.

The HDD 5 of the personal computer 1 may accumulate content data such as music data reproduced by a built-in or externally attached disc drive loaded with package media 90 (also called the disc 90 hereunder) such as CD-DAs and DVDs. The content data retrieved from the loaded disc 90 are written to the HDD 5 for storage.

Where the secondary storage medium-handling apparatus 20A or 20B is connected to the personal computer 1, content data accumulated on the HDD 5 may be transferred to the apparatus 20A or 20B. The apparatus 20A or 20A serving as a recording apparatus (or recording/reproducing apparatus) handling a secondary storage medium records copies of the transferred content data from the personal computer to the secondary storage medium.

Various kinds of apparatuses are conceivable as the secondary storage medium-handling apparatus 20A or 20B. In this example, the secondary storage medium-handling apparatus 20B is an SDMI-compliant recording apparatus. For example, this apparatus 20B may be loaded with the secondary storage medium constituted by an SDMI-compliant memory card based on a semiconductor memory such as a flash memory. The secondary storage medium-handling apparatus 20B may illustratively be a recording/reproducing apparatus accommodating SDMI-compliant memory cards. In such a setup, SDMI-compliant content data are recorded in encrypted format to the secondary storage medium.

A management information format in which to retain content IDs is provided on the SDMI-compliant secondary storage medium, the content IDs serving as identifiers of SDMI-compliant content data. An application program for writing content data to the HDD 5 generates content IDs at the time of data writing and stores the generated content IDs together with the content data onto the HDD 5. Check-in and check-out transfers are managed using the content IDs as well. Upon storing content data, the SDMI-compliant secondary storage medium accepts concurrent recording of a content ID identifying the data in question.

The secondary storage medium-handling apparatus 20A is an SDMI-noncompliant data recording apparatus. This apparatus writes to the secondary storage medium decrypted SDMI content data requiring copyright protection, as will be described later in more detail. A typical secondary storage medium is the Mini-disc. In this case, the secondary storage medium-handling apparatus 20A is a Mini-disc recording/reproducing apparatus. In the description that follows, the secondary storage medium-handling apparatus 20A may be referred to as the recording/reproducing apparatus 20A where appropriate.

The conditions for SDMI-compliant content data to be recorded in decrypted format involve an authentication process, as will be discussed later, whereby copyright protection features are kept effective. The Mini-disc or like secondary storage media (i.e., those widely accepted by the public so far) have no area dedicated to accommodating content IDs. This requires adopting a special content ID management scheme, which will be described later.

The storage medium to and from which the secondary storage medium-handling apparatus 20A writes and reads data is not limited to the Mini-disc; the medium may be any one of a memory card based on a semiconductor memory such as a flash memory, a Mini-disc-turned magneto-optical disc, a CD-R (CD recordable), a CD-RW (CD rewritable), a DVD-RAM, a DVD-R, or a DVD-RW. The apparatus 20A may be any recording apparatus compatible with any of these storage media.

The personal computer 1 is connected to the secondary storage medium-handling apparatus 20A or 20B through a USB (universal serial bus) port, an IEEE 1394 port or the like. A wired or wireless transmission path complying with any other suitable transmission standards may also be used as long as it permits transfers of content data.

3. Data Paths for SDMI Contents

Figure 5:
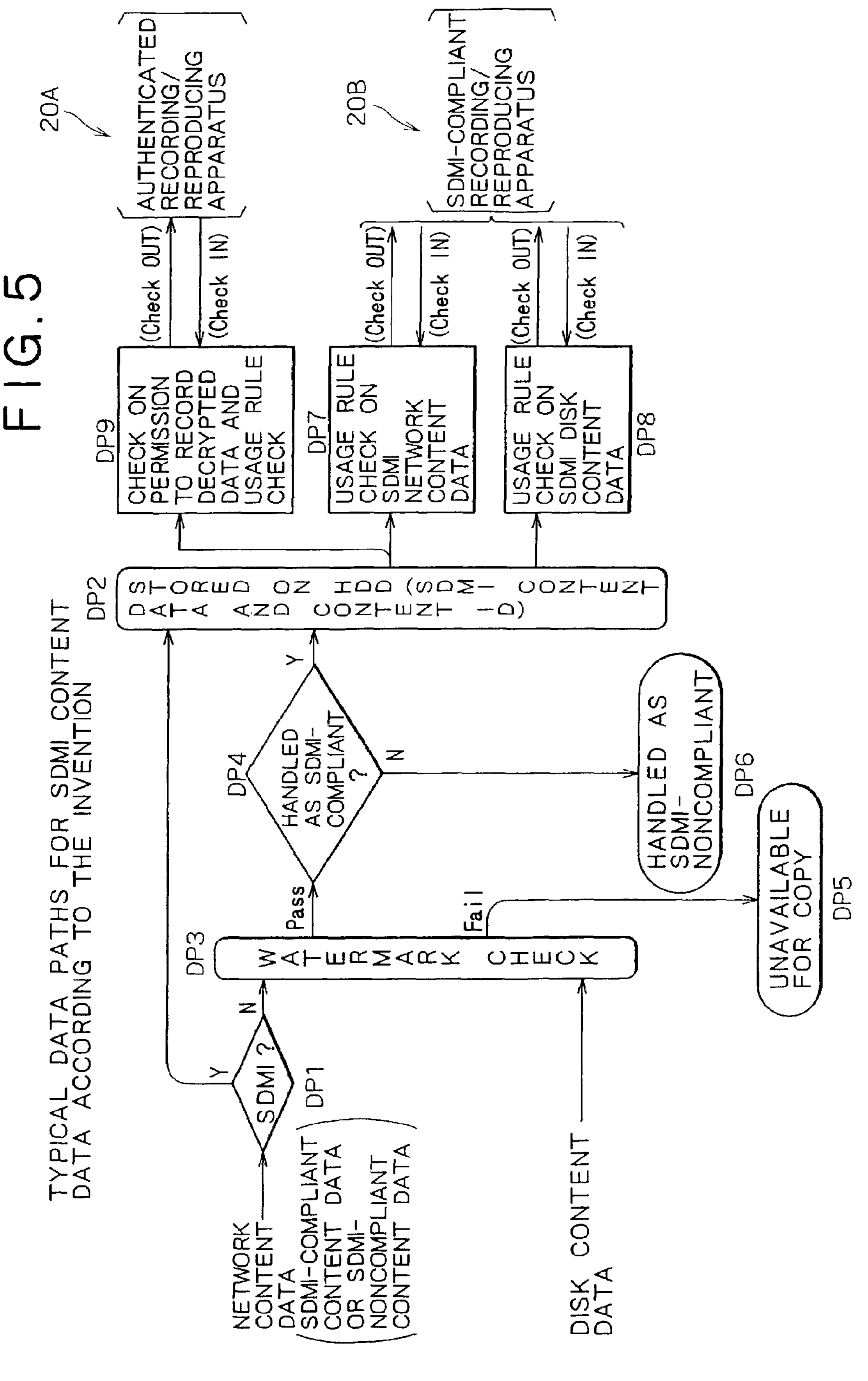
FIG. 5 is an explanatory view of typical data paths for SDMI content data handled by the embodiment.

FIG. 5 shows typical data paths stipulated by the SDMI for systems such as one in FIG. 4. These paths are established illustratively to let music content data be accumulated into the personal computer 1 having the HDD 5 as the primary storage medium or to transfer the content data to an external device (secondary storage medium-handling apparatus 20A or 20B). In practice, the data paths are implemented by suitable software run by the personal computer 1 for storage and transfer of music content data. The processes or steps on the data paths in FIG. 5 are denoted by reference numerals DP1 through DP9 and will be referenced by these numerals when discussed below.

Content data may be distributed from an external server 91 over the network 110 shown in FIG. 4 (i.e., network content). A check is first made (DP1) to see if the distributed content is subject to copyright protection under the SDMI. There are two types of network content data distributed: those transmitted as SDMI-compliant by the server (called SDMI-compliant content hereunder), and those irrelevant to the SDMI (called SDMI-noncompliant content hereunder).

SDMI-compliant content data are encrypted illustratively using a content key CK according to the encryption scheme such as DES. If the content data are compression-encoded by ATRAC3 (A3D), then the SDMI-compliant content data are distributed as data E(CK, A3D).

When the distributed network content data are SDMI-compliant, they are accumulated as SDMI content on the HDD 5 serving as the primary storage medium (DP1 to DP2). In that case, the content data are written to the HDD 5 in their distributed state of E(CK, A3D). Alternatively, the encrypted content data may be decrypted temporarily before being encrypted again to become E(CK', A3D) by use of another key CK' for storage onto the HDD 5.

If the network content data turn out to be SDMI-noncompliant data, then they are subjected to a watermark check, i.e., a screening check for digital watermarking (DP1 to DP3). It should noted that a watermark check is performed directly (DP3) on all content data reproduced from such package media as CD-DAs and DVDs (called disc content) by a disc drive (e.g., CD-ROM drive) built in or externally attached to the personal computer 1. In other words, all SDMI-noncompliant content data are subject to the watermark check.

If any content data fail the watermark check, the data are not regarded as copiable over the SDMI data paths (DP3 to DP5). The rejection of the content data as copiable data is implemented in many ways by software design. Illustratively, the rejected content data may be prevented from getting transferred to another medium for copy or movement or may be barred from getting stored on the HDD 5 during an SDMI-compliant content process.

If content data pass the watermark check, i.e., if the data are judged to have legitimate digital watermarking and are thus allowed to be copied in the form of copy controlled bits, then the content data in question are regarded as rightfully copiable content data. Another check is made (DP4) on the content data to see if the data are treated as SDMI-compliant. Whether or not to treat given content data as SDMI-compliant is determined by software design or through user settings.

If it is determined that the content data are not treated as SDMI-compliant, then the SDMI-noncompliant data are excluded from the SDMI-compliant data paths (DP6). In such a case, the data may be transferred illustratively to an SDMI-noncompliant recording apparatus.

If it is determined that the content data are handled as SDMI-compliant data, then the data are encrypted and stored as SDMI content on the HDD 5 (DP4 to DP2). Illustratively, the data are accumulated in the form of E(CK, A3D) or E(CK', A3D) on the HDD 5.

The data paths described above allow the HDD 5 acting as the primary storage medium to store SDMI-compliant content data obtained over the network 110 (SDMI network content) or SDMI-compliant content data retrieved from discs such as CD-DAs or other storage media. For each SDMI content data item, a content ID unique to that item is generated and stored on the HDD 5 for content-wise management based on appropriate usage rules, to be described later.

The SDMI content data held on the HDD 5 (SDMI network content or SDMI disc content) are transferred to the SDMI-compliant recording/reproducing apparatus 20B under relevant rules so that the data may be copied onto an SDMI-compliant secondary storage medium loaded in the apparatus 20B. Under certain conditions, the data may also be transferred to the recording/reproducing apparatus 20A instead of to the apparatus 20B.

Where the SDMI-compliant recording/reproducing apparatus 20B is connected to the personal computer 1 incorporating the HDD 5, the following takes place: for SDMI disc content data, relevant usage rules are stipulated for their transfer. Only when the usage rules are met can the content data be transferred to the SDMI-compliant recording/reproducing apparatus 20B for copying purposes (DP8).

Over the data paths, “check-out” refers to the transfer of data for eventual copy from the primary storage medium (HDD 5) to the secondary storage medium (e.g., memory card) handled by the SDMI-compliant recording/reproducing apparatus 20B (or 20A) for recording and reproduction purposes. “Check-in” refers to the movement of data in the reverse direction, i.e., from the secondary storage medium to the primary storage medium. Upon movement of content data from the secondary to the primary storage medium, the data in question are erased from the secondary storage medium.

As a usable rule on the transfer of SDMI disc content data, a maximum allowable number of check-out transfers is determined in advance. Illustratively, a given content data item may be checked out up to three times. That means the content data item of interest may be copied to a maximum of three SDMI-compliant secondary storage media. In the event of a check-in transfer, the existing check-out count is decremented by one regarding the checked-in content data item. For example, if a given content data item has been copied to three SDMI-compliant secondary storage media and if the data item is checked in from one of the media, then the data may be copied once more to another SDMI-compliant secondary storage medium. In other words, content data are allowed to reside simultaneously on up to three SDMI-compliant secondary storage media at any one time.

For SDMI network content data, relevant usage rules are also stipulated on their transfer. When the usage rules are met, the content data can be transferred to the SDMI-compliant recording/reproducing apparatus 20B for copying purposes (DP7).

As in the case of the transfer of SDMI disc content data, a maximum allowable number of check-out transfers is determined in advance for SDMI network content data. The maximum check-out count may be the same as that of SDMI disc content data or may be different. Illustratively, only one check-out transfer is permitted. That means a given content data item can be copied to one SDMI-compliant secondary storage medium alone at any one time. Once the content data item in question is checked in, the data item may be again transferred to another medium for another copy.

When SDMI content data are transferred to an SDMI-compliant secondary storage medium according to the usage rules above, the data are transferred in encrypted format over the transmission line. For example, the content data are transferred in the above-mentioned state of E(CK, A3D) or E(CK', A3D). Upon receipt of the encrypted SDMI content data, the SDMI-compliant recording/reproducing apparatus 20B copies the received data as encrypted to the secondary storage medium.

When reproducing copied SDMI content data from the secondary storage medium, the SDMI-compliant recording/reproducing apparatus 20B decrypts the retrieved content data prior to data reproduction. That is, the content data stored as E(CK, A3D) or E(CK', A3D) on the secondary storage medium are decrypted using the key CK or CK'.

In other words, the original content data are obtained in the form of ATRAC3 data (A3D) through the decryption process of D{CK, E(CK, A3D)}=A3D or D{CK', E(CK', A3D)}. The ATRAC3 content data thus acquired are decompressed illustratively into audio data that are reproduced and output as music.

The SDMI-compliant content data are placed under copyright protection through the copy management measures described above. That is, the data remain encrypted under the relevant usage rules when transferred over the data paths, checked out to the SDMI-compliant recording/reproducing apparatus 20B, and written to the secondary storage medium loaded in the apparatus.

Described below is what takes place where the recording/reproducing apparatus 20A is connected to the personal computer 1. Unlike the SDMI-compliant recording/reproducing apparatus 20B, the recording/reproducing apparatus 20A records decrypted data to the loaded secondary storage medium such as the Mini-disc. When recorded in decrypted format on the Mini-disc, the content data may be reproduced by ordinary Mini-disc players which have been widely marketed. This contributes significantly to the convenience of general users. On the other hand, recording content data in decrypted format can be detrimental to copyright protection. The potential abuse of the decrypted content data written to the recording/reproducing apparatus 20A is averted by requiring certain conditions to be met.

Illustratively, the transfer of SDMI network content data for decrypted copying to the secondary storage medium may be subjected to the following three conditions: (1) the recording/reproducing apparatus 20A should be properly authenticated; (2) the copyright holders concerned should give specific permission to let the transferred content data be copied; and (3) the relevant usage rules on check-out and check-in transfers should be met.

As long as the three transfer conditions above are met, the content data are transferred not to devices prone to unrestrained copying but to the SDMI-compliant recording/reproducing apparatus 20B alone so that the copyright protection function remains effective. Keeping the content data encrypted during transfer over the transmission line also ensures copyright protection (the data are decrypted by the recording/reproducing apparatus 20A).

When SDMI network content data are transferred to the recording/reproducing apparatus 20A, checks are made to see if the three transfer conditions described above are met (DP9). First, the recording/reproducing apparatus 20A is authenticated in a predetermined manner. The granting of permission to copy by the copyright holder is confirmed based on flag information or the like included in the content data. The relevant usage rules imposed on check-in and check-out transfers are then checked with regard to the content data.

When the three conditions above are met, the SDMI network content data are transferred in encrypted format over the transmission line to the recording/reproducing apparatus 20A. Illustratively, the content data are transferred in the above-mentioned state of E(CK, A3D) or E(CK', A3D).

Figure 7:
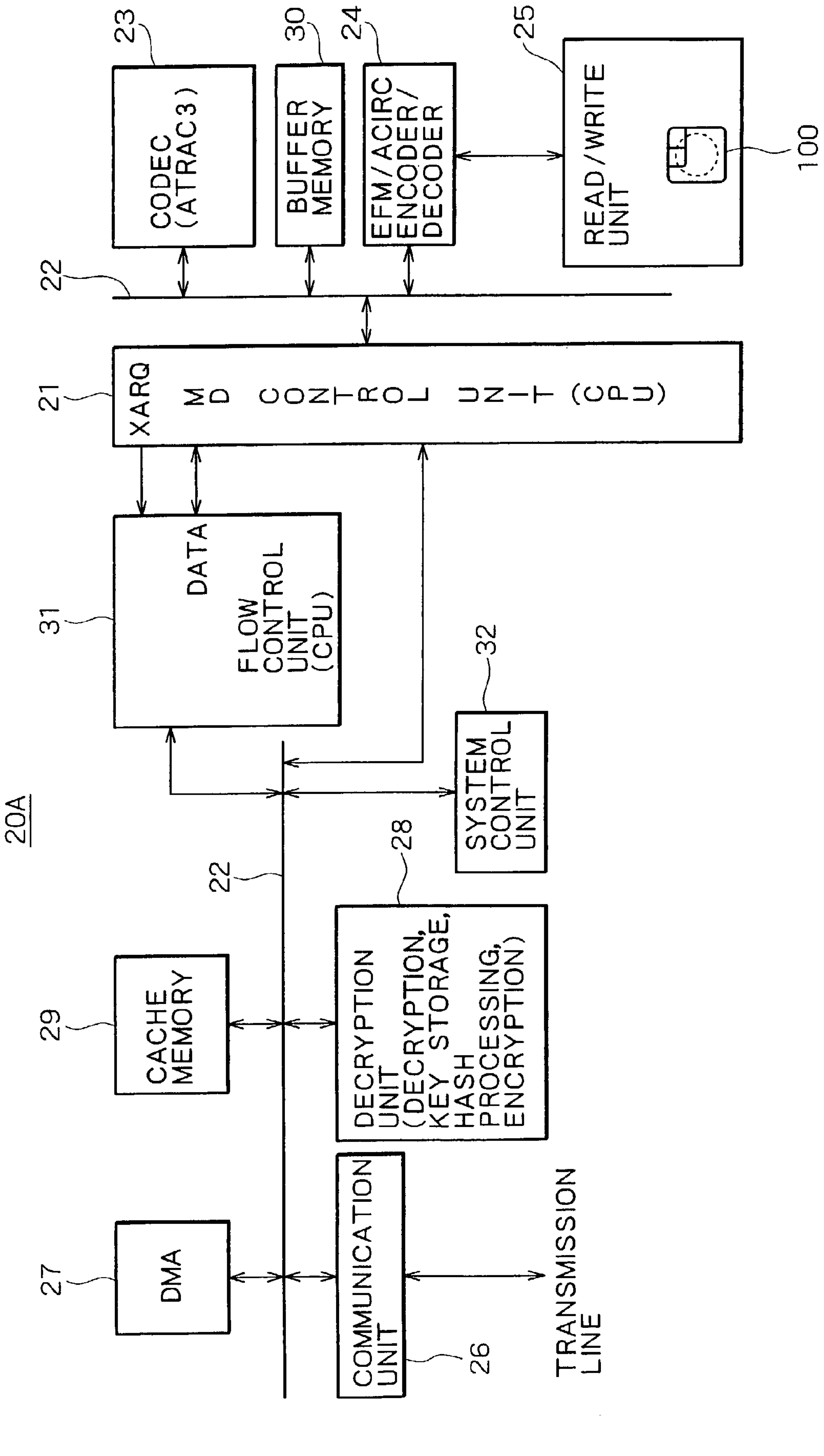
FIG. 7 is a block diagram of a secondary storage medium-handling apparatus in the embodiment.

The encrypted SDMI network content data are received by the recording/reproducing apparatus 20A (whose typical structure is shown in FIG. 7) and decrypted by a decryption unit 28 thereof to become, say, the original ATRAC3 compressed data (A3D). The decrypted content data are encoded by an encoder/decoder 24 (FIG. 7) before being fed to a read/write unit 25. In turn, the read/write unit 25 copies the decrypted data to a Mini-disc 100.

When the recording/reproducing apparatus 20A reproduces the copied SDMI content data from the Mini-disc 100, the data retrieved from the disc need only be decoded through the decoding processes of ordinary Mini-disc systems, such as EFM demodulation, ACIRC error correction, and decompression of ATRAC compressed data. This means that the Mini-disc 100 allows its copied data to be reproduced normally when loaded into an ordinary Mini-disc player. Users are thus able to enjoy music by having the ordinary SDMI-noncompliant Mini-disc player reproduce the copied SDMI network content data from the Mini-disc 100.

Needless to say, if any of the usage rule checks in DP7, DP8 or DP9 on the data paths of FIG. 5 fails and thus withholds permission to transfer content data, the data will not be transferred to the recording/reproducing apparatus 20A or 20B.

4. Typical Structure of the Data Transfer Apparatus (PC; Primary Storage Medium-equipped Apparatus)

Figure 6:
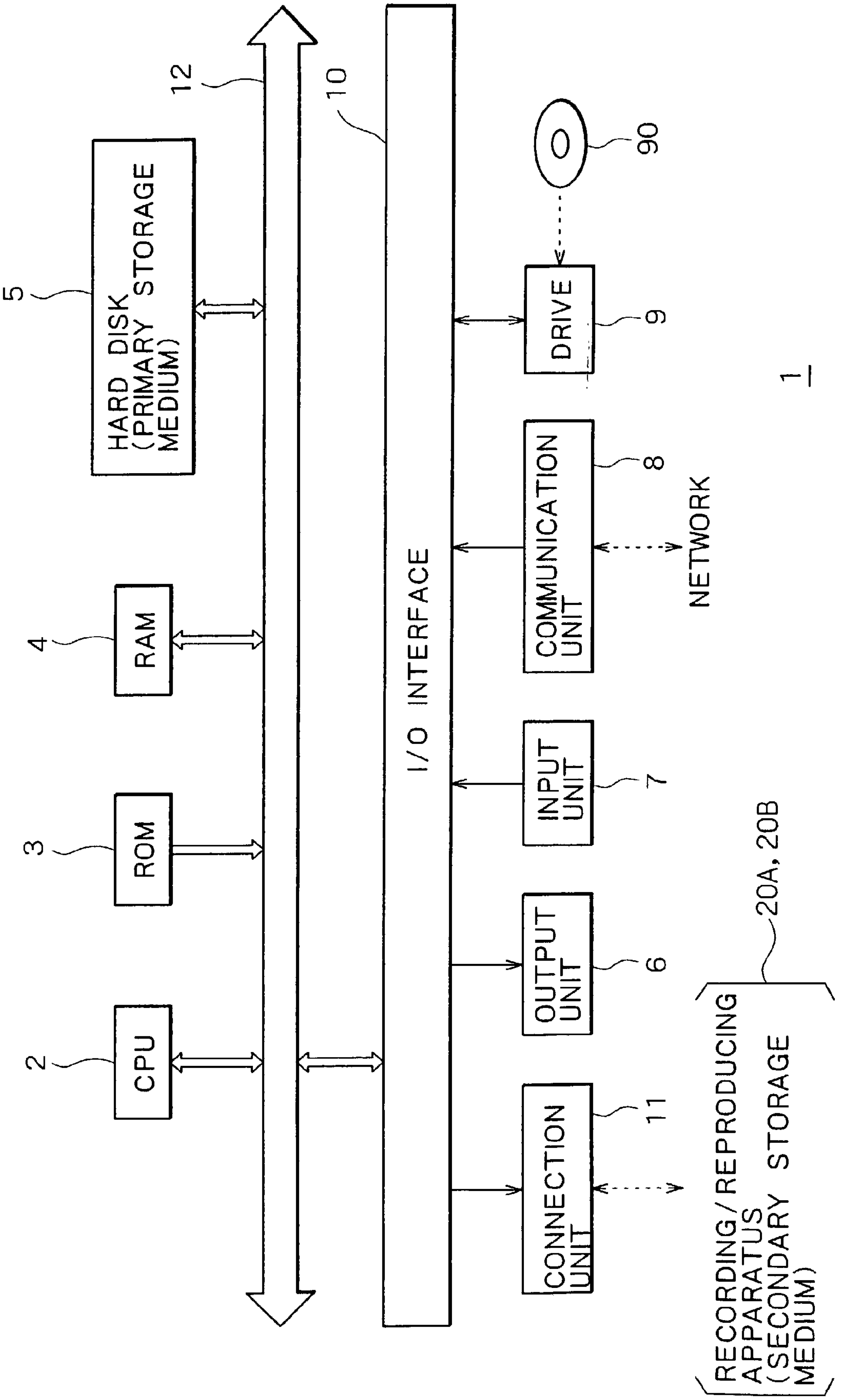
FIG. 6 is a block diagram of a primary storage medium-equipped apparatus in the embodiment.

FIG. 6 shows a typical structure of the primary storage medium-equipped apparatus 1 serving as a data transfer apparatus. Although this is an example of a personal computer constituting the primary storage medium-equipped apparatus 1, a similar structure having equivalent functions may be formed alternatively by dedicated hardware acting as an apparatus designed specifically for data transfer purposes.

In this example, software programs for implementing the functions of a data transfer apparatus are installed into the personal computer 1. This turns the PC into the primary storage medium-equipped apparatus serving as the data transfer apparatus. In this specification, the wording "personal computer (PC)" or "computer" refers extensively to general-purpose computers.

The relevant programs may be recorded in advance on the hard disc drive (HDD) 5 or in a ROM 3 incorporated in the PC as the storage medium. Alternatively, the programs may be placed (i.e., stored) temporarily or permanently on such removable storage media 90 as floppy disks, CD-ROMs (compact disc-read only memory), MO (magneto-optical) discs, DVDs (digital versatile disc), magnetic discs, or semiconductor memory. These removable storage media 90 may be offered to users as so-called package software.

Besides being installed from the above-mentioned removable storage media 90 into the computer, the programs may be transferred to the computer wirelessly from a download site via a digital satellite broadcast link or in wired fashion over a network such as a LAN (local area network) or the Internet. The computer may receive the transferred programs through its communication unit 8 and have them installed onto the HDD 5 inside.

The personal computer 1 in FIG. 6 incorporates a CPU (central processing unit) 2 connected to an I/O interface 10 via a bus 12. The user inputs commands through the I/O interface 10 by operating an input unit 7 made up of a keyboard, a mouse, and/or a microphone. In response to the input commands, the CPU 2 executes relevant programs held in the ROM (read only memory) 3. Alternatively, the CPU 2 loads into a RAM (random access memory) 4 the programs that reside on the HDD 5, the programs that were transferred via satellite or over the network and received by the communication unit 8 before being installed onto the HDD 5, or the programs that were retrieved from the removable storage medium 90 such as an optical disc in a drive 9 before being written to the HDD 5. In executing the loaded programs, the CPU 2 performs processes of the data transfer apparatus on SDMI content data, as will be described later.

Results of the processing by the CPU 2 are output illustratively from an output unit 6 made up of an LCD (liquid crystal display) and speakers, for example, through the I/O interface 10. The results are otherwise transmitted through the communication unit 8 or recorded to the HDD 5 as needed.

The communication unit 8 of this structure is capable of communicating with various servers via the network 110 shown in FIG. 4. That is, the computer 1 may download network content data such as music content from external content servers 91. The downloaded network content data are processed over the above-described data paths either as SDMI-compliant content data or SDMI-noncompliant content data. At least following the SDMI-compliant processing, the data are stored as SDMI-compliant content data onto the HDD 5. When thus accumulated on the HDD 5, the SDMI content data are subject to transfers either to the SDMI-compliant secondary storage medium-handling apparatus 20B or to an authenticated secondary storage medium-handling apparatus (recording/reproducing apparatus) 20A.

A connection unit 11 connects to the secondary storage medium-handling apparatus 20A or 20B in a manner enabling data communication therewith. Illustratively, the connection unit 11 may be a USB interface or an IEEE 1394 interface. Any other suitable wired or wireless interface using infrared rays, radio waves or other appropriate vehicle and based on relevant technical standards may also be used instead.

The processes for implementing the data paths as explained with reference to FIG. 5 need not be limited to those carried out on a time series basis alone; they may include processes that are conducted parallelly or individually (e.g., in parallel or object-oriented fashion).

The programs may be executed either by a single computer or by a plurality of computers in a distributed manner. The programs may also be transferred to a remotely located computer or computers for execution.

5. Typical Structure of the Data Recording Apparatus (Recording/reproducing Apparatus Handling the Secondary Storage Medium)

FIG. 7 shows a typical structure of the secondary storage medium-handling apparatus (recording/reproducing apparatus) 20A. This is an example where a Mini-disc recorder serves as the recording/reproducing apparatus 20A and where a Mini-disc (magneto-optical disc) is employed as the secondary storage medium 100. In the description that follows, the secondary storage medium 100 may be referred to as the Mini-disc 100 where appropriate.

FIG. 7 depicts only two processing blocks: one for writing and reading data to and from the Mini-disc as the secondary storage medium 100, the other for processing data transfers from the primary storage medium-equipped apparatus 1. Omitted from the view are the blocks for driving the Mini-disc, for servo control on the disc, and for data reproduction and output; the reason is that they are well-known blocks representative of the equivalent features and functions of ordinary Mini-disc recording/reproducing apparatuses.

In the recording/reproducing apparatus 20A, an MD control unit (CPU) 21 serves as a controller that controls recording and reproduction of data to and from the Mini-disc 100. More specifically, during data read or write operations to or from the Mini-disc 100, the MD control unit 21 controls revolution drive, spindle servo, focusing servo, tracking servo and sled servo; regulates laser beam and magnetic field application of an optical head and a magnetic head onto the disc, and controls encoding and decoding of the data being read or written.

The read/write unit 25 includes the optical head, magnetic head, a disc driving block, and a servo control block. This is a unit that actually writes and reads data to and from the Mini-disc 100.

The encoder/decoder 24 encodes data to be written to the Mini-disc and decodes data read from the disc. As is well known, the Mini-disc system subjects recordable data to encoding based on the ACIRC error correcting code and to EFM processing. Specifically, the encoder/decoder 24 subjects recordable data to ACIRC encoding and EFM encoding before supplying the encoded data to the read/write unit 25.

Upon data reproduction, the encoder/decoder 24 receives retrieved data from the read/write unit 25 and subjects the received data to such decoding processes as binarization, EFM demodulation, and the ACIRC error correcting process.

A buffer memory 30 buffers data that are written to or read from the Mini-disc 100. In particular, the buffer memory 30 provides a buffering feature known as the shock-proof function.

For recording of data, the buffer memory 30 temporarily accommodates recordable data that have been compression-coded by ATRAC/ATRAC3. The buffered data are read from the memory intermittently, i.e., in units of a predetermined amount of data. The retrieved data from the buffer memory 30 are fed to the encoder/decoder 24 for write operations.

For data reproduction, the buffer memory 30 temporarily retains data that have been retrieved from the Mini-disc 100 and decoded by the encoder/decoder 24. The buffered data are read out consecutively and subjected to compression decoding by a codec 23.

The codec 23 compresses and decompresses data by ATRAC/ATRAC3. Before being written to the Mini-disc 100, data are compressed by the codec 23 based on ATRAC/ATRAC3 and encoded as described above. If any data not compression-coded such as PCM audio data are input as recordable data to the recording/reproducing apparatus 20A, the codec 23 subjects the data in question to the ATRAC or ATRAC3 compression coding process. The data thus compressed are supplied to the encoder/decoder 24.

For data reproduction, data are retrieved from the disc by the read/write unit 25 and decoded by the encoder/decoder 24 The decoded data represent those compression-coded by ATRAC/ATRAC3, and are fed to the codec 23 through the buffer memory 30. In turn, the codec 23 decompresses the received data by ATRAC/ATRAC3 and thereby restores digital audio data quantized illustratively in 16 bits at 44.1 kHz. The digital audio data undergo such processes as D/A conversion, analog signal processing and amplification by output-related circuits, not shown, to become a speaker output signal that is reproduced illustratively as music. The digital audio data may alternatively be output unmodified to other devices.

The structure described so far is common to ordinary Mini-disc recording/reproducing apparatuses. What is particular about this recording/reproducing apparatus 20A is that it includes components addressing a personal computer constituting the primary storage medium-equipped apparatus 1. Specifically, the recording/reproducing apparatus 20A has a communication unit 26, a DMA 27, a decryption unit 28, a cache memory 29, a flow control unit 31, and a system control unit 32 as components for receiving and decrypting the content data transferred from the primary storage medium-equipped apparatus 1.

The system control unit 32 (CPU) provides overall control over the entire recording/reproducing apparatus 20A. Illustratively, the system control unit 32 gives instructions about communication with the personal computer 1 for authentication and about generation of data for use in the authentication, exchanges commands with the personal computer 1, and processes content data transferred from the computer. In conjunction with such control procedures, the system control unit 32 gives instructions to the MD control unit 21 for control over writing and reading of content data to and from the Minidisc 100 as well as on the retrieval and update of management information on the disc.

An operation unit and a display unit, although not shown, are provided as user interfaces. These components are also controlled by the system control unit 32, the operation unit being monitored and regulated for the user's operations, the display unit being controlled in terms of display details.

The communication unit 26 hooks up to the connection unit 11 of the personal computer 1 in FIG. 6. The hookup allows the unit 26 to exchange data with the computer 1. The communication unit 26 performs signal processing illustratively by USB or IEEE 1394 standards From the personal computer 1, the communication unit 26 receives various commands and SDMI content data.

The SDMI content data received by the communication unit 26 are placed into the cache memory 29 under control of the DMA (direct memory access) 27. Alternatively, data can obviously be moved to the cache memory 29 under control of the CPU, not of the DMA 27.

The decryption unit 28 is a component that addresses decryption processes regarding SDMI content data. Specifically, the decryption unit 28 decrypts encrypted content data held in the cache memory 29. When thus decrypted, the content data are moved to other areas in the same cache memory 29.

The SDMI content data, having been encrypted with the content key CK or CK', include at least information for allowing that key to be recognized. As will be discussed later in more detail, the DNK (device node key) mentioned in connection with FIG. 1 is retained by the recording/reproducing apparatus 20B as the information allowing the content key to be recognized. The apparatus 20B, which corresponds to one of the devices (DVx) in FIG. 1, possesses node keys and a root key as well as a leaf key constituting the DNK, the node and root keys being encrypted by use of the leaf key specific to the device in question. The decryption unit 28 recognizes the content key CK using the DNK or the above-mentioned EKB having been transmitted, depending on the circumstances.

When the decryption unit 28 retains the DNK as information allowing the content key CK to be recognized with regard to given SDMI content data, the unit 28 can decrypt the transmitted content data from their encrypted state such as E(CK, A3D) using the content key CK into ATRAC3 compressed data, through the decryption process of D{CK, E(CK, A3D)}=A3D. The ATRAC3 compressed data thus obtained are encoded by the encoder/decoder 24 before being written to the Mini-disc 100 by the read/write unit 25.

The SDMI content data may or may not be ATRAC3 compressed data in encrypted format. Alternatively, the SDMI content data may be linear PCM data encrypted using the content key C. For example, content data in the state of E(CK, PCM) may be transmitted and entered. In such a case, the decryption unit 28 obviously decrypts the input data to obtain linear PCM data through the decryption process of D{CK, E(CK, PCM)}=PCM. The PCM data are subjected to ATRAC3 compression by the codec 23, encoded by the encoder/decoder 24, and written to the Mini-disc 100 by the read/write unit 25.

The decryption unit 28 may further retain keys for use in authentication processes. In an example of authentication which will be described later, the decryption unit 28 utilizes a public key P and a secret key S held by the recording/reproducing apparatus 20A. These keys are also stored in the decryption unit 28. An encryption process is further carried out by use of the secret key S.

The decryption unit 28 comprises a hash engine that is used to generate content IDs through so-called hash function computations. How content IDs are generated will be described later in more detail.

Decrypted SDMI content data such as ATRAC3 compressed data or PCM data are transferred from the cache memory 29 to the flow control unit 31. The flow control unit 31 forwards the decrypted SDMI content data to the MD control unit 21 (part of the recording block) and from there to the codec 23, encoder/decoder 24, read/write unit 25 and buffer memory 30, preparatory to recording onto the Mini-disc 100. It is a request (XARQ) from the MD control unit 21 that prompts the flow control unit 31 to transfer the data to that unit 21. The flow control unit 31 provides timing adjustments between such processes as content data reception, decryption, and writing of data to the Mini-disc 100.

In the structure described above, SDMI content data sent from the personal computer 1 in the state of E(CK, A3D) or E(CK, PCM) are first decrypted back to ATRAC3 compressed data. The decrypted ATRAC3 compressed data are then encoded by the encoder/decoder 24 before being written to the Mini-disc 100 by the read/write unit 25.

During check-out or check-in transfers of content data or during other communication sessions, the personal computer 1 transmits various commands to the recording/reproducing apparatus 20A. These commands are received by the communication unit 26 and forwarded from there to the system control unit 32. Given the commands, the system control unit 32 performs various processes accordingly and causes the communication unit 26 to transmit responses to the personal computer 1.

6. Mini-disc Management Scheme

Data and management information recorded on the Mini-disc 100 will now be explained. Digital recording/reproducing systems such as the Mini-disc system record on a loaded storage medium what is known as TOC (table of contents) as management information for use in controlling data read and write operations to the medium. Before writing or reading data to or from the storage medium such as the disc, the recording/reproducing apparatus retrieves the TOC information from the medium and places the information into an internal memory. During the write or read operation, the recording/reproducing apparatus refers to the retained TOC information to determine appropriate locations to be accessed on the storage medium.

The Mini-disc has two kinds of TOC information: pit-recorded P-TOC (pre-mastered TOC) that is not rewritable, and U-TOC (user TOC) that is recorded in magneto-optical fashion and can be updated to reflect recorded or erased pieces of music or other data. The U-TOC information is first updated in an internal memory if any piece of data is recorded or erased. The updated data are then written to the U-TOC area on the disc in a suitably timed manner to update the U-TOC information held therein. The U-TOC information is designed to manage content data such as audio data in units called tracks on the disc. One track corresponds illustratively to one piece of music.

Figure 8:
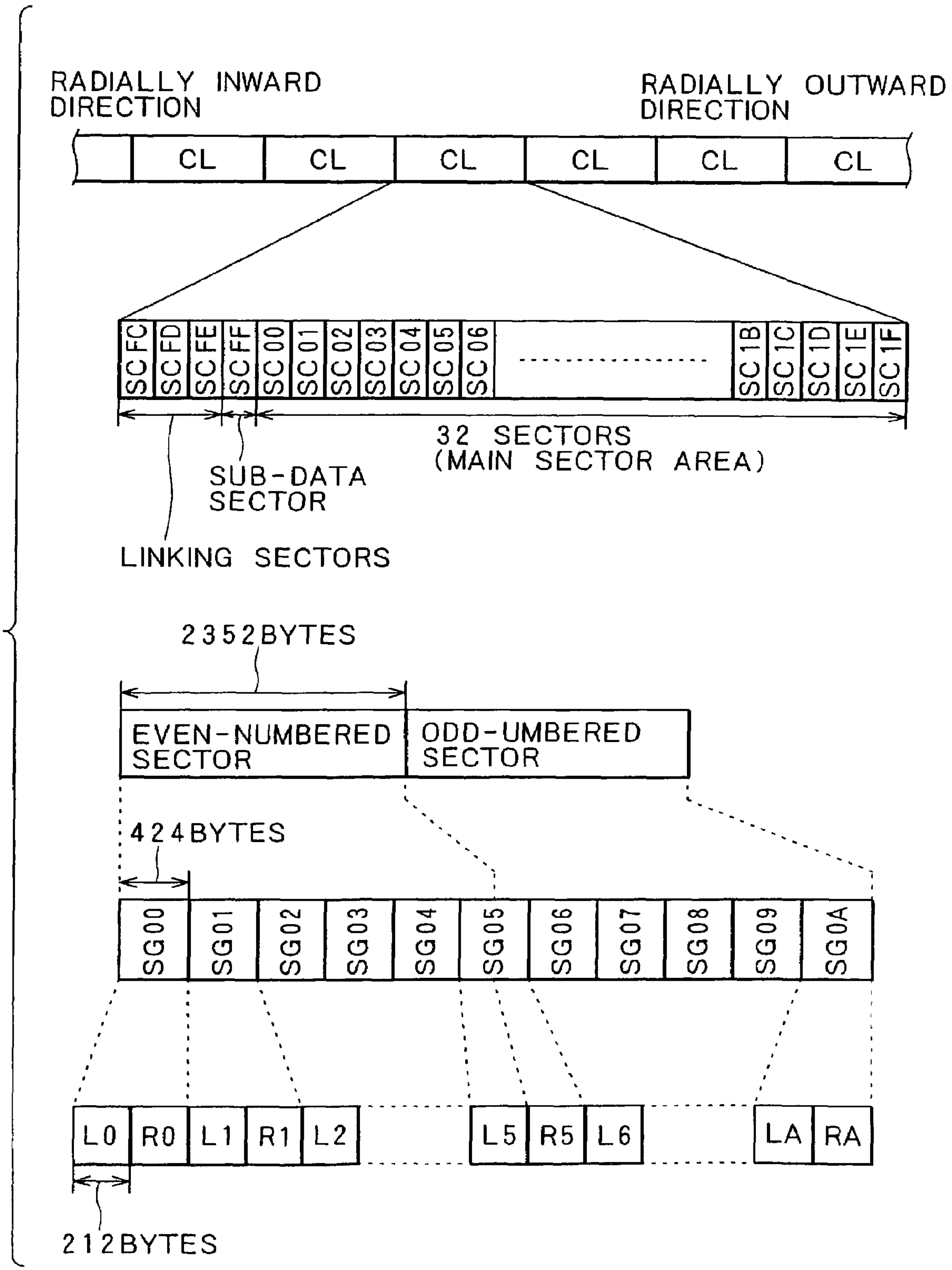
FIG. 8 is an explanatory view of a cluster format on the Mini-disc.

Data are recorded on the Mini-disc 100 in units called clusters that are explained below. The Mini-disc system generates a data stream made up of a series of recordable data units called a cluster each. A typical format of the cluster is depicted in FIG. 8. Clusters CL are formed consecutively as recording tracks on the Mini-disc as illustrated in FIG. 8, and each cluster serves as the minimum increment in which to record data.

Each cluster CL comprises three linking sectors SCFC through SCFE, one sub-data sector SCFF, and 32 main sectors SC00 through SC1F. That is, each cluster is constituted by 36 sectors. One sector represents a data unit of 2,352 bytes.

The linking sectors SCFC through SCFE are used as a buffer area between recordings or for other operation regulating purposes. The sub-data sector SCFF may be used to record information established as sub-data. TOC data and audio data are written to the 32 main sectors SC00 through SC1F.

The sectors are subdivided into units called sound groups. Specifically, two sectors are split into 11 sound groups. AS illustrated, two consecutive sectors (i.e., an even-numbered sector such as sector SC00 and an odd-numbered sector such as sector SC01) include sound groups SG00 through SG0A. Each sound group is composed of 424 bytes and accommodates audio data equivalent, to 11.61 msec. of acoustic output.

One sound group SG has data recorded on two separate channels: a left (L) channel and a right (R) channel. Illustratively, the sound group SG00 is made up of L channel data L0 and R channel data R0; the sound group SG01 is constituted by L channel data L1 and R channel data R1. A 212-byte area making up the L or R channel data area is called a sound frame.

Figures 9A, 9B:
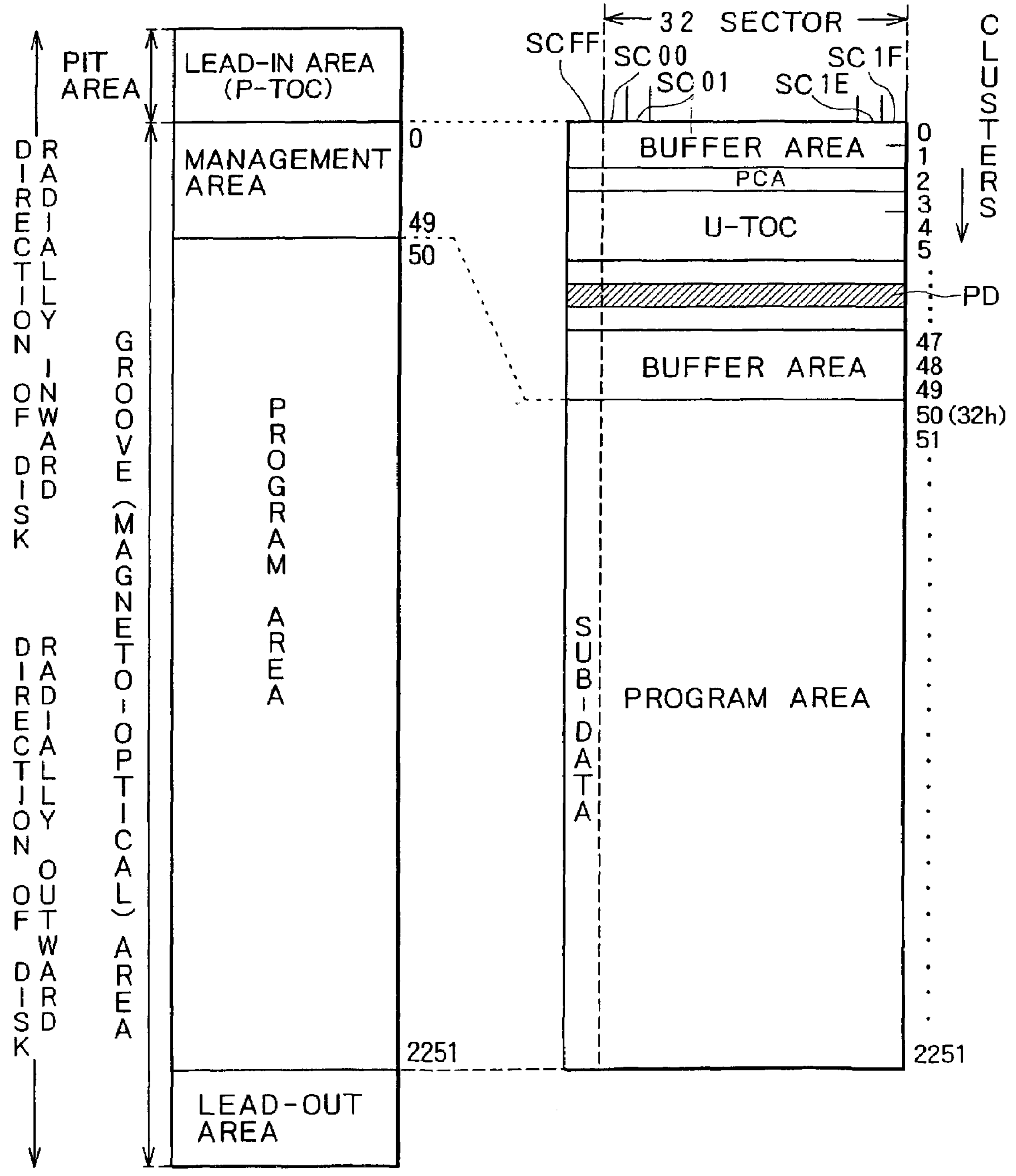
FIGS. 9A and 9B are explanatory views depicting an area structure of the Mini-disc.

FIGS. 9A and 9B show a typical area structure of the Mini-disc 100. FIG. 9A indicates the area ranging from the radially innermost side of the disc to the radially outermost side. As a magneto-optical disc, the Mini-disc 100 has on its radially innermost side a pit area in which read-only data are recorded by embossed pits. This is the area in which P-TOC information is recorded.

Radially outside the pit area is a magneto-optical area having grooves that serve as guide grooves for recording tracks. This is the area to and from which data may be written and read. Of this magneto-optical area, the radially innermost clusters 0 through 49 constitute a management area, and clusters 50 through 2,251 make up a program area in which actual pieces of music or other data are recorded, one piece to a track. Raidially outside the program area is a lead-out area.

FIG. 9B shows a more detailed view of the management area. In FIG. 9B, sectors are shown arranged horizontally and clusters laid out vertically. In the management area, clusters 0 and 1 constitute a buffer area with respect to the pit area. Cluster 2 serves as a power calibration area PCA that is used to calibrate the output power of a laser beam.

Clusters 3, 4 and 5 accommodate a U-TOC. The U-TOC, which will be described later in more detail, is arranged to stipulate a data format for each of 32 main sectors (SC00 through SC1F) making up each cluster. In the data format, relevant management information such as track addresses and free area addresses in the program area is recorded, along with track names and dates and times of recordings. These U-TOC data clusters are repeated three times in a row when recorded, i.e., to make up clusters 3, 4 and 5.

Clusters 47, 48 and 49 constitute a buffer area with regard to the program area. A portion PD shown shaded in FIG. 9B may be allocated as an area in which to write prepaid information, to be described later.

In the program area formed by cluster 50 (32h in hexadecimal notation) and subsequent clusters, each of the 32 main sectors (SC00 through SC1F) in each cluster accommodates audio data such as music data in compressed format called ATRAC. The recorded tracks (content data) and recordable areas are managed in accordance with the U-TOC. In the program area, as mentioned above, the sector SCFF of each cluster may be used to record information set aside as sub-data.

The U-TOC sectors will now be described by referring to FIG. 10. The P-TOC, as discussed with reference to FIGS. 9A and 9B, is formed in the pit area on the radially innermost side of the disc 90 and accommodates read-only information. The P-TOC is used to manage locations in the recordable area of the disc (i.e., recordable user area), read-out area, and U-TOC area. On a read-only optical disc where all data are recorded in pits, it is possible to manage pieces of music or other data retained in a ROM format through the use of the P-TOC of the disc. In that case, the disc has no U-TOC formed thereon. The P-TOC will not be discussed further in the ensuing description.

FIG. 10 shows a typical format of U-TOC sector 0. The U-TOC sectors may range from sector 0 up to sector 32. These recordable sectors correspond to the main sectors SC00 through SC1F in one cluster, as discussed above. Sectors 1 and 4 constitute an area for recording character information, while sector 2 serves as an area for accommodating dates and times ok recordings. These sectors 1, 2 and 4 will not be described further.

U-TOC sector 0 constitutes a data area in which to record management information about the recorded content data (tracks) such as music and about free areas, i.e., areas where more content data can be recorded. For example, if a piece of music is to be recorded to the Mini-disc 100, the MD control unit 21 finds a free area on the disc by referencing U-TOC sector 0 and writes the data to that area. Upon data reproduction, the MD control unit 21 checks U-TOC sector 0 to find the area where the piece of music to be reproduced is stored and gains access to that area for playback.

In FIG. 10, the data area of U-TOC sector 0 (4 bytes×588=2,352 bytes) has a synchronizing pattern formed by one-byte data blocks each made up of 0's or 1's at the beginning of the sector. The starting data blocks are followed by three bytes that accommodate cluster addresses (H and L) and a sector address, supplemented by one byte of mode information. These portions make up a header. The three-byte address segment provides the address of the sector itself.

The header having a synchronizing pattern and addresses recorded therein is structured in the manner described above not only for U-TOC sector 0 but also for the sectors of the P-TOC sector and program area. For each sector, the header records the address of the sector in question and its synchronizing pattern.

Then such data as a maker (manufacturer) code, a model code, a first track number (first TNO), a last track number (last TNO), sector use status (used sectors) a disc serial number, and a disc ID are written to appropriate byte locations.

There is also provided a pointer area in which to record various pointers (P-DFA, P-EMPTY, P-FRA, P-TN01 through P-TN0255). These pointers are used to make the user-recorded tracks (e.g., pieces of music) and free areas correspond to a table area, to be described later, for identification purposes.

The table area is constituted by 255 part tables (01h through FFh) corresponding to the pointers P-DFA through P-TN0255. Each part table accommodates a start and an end address of a given part of a track as well as mode information (track mode) about the part in question. Because a part indicated by a given part table may continue successively to another part, each part table can accommodate link information denoting the part table containing the start and end addresses of the part to be linked. A part refers to that portion of a track in which temporally continuous data are recorded in a physically continuous manner.

The start and end addresses designate one or a plurality of parts constituting a single piece of music (track). These addresses are each given in a shortened form designating a cluster, a sector and a sound group.

This type of recording/reproducing apparatus has no trouble reproducing one piece of music (track) from a plurality of physically discontinuous parts by accessing one part after another in seamless fashion. In view of that capability, each piece of music recorded by the user can be written to multiple separate parts so as to utilize the recordable area efficiently.

The above-mentioned link information is provided so that numbers (01h through FFh) assigned to part tables allow the relevant tables to be designated and linked. In the table area of U-TOC sector 0, one part table represents one part. Illustratively, for a piece of music formed by three linked parts, the locations of the parts involved are managed by use of three part tables connected by appropriate link information.

In practice, link information in U-TOC sector 0 is indicated by values of byte positions obtained through a suitable computation. More specifically, a given part table may be designated through a computation "304+(link information)×8 (byte locations)."

In the table area of U-TOC sector 0, the part tables 01h through FFh have their contents indicated by the pointers (P-DFA, P-EMPTY, JP-FRA, P-TN01 through P-TN0255) in the pointer area, in the manner described below.

The pointer P-DFA indicates a defective area on the magneto-optical disc 90. That is, the pointer P-DFA designates one part table or the first of a plurality of part tables indicating a track or tracks (parts) constituting a scratched or otherwise damaged area. If there exists a defective part, the pointer P-DFA designates one of the part tables 01h through FFh; the designated part table indicates the defective part using a start and an end address thereof. If there are more defective parts involved, the first part table has link information designating other part tables that indicate the defective parts. If no other defective part is present, the link information of the part table illustratively contains 00h indicating no further link.

The pointer P-EMPTY indicates one part table or the first of a plurality of part tables not used in the table area. If there exits an unused part table, the pointer P-EMPTY designates one of the part tables 01h through FFh as the part table in question. If there exist a plurality of unused part tables, they are specified successively by use of suitable link information starting from the part table designated by the pointer P-EMPTY. All unused part tables are thus linked in the table area.

The pointer P-FRA indicates a free area (including erased regions) on the magneto-optical disc 90 to which data may be written. The pointer P-FRA designates one part table or the first of a plurality of part tables indicating a track or tracks (parts) constituting a free area. If there exists a free area part, the pointer P-DFA designates one of the part tables 01h through FFh; the designated part table indicates the free area part using a start and an end address thereof. If there are multiple free area parts, the first part table has link information designating other part tables consecutively, up to the one having the link information 00h.

Figure 11:
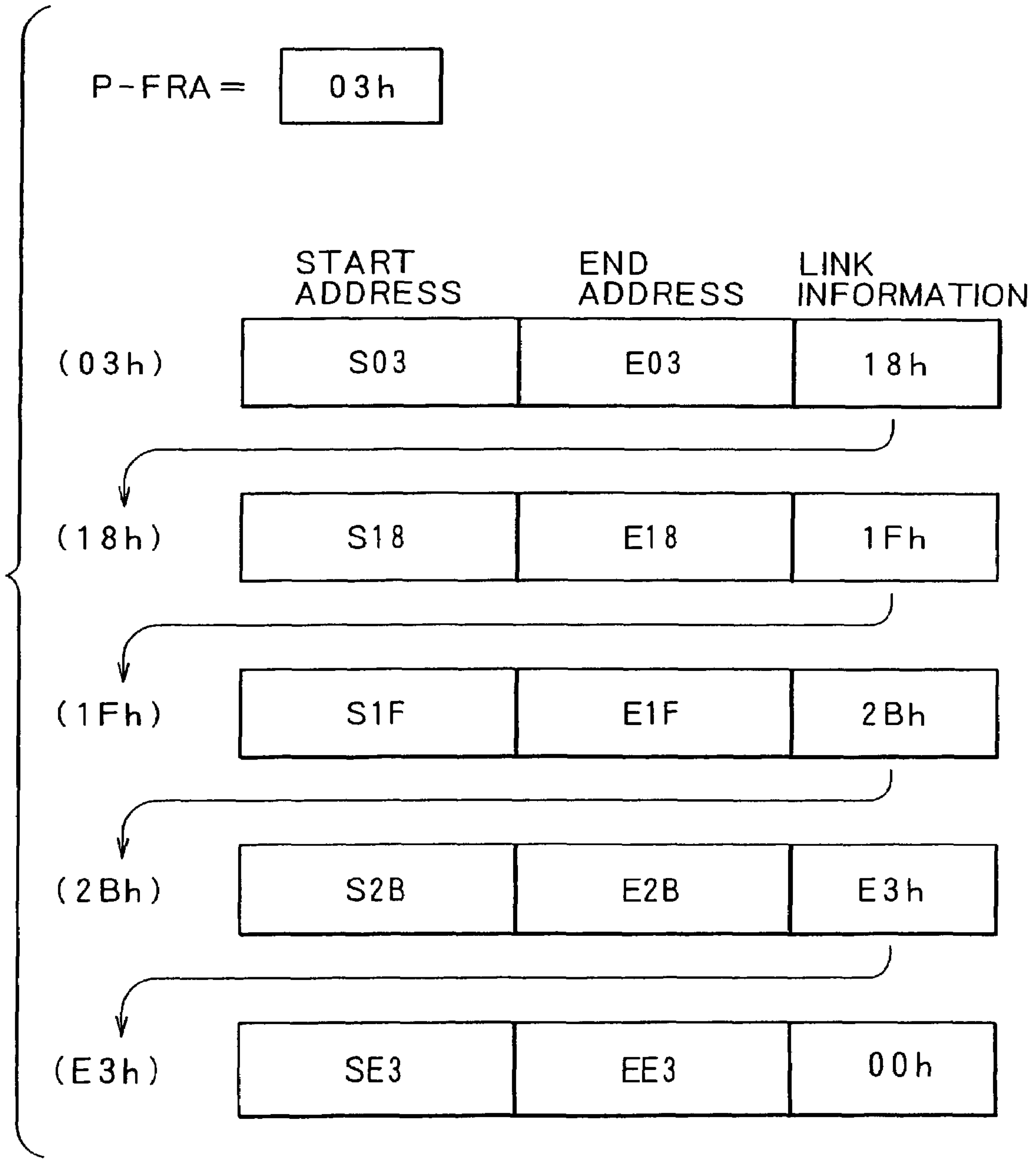
FIG. 11 is an explanatory view of a link structure in U-TOC sector 0 for the Mini-disc system.

FIG. 11 schematically shows how free area parts are managed using part tables. What is shown here is a state where parts 03h, 18h, 1Fh, 2Bh and E3h constitute a free area and are indicated as such by link information attached to the corresponding part tables. Defective areas and unused part tables are also managed in the same manner.

The pointers P-TN01 through P-TN0255 indicate tracks on which the user has made recordings. Illustratively, the pointer P-TN01 designates a part table showing one part or the earliest of a plurality of parts on which first track data are recorded. If the first piece of music recorded to make up the first track is accommodated continuously, i.e., stored along a single uninterrupted part, the recording area of the first track is identified by the start and end addresses in the part table indicated by the pointer P-TN01.

If a second piece of music recorded as the second track is dispersed over a plurality of parts on the disc, these parts are designated in a temporally sequential manner. Specifically, the part table designated by the pointer P-TN02 specifies with link information a temporally ensuing part table which in turn specifies, also using link information, another temporally subsequent part table and so on, until the part table having link information 00h is reached (in the same manner as shown in FIG. 11).

As described, where the parts accommodating the data making up the second piece of music are all designated sequentially, the data in U-TOC sector 0 may be used to gain access to any of the dispersed parts for a write or read operation thereto or therefrom. In other words, it is possible to retrieve music data continuously from the discontinuous parts or to write the data thereto in a manner making an optimally efficient use of the recordable area.

Each part table records one-byte track mode information. The byte constitutes track attribute information. If the eight bits making up the byte are identified by reference numerals d1 (MSB) through d8 (LSB), the track mode is defined by the one-byte information as follows:

d1 . . . 0: write permitted; 1 write protected (no overwrite, no edit)
d2 . . . 0: copyrighted; 1: not copyrighted
d3 . . . 0: original; 1: copy of at least first generation
d4 . . . 0: audio data; 1: undefined
d5, d6 . . . 01: normal audio; otherwise: undefined
d7 . . . 0: monaural; 1: stereo
d8 . . . 0: emphasis off; 1: emphasis on On the rewritable magneto-optical disc 90, as described, disc area management is effected by use of the P-TOC while recorded pieces of music in the recordable user area and free areas are managed by means of the U-TOC. It will be appreciated that the U-TOC is structured so that recorded tracks on the Mini-disc 100 are divided, combined or otherwise edited by simply rewriting the U-TOC.

When the Mini-disc 100 is loaded into the read/write unit 25 of the recording/reproducing apparatus 20A, the MD control unit 21 of the apparatus 20A first reads TOC data and puts the retrieved U-TOC data into a specific area of the buffer memory 30. The data thus held are referenced during subsequent write, read, and edit operations on the Mini-disc 100.

Where content data are recorded (to tracks) or where recorded tracks are edited, the U-TOC data in the buffer memory 30 are first updated to reflect the change. The updated U-TOC data are then written from the buffer memory 30 to the Mini-disc 100 for update in a suitably timed manner.

7. Authentication Process

As mentioned in connection with the SDMI data paths, the recording/reproducing apparatus 20A must be authenticated by the personal computer 1 as a precondition for accepting check-out transfers of decrypted content data to be recorded to the Mini-disc 100. Authentication is a process whereby the recording/reproducing apparatus 20A is recognized as a legitimate device for recording unencrypted content data.

The authentication process is carried out whenever a recording/reproducing apparatus other than the SDMI-compliant recording/reproducing apparatus 20B is connected to the connection unit 11 of the personal computer 1. When the SDMI-compliant recording/reproducing apparatus 20B is connected, the personal computer 1 checks to see if the hooked-up apparatus is actually SDMI-compliant. If the connected apparatus is not judged to be the SDMI-compliant recording/reproducing apparatus 20B, then the authentication process is conducted to see whether the apparatus is the recording/reproducing apparatus 20A. A typical procedure of the authentication process is described below.

The authentication process here involves the use of an asymmetric cipher-based authentication scheme (i.e., public key encryption scheme). In an asymmetric cipher setup, an encryption key is made different from a decryption key. If reference characters Db stand for unencrypted data, Ke for an encryption key and Kd for a decryption key, then the data Db are encrypted through an encryption process of C=E(Ke, Db) to become data C, and the encrypted data C are decrypted through a decryption process of D(Kd, C)=Db to return to the unencrypted data Db.

The encryption key Ke and decryption key Kd constitute a key pair. One of the paired keys is disclosed as a public key and the other is stored at an appropriate location as a secret key. Of the paired keys, the public key is denoted by P and the secret key by S in the ensuing description of the authentication process. In this setup, as mentioned above, the recording/reproducing apparatus 20A retains in its decryption unit 28 (or system control unit 32) the public key P and secret key S which will serve as the encryption key Ke and decryption key Kd.

Figure 12:
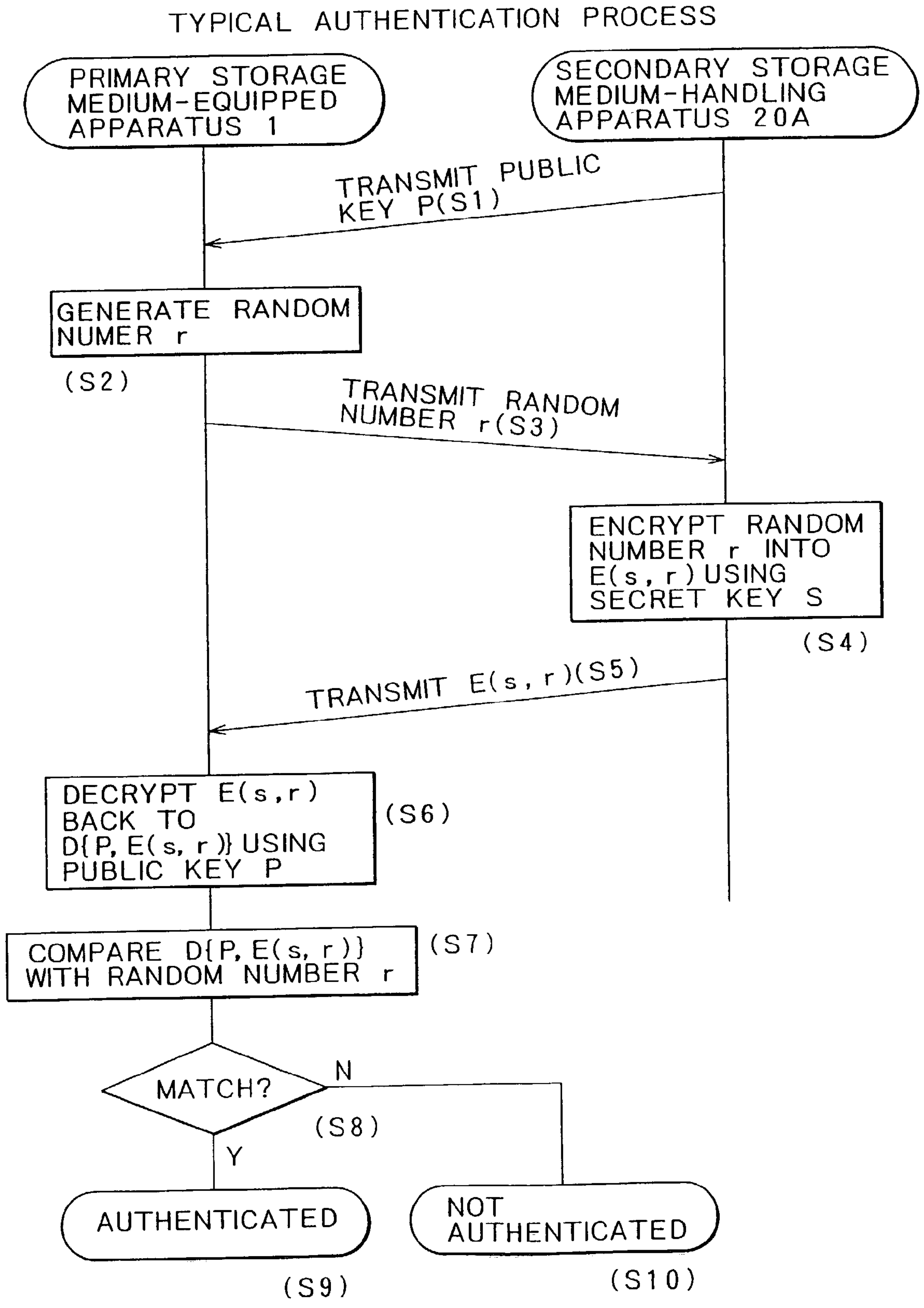
FIG. 12 is a flowchart of steps constituting an authentication process of the embodiment.

For authentication, the CPU 2 of the primary storage medium-equipped apparatus (personal computer) 1 first transmits an authentication request command to the system control unit 32 of the secondary storage medium-handling apparatus 20A. Then steps shown in FIG. 12 are carried out between the CPU 2 of the personal computer 1 (i.e., primary storage medium-equipped apparatus) and the system control unit 32 of the recording/reproducing apparatus 20A (i.e., secondary storage medium-handling apparatus).

When the authentication process is started, the system control unit 32 of the secondary storage medium-handling apparatus 20A reaches step S1 and causes the communication unit 26 to transmit the public key P from the decryption unit 28 to the primary storage medium-equipped apparatus 1. The public key P is also known to the primary storage medium-equipped apparatus 1. It follows that if the two apparatuses can verify the coincidence of their public keys P, step S1 need not be carried out.

Upon receipt of the public key P, the CPU 2 of the primary storage medium-equipped apparatus 1 goes to step S2 and generates a random number r. In step S3, the CPU 2 transmits the generated random number r to the secondary storage medium-handling apparatus 20A.

In step S4, the system control unit 32 of the secondary storage medium-handling apparatus 20A receives the random number r and encrypts the received number using the secret key S held in the decryption unit 28. In step S5, the system control unit 32 transmits the encrypted data E(S, r) to the primary storage medium-equipped apparatus 1.

Upon receipt of the encrypted data E(S, r), the CPU 2 of the primary storage medium-equipped apparatus 1 reaches step S6 and decrypts the encrypted data E(S, r) using the public key P, i.e., through a decryption process of D{P, E(S, r)}. In step S7, the CPU 2 compares the random number r generated in step S2 with the decrypted data D{P, E(S, r)} from step S6. If the public key P and secret key S constitute a legitimate key pair, the result of the comparison should be r=D{P, E(S, r)}.

In case of a match in the comparison, the secondary storage medium-handling apparatus 20A is judged to retain the secret key S corresponding to the public key P. In that case, step S8 is followed by step S9 in which the secondary storage medium-handling apparatus 20A is authenticated as a legitimate apparatus.

If the result of the comparison is a mismatch, then step S8 is followed by step S10. In step S10, the secondary storage medium-handling apparatus is rejected as an illegal apparatus (i.e., to which SDMI content data cannot be transferred).

When the connected apparatus is authenticated to be a legitimate secondary storage medium-handling apparatus 20A by the authentication process above, then the primary storage medium-equipped apparatus 1 recognizes fulfillment of one of the conditions for qualifying the connected apparatus as a legitimate device to which to transfer SDMI content data.

8. Content Encryption Scheme

In the inventive system, the recording/reproducing apparatus 20A or 20B corresponds to one of the bottom-layer nodes in FIG. 1. The encryption structure shown in FIG. 1 is implemented by this system illustratively as described below.

Figure 13:
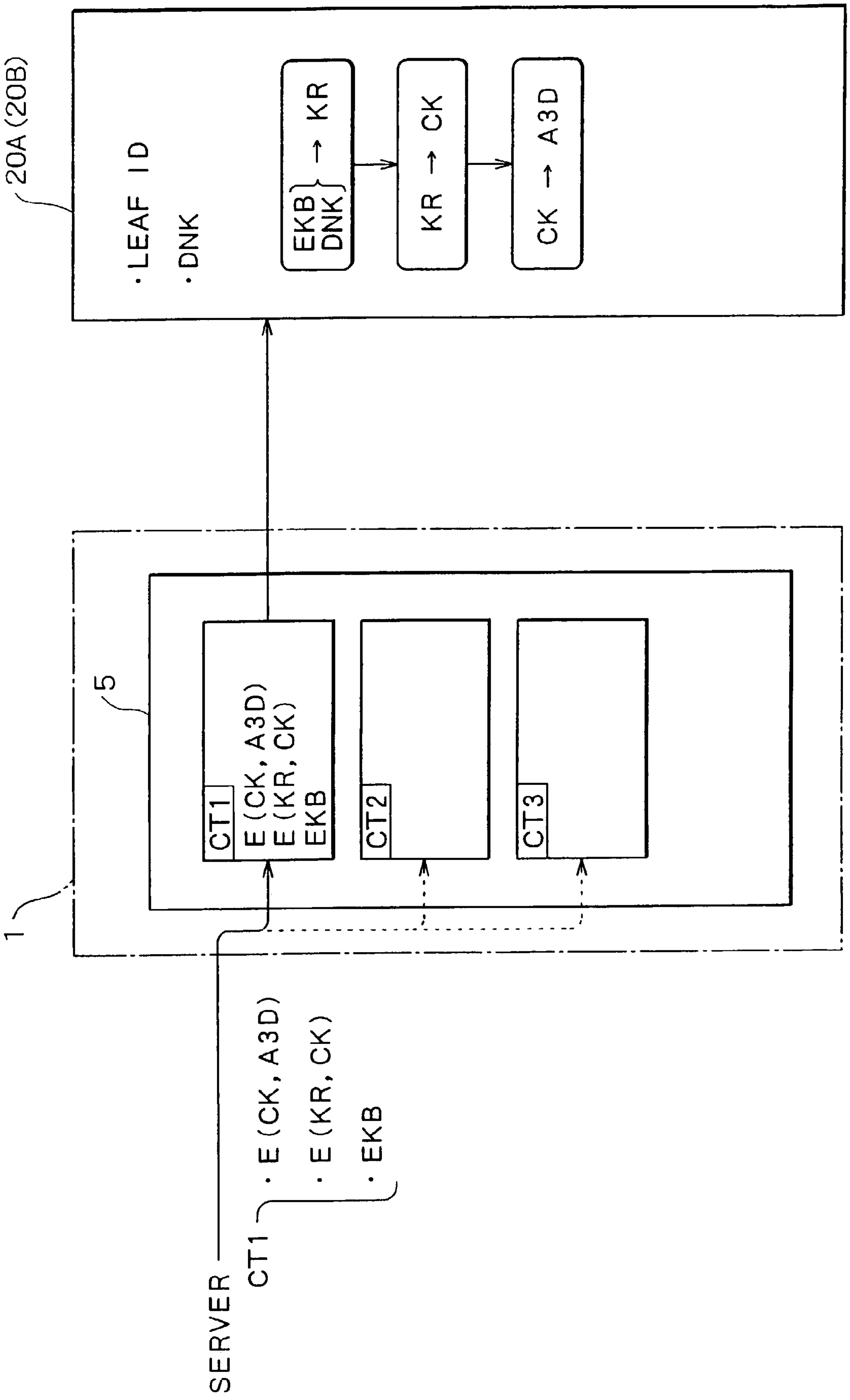
FIG. 13 is an explanatory view illustrating how content data are distributed, transferred and encrypted by the embodiment.

FIG. 13 indicates a flow of content data and keys. When a given content data item CT1 is distributed from an external server 91 to the personal computer 1, that content data item CT1 is fed and stored onto the HDD 5 in the form of E(CK, A3D), E(KR, CK) and EKB. E(CK, A3D) represents ATRAC3 compressed content data encrypted by use of a content key CK. The content data make up main data such as music or other kinds of data. E(KR, CK) denotes the content key CK which is intended for content data decryption and which has been encrypted using the root key KR described in connection with FIG. 1. EKB stands for enabling key block information discussed in connection with FIGS. 1, 2A, 2B and 3. For this embodiment of the invention, the EKB constitutes information needed to update the root key KR.

The above-described kinds of data are distributed in the form of a set every time a given content data item is delivered. As shown in FIG. 1, content data items CT1, CT2, etc., are stored on the HDD 5 as data sets.

When the personal computer 1 transfers content data to the recording/reproducing apparatus 20A or 20B, E(CK, A3D), E(KR, CK) and EKB are transmitted as a set using suitable steps. The recording/reproducing apparatus 20A or 20B corresponding to one of the devices (terminals) in FIG. 1 is assigned a unique leaf ID and retains a DNK (device node key).

Upon receipt of the content data set from the personal computer 1, the encrypted content data in the set are decrypted or left unchanged when written to or read from the secondary storage medium by the apparatus 20A or 20B. More specifically, the content data are decrypted either when reproduced from the medium of the SDMI-compliant recording/reproducing apparatus 20B, or when written to the medium of the SDMI-noncompliant recording/reproducing apparatus 20A.

The decryption process involves first decrypting the root key KR using both the DNK that is held by the apparatus and the EKB that has been transmitted. The content key CK is decrypted by utilizing the root key KR that has now been decrypted. The decrypted content key CK is then used to obtain the unencrypted content data A3D.

Figures 14A, 14B:
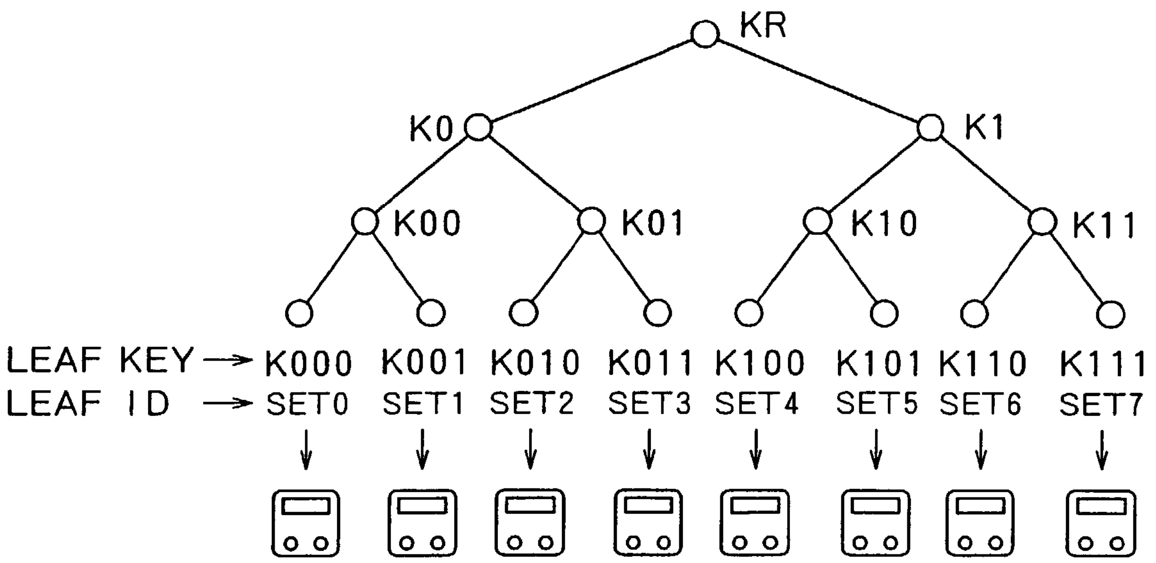
FIGS. 14A and 14B are explanatory views showing how encryption is carried out with a device node key (DNK) by the embodiment.

The DNK and the decryption procedure for the recording/reproducing apparatus 20A will now be described by referring to FIGS. 14A, 14B and 15. Suppose that the keys constitute a tree structure shown in FIG. 14A and that a leaf ID SET0 and a leaf key K000 are allocated to the recording/reproducing apparatus 20A. In such a case, the DNK stored in the apparatus 20A has information which is listed in FIG. 14B. That is, the leaf ID is retained as SET0, the leaf key as K000. What is stored here is information that defines a path ranging from the leaf identified by the roof key K000 to the root key KR of the tree structure in FIG. 14A. In other words, the node keys K00, K0 and the root key KR are stored. It should be noted that the node keys K00, K0 and root key KR are encrypted using the leaf key K000 when stored. As shown in FIG. 14B, the keys are actually stored as E(K000, K00), E(K000, K0) and E(K000, KR).

The DNK thus stored allows the recording/reproducing apparatus 20A to decrypt the transferred content data E(CK, A3D) through the use of the transferred key E(KR, CK). More specifically, the recording/reproducing apparatus 20A first obtains the root key KR by decrypting D{K000, E(K000, KR)} using the leaf key K000. The content key CK is then acquired by decrypting D{KR, E(KR, CK)} using the decrypted root key KR. Thereafter, the unencrypted content data A3D are obtained by decrypting D{CK, E(CK, A3D)} using the decrypted content key CK.

As described above, the root key KR and node keys do not remain unchanged; they may be varied depending on diverse factors. In a system such as this where the content key CK is encrypted using the root key KR before being transferred, the root key KR could be changed every time a different content data item is handled. For example, a music provider may change the root key KR with regard to each content data item for better copyright protection. In that case, an EKB is transmitted simultaneously as described above so that the changed root key KR is verified with each legitimate device.

Suppose now that content data E(CK, A3D) are transmitted along with an EKB and a content key E(KR', CK) encrypted using an updated root key KR', and that the EKB includes data E(K0, KR') as the updated root key KR', encrypted using the node key K0. The updates root key KR' is encrypted using the node key K0 illustratively when the new root key KR' is reported to devices SET0 through SET3 alone in FIG. 14A. Obviously, if the devices SET0 and SET1 need only be notified of the new root key, they may be given an EKB containing data E(K00, KR') representing the updated root key KR' encrypted using the node key K00.

On the other hand, as described with reference to FIG. 14B, the DNK of the recording/reproducing apparatus 20A retains the leaf key K000, as well as E(K000, K00), E(K000, K0) and E(K000, KR) as the root and node keys encrypted using the leaf key K000. Steps (1) through (4) in FIG. 15 show how the content data A3D are decrypted given the keys above.

(1) When the data E(K0, KR') are transmitted as the EKB, the node key K0 is first obtained using the DNK. More specifically, the node key K0 is acquired through a decryption process of K0=D{K000, E(K000, K0)} using the leaf key K000.

(2) The node key K0 thus obtained is used to decrypt E(K0, KR') in the EKB. That is, the updated root key KR' is gained through a decryption process of KR'=D{K0, E(K0, KR')}.

(3) The updated root key KR' thus decrypted is used to decrypt the transmitted content key E(KR', CK). Specifically, the content key CK is obtained through a decryption process of CK=D{KR', E(KR, CK)}.

(4) The decrypted content key CK is used to acquire the unencrypted content data A3D through a decryption process of A3D =D{CK, E(CK, A3D)}.

By carrying out the steps above, the recording/reproducing apparatus 20A decrypts the transferred content data and writes the decrypted data to the Mini-disc 100 loaded therein. Where the recording/reproducing apparatus 20B is to reproduce encrypted content data from the secondary storage medium, the apparatus 20B performs the steps above to decrypt the encrypted data for reproduction of music or other data.

9. Commands

Various control commands and responses to these commands are exchanged between the personal computer 1 (primary storage medium-equipped apparatus) and the recording/reproducing apparatus 20A or 20B (secondary storage medium-handling apparatus) during communication sessions therebetween for check-out or check-in transfers and other operations. Of these commands, only those directly related to operations specific to this system will now be described. Such specific operations will be described later.

FIG. 16 shows a typical format of a check-out control command, and FIG. 17 indicates a typical format of a check-out response command. The check-out control command is constituted by 25 bytes and the check-out response command by 17 bytes. The personal computer 1 issues an appropriate check-out control command to the recording/reproducing apparatus 20A (20B) so that the apparatus will have reproduction rights to actually reproduce content data transferred thereto from the PC through a check-out communication session. Upon receipt of the check-out control command, the recording/reproducing apparatus 20A (20B) performs processing correspondingly and returns a relevant checkout response command to the personal computer 1.

The check-out control command, as shown in FIG. 16, has an operation code specifying "check out," along with data bits designating "result" (of communication), "list ID" (ID code of the apparatus to communicate with), "object position number" (track number of the checked-out content data on the side of the secondary storage medium) and "DES CBC(Ks, 0)" (representing an encryption session key).

The check-out response command, as depicted in FIG. 17, has an operation code specifying "check out," together with data bits designating "result" (of communication), "list ID" (ID code of the apparatus to communicate with), and "object position number" (track number of the checked-out content data on the side of the secondary storage medium).

FIG. 18 shows a typical format of a record object control command made up of 30 bytes, and FIG. 19 illustrates a typical format of a record object response command composed of 62 bytes. The record object control command is issued by the personal computer 1 to the recording/reproducing apparatus 20A (20B) illustratively during a communication session for a check-out transfer. The command provides the apparatus 20A (20B) with information about actual content data to be transferred.

Given the record object control command, the recording/reproducing apparatus 20A (20B) performs processes reflecting the reported information. In turn, the apparatus 20A (20B) transmits a check-out response command to the personal computer 1. The apparatus 20A generates a content ID using part of the transferred content data, as will be discussed later. The generated content ID may be reported to the personal Computer 1 using the record object response command.

The record object control command, as shown in FIG. 18, has an operation code specifying "record object," along with data bits designating "result" (of communication), "destination list ID" (ID code of the apparatus to communicate with), "new object position number" (track number of the checked-out content data on the side of the secondary storage medium), "content type" (of content data), "download format track attribute" (content data format on the side of the primary storage medium), "track mode" (content attribute for the secondary storage medium), "content size" (data length of content data), and "bulk data size" (of content data).

The content data format (i.e., download format track attribute) on the side of the primary storage medium is made up of information about the compression standard and bit rate of the target content data which are held on the HDD 5 and which are to be transmitted, and about the compression standard and bit rate of the content data in effect when they are placed onto the transmission line.

The content attribute (track mode) for the secondary storage medium is constituted by attribute information such as the compression standard specified for recording to the Mini-disc 100, stereo or monaural designation, and others. The compression standard may illustratively be any one of ATRAC, ATRAC3 of 132 kbps, and ATRAC3 of 66 kbps.

Similarly, the record object response command, as shown in FIG. 19, has an operation code specifying "record object," together with data bits designating "result" (of communication), "destination list ID" (ID code of the apparatus to communicate with), "new object position number" (track number of the checked-out content data on the side of the secondary storage medium), "content type" (of content data), "download format track attribute" (content data format on the side of the primary storage medium), "track mode" (content attribute for the secondary storage medium), "content size" (data length of content data), and "bulk data size" (of content data). Included specifically in the response command is an area for accommodating a content ID computed by the recording/reproducing apparatus 20A as 32-byte session data, the area thus supplying the personal computer 1 with the content ID information. The content ID will be discussed later in more detail.

FIG. 20 shows a typical format of a check-in control command, and FIG. 22 indicates a typical format of a check-in response command. The check-in control command is constituted by 17 bytes and the check-in response command by 25 bytes. The personal computer 1 issues an appropriate check-in control command to the recording/reproducing apparatus 20A (20B) so that the apparatus will return reproduction rights to reproduce content data through a communication session, whereby the data of interest are checked in from the secondary storage medium. The check-in control command is also issued by the personal computer 1 to obtain special information from the secondary storage medium.

Upon receipt of the check-in control command, the recording/reproducing apparatus 20A (20B) performs processing correspondingly and returns a relevant check-in response command to the personal computer 1.

The check-in control command, as shown in FIG. 20, has an operation code specifying "check in," along with data bits designating "result" (of communication), "subfunction" (to be defined below), "list ID" (ID code of the apparatus to communicate with), and "object position number" (track number of the checked-in content data on the side of the secondary storage medium).

The subfunction, defined as illustrated in FIG. 21, specifies what is requested by the check-in command. If the subfunction has a value "00h," that means the check-in control command is requesting a content ID. This is actually a check-in request that causes the secondary storage medium-handling apparatus to return reproduction rights.

The value “01h” of the subfunction is reserved. The value may in fact be utilized for designating specifics about actual check-in processes.

If the subfunction has a value other than those defined above, that means the check-in control command is requesting prepaid information. The prepaid information, to be discussed later, is special information recorded on the secondary storage medium. In this case, the check-in control command designates retrieval of the prepaid information alone and does not require check-in (i.e., return of reproduction rights from the secondary storage medium-handling apparatus). It is also possible to define a subfunction value for requesting special information other than the prepaid information from the secondary storage medium-handling apparatus, such as user information and use status.

The check-in response command, as shown in FIG. 22, has an operation code specifying “check in,” together with data bits designating “result” (of communication), “subfunction,” “list ID” (ID code of the apparatus to communicate with), and “object position number” (track number of the checked-in content data on the side of the secondary storage medium). Also included in the check-in response command is an eight-byte area “hash MAC” that informs the personal computer 1 of a content ID generated through a hash function process. It should be noted that the content ID is placed in this eight-byte area for communication only when the subfunction has the value “00h” in the check-in control command, i.e., when a check-in transfer is actually carried out.

If the value of the subfunction in the check-in control command is such as to request prepaid information, the prepaid information is embedded in the last eight bytes of the check-in response command, as shown in FIG. 23, for transmission to the personal computer 1.

FIG. 24 shows a typical format of an exclusive login control command, and FIG. 25 indicates a typical format of an exclusive logout response command. These commands are used by the personal computer 1 to effect exclusive control over the recording/reproducing apparatus 20A.

The exclusive login control command designates the apparatus under control by use of “subunit type” and “subunit ID” bits. Control level is designated using a “priority” byte. The exclusive logout control command is designed to cancel exclusive control over the recording/reproducing apparatus 20A. With this command, the “priority” byte is set to “00h” indicating that the control level is in a freed state.

The exclusive login control command is used to inhibit or restrict the recording/reproducing apparatus 20A in such operations as erasure or other editing of content data on the secondary storage medium, ejection of the disc medium, and application of power. In other words, this command is designed to put the apparatus 20A in a state that may be controlled as designated by the personal computer 1.

The “priority” byte in the exclusive login control command may be varied in value to inhibit or restrict the recording/reproducing apparatus 20A in its diverse operations. Illustratively, the “priority” byte whose value is set for control level 4 inhibits the apparatus 20A from responding to any commands other than those from the personal computer 1 alone; the priority set for control level 3 inhibits the apparatus 20A from turning on or off power, ejecting the disc medium, or dividing, combining or erasing tracks except under control of the personal computer 1; the priority set for control level 2 inhibits the apparatus 20A from dividing, combining or erasing tracks except under control of the personal computer 1; the priority set for control level 1 allows the apparatus 20A to edit or erase tracks that do not constitute checked-out content data; the priority set for control level 0 frees the apparatus 20A from all these constraints. The definitions of the control levels above are given only for illustration purposes; the number of control levels and their details may be varied as needed.

10. Check-out and Check-in Transfers of Contents

Described below are typical steps carried out by the personal computer 1 and recording/reproducing apparatus 20A when content data are checked out from the HDD 5 of the PC 1 to the apparatus 20A, and when checked-out content data are checked in from the apparatus 20A. Although a plurality of content data items are often checked in or checked out during a single communication session, a single content data item is assumed to be checked out or checked in for purposes of simplification and illustration in the ensuing description.

Figure 26:
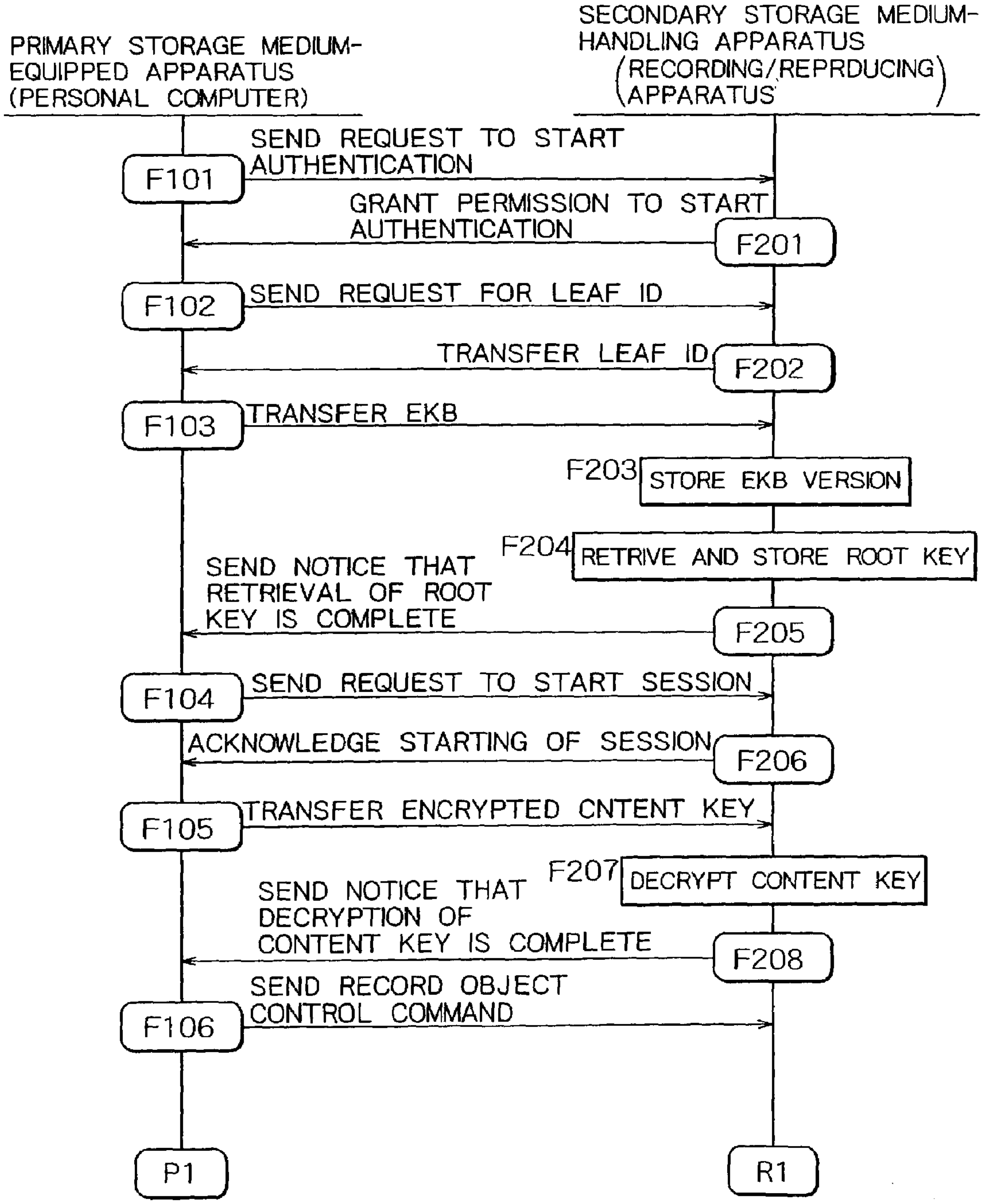
FIG. 26 is a flowchart of steps constituting a check-out session of the embodiment.
Figure 27:
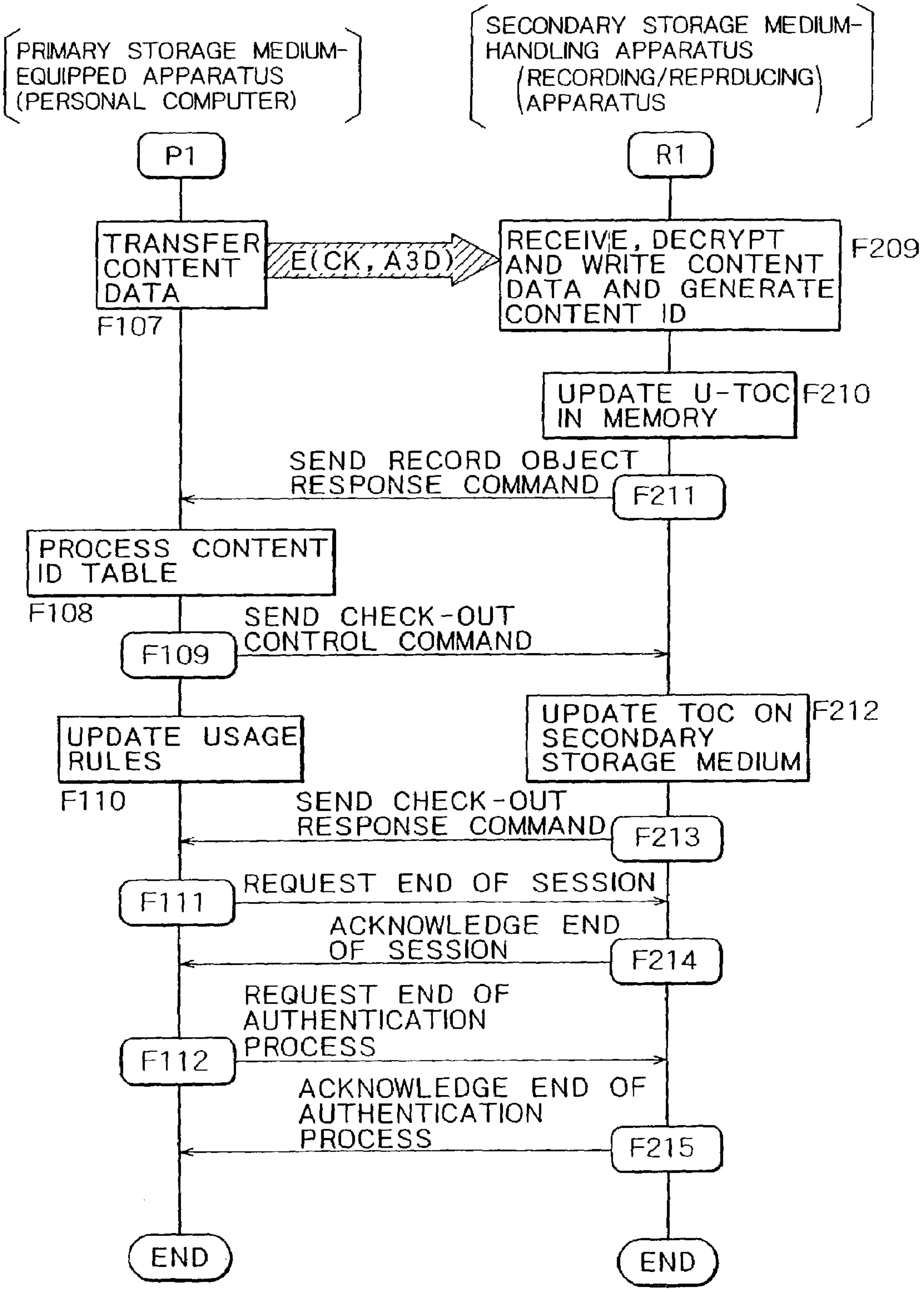
FIG. 27 is a flowchart of further steps constituting the check-out session of the embodiment.

FIGS. 26 and 27 show steps to be performed for a check-out transfer. In FIGS. 26 and 27, them control steps carried out by the CPU 2 of the personal computer 1 are represented by reference numerals F101 through F111, and the steps executed by the system control unit 32, decryption unit 28, etc., of the recording/reproducing apparatus 20A are denoted by reference numerals F201 through F215. The communication session is effected using various control commands and response commands issued in response to the control commands.

Where a given content data item is to be transferred from the HDD 5 to the recording/reproducing apparatus 20A, the CPU 2 in step F101 initially requests starting of an authentication process with the apparatus 20A. Specifically, the CPU 2 transmits an authentication start control command to the apparatus 20A. In turn, the recording/reproducing apparatus 20A reaches step F201 and gives permission to start authentication to the personal computer 1. Specifically, the apparatus 20A transmits an authentication start response command to the personal computer 1.

In step F102, the personal computer 1 requests a leaf ID from the recording/reproducing apparatus 20A. In step F202, the apparatus 20A transmits the leaf ID stored therein to the personal computer 1. In turn, the personal computer 1 checks the leaf ID from the apparatus 20A to see whether the apparatus currently has a legitimate leaf ID.

In step F103, the personal computer 1 transmits to the recording/reproducing apparatus 20A an EKB about the content data to be transferred. Upon receipt of the EKB, the apparatus 20A reaches step F203 and stores the version number of the EKB (see FIG. 3). In step F204, the apparatus 20A compares the received EKB with the stored DNK so as to retrieve the root key KR of the content data in question as in steps (1) and (2) discussed above in connection with FIG. 15, and then stores the root key KR obtained in the manner described above. In step F205, the apparatus 20A notifies the personal computer 1 that the root key KR has been retrieved.

With retrieval of the root key KR verified, the personal computer 1 reaches step F104 and requests starting of an actual check-out session. In turn, the recording/reproducing apparatus 20A goes to step F206 and acknowledges starting of the check-out session. When the session start control command is issued and the response command is returned, the authentication process described with reference to FIG. 12 is also carried out. The process involves ascertaining whether the recording/reproducing apparatus 20A is a legitimate device to decrypt the content data and to record the decrypted data to the secondary storage medium loaded therein. Although not shown in FIG. 26, an unsuccessful outcome of the authentication process obviously terminates the check-out session.

In step F105, the personal computer 1 transmits an encrypted content key E(KR, CK) regarding the content data to be transferred. Upon receipt of the content key E(KR, CK), the recording/reproducing apparatus 20A goes to step F207 and decrypts the encrypted content key using the stored root key to obtain the original content key CK as in step (3) of FIG. 15. In step F208, the apparatus 20A notifies the personal computer 1 that decryption of the content key CK has been completed.

In step F106, the personal computer 1 transmits the, record object control command discussed above in connection with FIG. 18 to the recording/reproducing apparatus 20A. The command is intended to provide the apparatus 20A with information about the content data to be checked out. Although not shown, the apparatus 20A at this point returns a response command (this response command has a format that is not what is shown in FIG. 19 but is a 25-byte format, neither shown nor discussed).

Given the report of completed decryption of the content key CK and the response to the record object control command, the personal computer 1 recognizes that the preparations are complete on the side of the recording/reproducing apparatus 20A for receiving and decrypting the content data to be transferred. The personal computer 1 then goes past an exit "P1" of FIG. 26 to reach step F107 of FIG. 27. In step F107, the personal computer 1 transfers the content data in question. Specifically, the content data E(CK, A3D) encrypted using the content key CK are transmitted to the apparatus 20A.

The recording/reproducing apparatus 20A, for its part, goes past an exit "R1" of FIG. 26 to reach step F209 of FIG. 27. In step F209, the apparatus 20A receives the transmitted content data E(CK, A3D), decrypts the received data as in step (4) of FIG. 15, writes the decrypted content data A3D to the Mini-disc 100, and generates a content ID based on the decrypted content data in a way to be described later in detail.

When a single content data item (e.g., a piece of music) has been transferred from the personal computer 1 and written in its entirety to the Mini-disc 100, the U-TOC on the disc 100 needs to be updated at this point. On the Mini-disc 100, the U-TOC recorded in the radially innermost area of the disc is used to manage the start and end addresses of each of the stored tracks illustratively representing pieces of music. For reproduction of any of the tracks, the addresses of the track in question are retrieved from the U-TOC for control purposes.

With this embodiment of the invention, upon completion of writing a single content data item to the Mini-disc 100, the U-TOC in the buffer memory 30 alone is updated in step F210. The U-TOC on the Mini-disc 100 is not updated yet at this point. Upon completion of the U-TOC update in the buffer memory 30, the recording/reproducing apparatus 20A reaches step F211 and transmits to the personal computer 1 the record object response command discussed above with reference to FIG. 19. This completes the processing regarding the write of one content data item to the disc. The content ID generated in step F209 with respect to the content data in question is reported to the personal computer 1.

Given the report of the content ID, the personal computer 1 reaches step F108 and processes a content ID table. The process, to be described later in detail, involves causing the content ID attached by the personal computer 1 to a given content data item stored on the HDD 5 to coincide with the content ID generated in step F209 by the recording/reproducing apparatus 20A.

In step F109, the personal computer 1 transmits the check-out control command shown in FIG. 17 to the recording/reproducing apparatus 20A. In step F110, the personal computer 1 updates the usage rules on the content data in question following the check-out transfer. More specifically, a maximum allowable transfer count representative of the rights to the content data in question is decremented by one.

The recording/reproducing apparatus 20A carries out the processes designated by the check-out control command. More specifically, the apparatus 20A goes to step F212 and updates the U-TOC on the Mini-disc 100 to render the recorded content data reproducible. This means that the apparatus 20A is granted rights to reproduce the content data from the secondary storage medium. At this point, in the "track mode" byte of the U-TOC sector 0 corresponding to the content data in question, the bit d1 is set to 1, which means the content data are write-protected. After updating the U-TOC reflecting the check-out transfer, the recording/reproducing apparatus 20A reaches step F213, transmits the check-out response command, and reports the end of the processing. This completes the check-out transfer, i.e., the transfer of content rights.

Upon completion of the check-out, the personal computer 1 transmits in step F111 a control command requesting an end of the session to the recording/reproducing apparatus 20A. In step F214, the apparatus 20A returns to the personal computer 1 a response command acknowledging the end of the session. In step F112, the personal computer 1 transmits to the apparatus 20A a control command terminating the authentication process. In step F215, the apparatus 20A returns a response command acknowledging the end of the authentication process. This completes the whole series of check-out communication steps.

If a plurality of content data items are to be checked out through the communication session outlined above, steps F105 through F108 and F207 through F211 need only be repeated as long as the root key is common to all content data items. Where a plurality of content data items with different EKB versions are to be transferred successively, each content data item may be transferred along with its own EKB.

Figure 28:
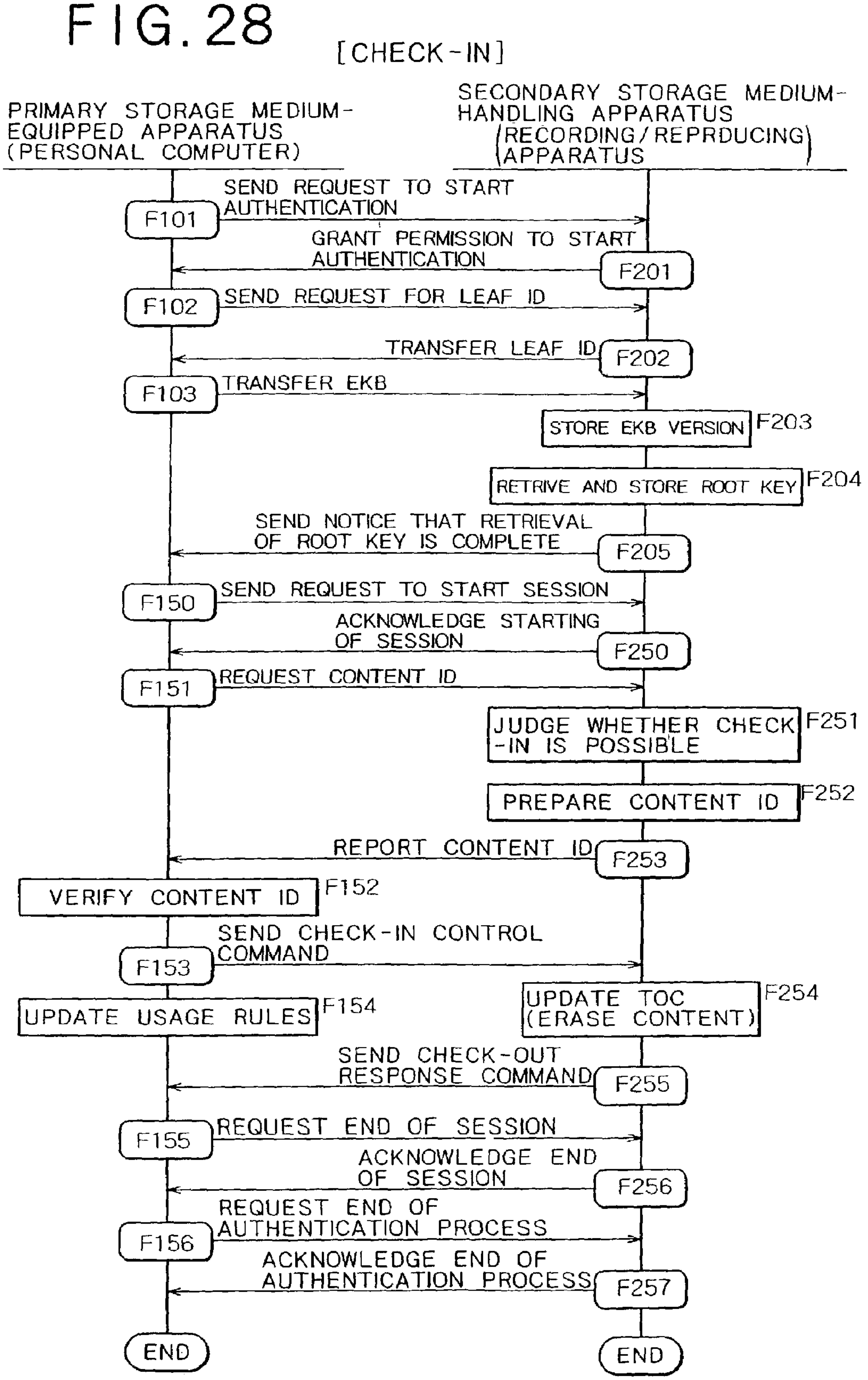
FIG. 28 is a flowchart of steps constituting a check-in session of the embodiment.

How a check-in transfer is carried out will now be described by referring to FIG. 28. In FIG. 28, the control steps carried out by the CPU 2 of the personal computer 1 are represented by reference numerals F101 through F156, and the steps executed by the system control unit 32, decryption unit 28, etc., of the recording/reproducing apparatus 20A are denoted by reference numerals F201 through F257. In this case, the communication session is also effected using various control commands and response commands issued in response to the control commands.

During the check-in session, the start of an authentication process, EKB transfer, and root key retrieval are carried out in the same manner as during the check-out. That is, steps F101 through F103 and F201 through F205 in FIG. 28 are the same as those in FIG. 26 and represent the same processes that will not be described further.

In step F150, the personal computer 1 transmits a control command requesting start of a check-in session to the recording/reproducing apparatus 20A. In step F250, the apparatus 20A returns a response command to the personal computer 1. At this point, too, the authentication process discussed above with reference to FIG. 12 is carried out likewise.

With the check-in session started and with the recording/reproducing apparatus 20A duly authenticated, the personal computer 1 reaches step F151 and requests a content ID of the content data to be checked in from the apparatus 20A. Illustratively, the personal computer 1 requests the apparatus 20A to return the content ID of the content data in question by designating a track number on the Mini-disc 100. In response, the apparatus 20A judges in step F251 whether or not the designated track represents the content data allowed to be checked in. The judgment is made based on the status of the write-protect flag (bit d1 in the "track mode") recorded in the U-TOC corresponding to the track. This judging process will be discussed later in more detail. The content data allowed to be checked in signify content data that have been checked out to the Mini-disc 100 and are not being edited on the disc.

If the content data in question are judged fit to be checked out, step F252 is reached. In step F252, the recording/reproducing apparatus 20A prepares the content ID for the content data in question. At this point, the content ID is either computed or is retrieved from its stored state following earlier computations. This process will also be described later in more detail. In step F253, the apparatus 20A transmits the prepared content ID to the personal computer 1. If the content data that may be checked in are not found, the personal computer 1 is notified thereof, and an error-handling routine is carried out thereafter.

In step F152, the personal computer 1 verifies the transmitted content ID. Specifically, the personal computer 1 matches the content ID generated by and transmitted from the recording/reproducing apparatus 20A, against the content ID generated and stored by the PC in a data table regarding the content data in question. The matching is done so as to verify that the transmitted content ID duly corresponds to the content data to be checked in. If the transmitted content ID is judged to be correct, then the personal computer 1 designates a check-in transfer in step F153. If the content ID turns out to be erroneous, then an error-handling routine is performed.

The check-in designation in step F153 is transmitted in the form of the check-in control command discussed above with reference to FIG. 20. In this check-in control command, the "subfunction" data constitute the value "00h" (see FIG. 21) specifying that the check-in transfer be carried out. The "list ID" value is a value that designates the recording/reproducing apparatus 20A, and the "object position number" value specifies the track number of the content data to be checked in from the Mini-disc 100.

Following the check-in designation, the personal computer 1 reaches step F154 and updates the usage rules on the content data in question. More specifically, the maximum allowable transfer count representative of the rights to the content data in question is incremented (i.e., restored) by one.

In turn, the recording/reproducing apparatus 20A updates the U-TOC data in step F254. That is, the apparatus 20A updates U-TOC sector 0 in a way causing the checked-in track to be erased from the Mini-disc 100. The track is thus rendered unreproducible and deprived of reproduction rights. In step F255, the apparatus 20A transmits the check-in response command shown in FIG. 22 to the personal computer 1. This completes the check-in session, i.e., the return of content rights back to the personal computer 1.

Upon completion of the check-in session, the personal computer 1 transmits in step F155 a control command requesting an end of the session to the recording/reproducing apparatus 20A. In step F256, the apparatus 20A sends to the personal computer 1 a response command acknowledging the end of the session. In step F156, the personal computer 1 transmits to the apparatus 20A a control command terminating the authentication process. In step F257, the apparatus 20A returns a response command acknowledging the end of the authentication process. This completes the whole series of check-in communication steps.

If a plurality of content data items are to be checked in successively through the communication session above, steps F151 through F154 and F251 through F255 need only be repeated to verify the content ID for each of the content data items involved and to given the check-in designation regarding each content data item.

11. Scheme for Generating and Managing Content IDs

The usage rules over check-out and check-in sessions are managed regarding content data items using the content IDs thereof. As mentioned above, SDMI-compliant secondary storage media employ a recording format in which content IDs can be stored. During a check-out or check-in session, the personal computer 1 and the SDMI-compliant recording/reproducing apparatus 20B can each identify any content data item of interest by use of a content ID generated by the personal computer 1 for the item.

This, however, is not the case with the recording/reproducing apparatus 20A that handles the Mini-disc 100 or similar secondary storage media having enjoyed widespread acceptance already. The Mini-disc 100 has no area in which to retain content IDs identifying checked-out content data recorded thereon. Even if a new area is set aside illustratively in the U-TOC and content IDs are written to that area, these content IDs are erased by conventional Min-disc recorders when they update the U-TOC. There is no way of managing the content IDs on the Mini-disc 100. If content IDs cannot be managed on the side of the secondary storage medium, content data may be checked out to the medium but they cannot be checked in because it is impossible to verify their identifies.

The difficulty above is bypassed if the recording/reproducing apparatus 20A is given capabilities to generate a content ID based on each content data item in question. The personal computer 1, for its part, should provide a data table wherein a first content ID generated by the personal computer 1 for a given content data item is matched against a second content ID generated by the apparatus 20A.

How a content ID is generated by the recording/reproducing apparatus 20A will now be described. A content ID is generated illustratively by checking the length of a decrypted content data item (i.e., content size) and its track information, and by sampling specific data from a content data stream for CBC_MAC computations.

Figure 29:
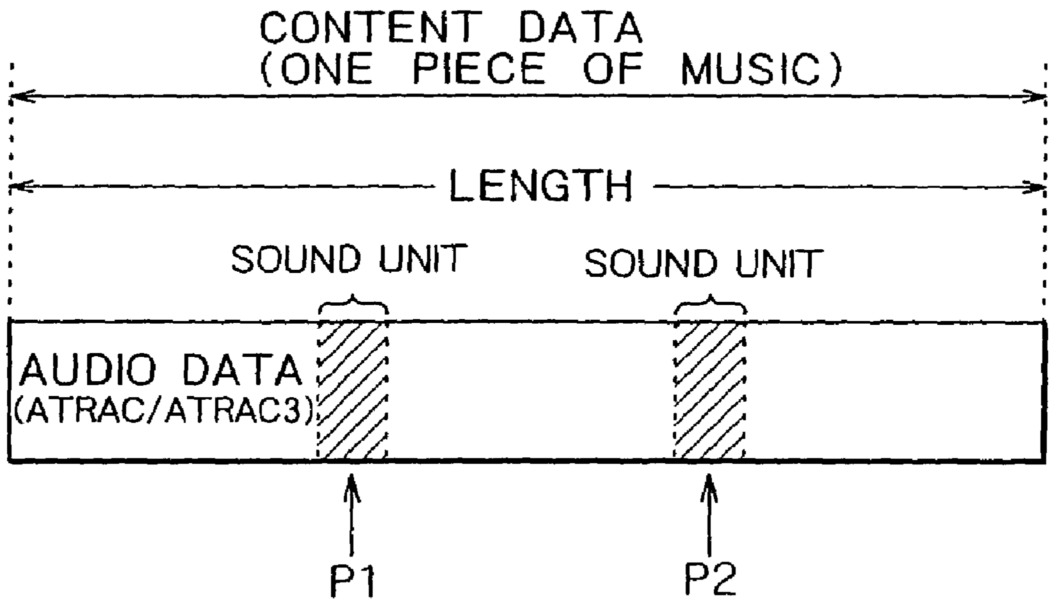
FIG. 29 is an explanatory view showing how a content ID is generated by the embodiment.

FIG. 29 schematically indicates a content data item (e.g., one piece of music) in its entirety. The content data item is transmitted illustratively by the personal computer 1 during a check-out session, decrypted, and shown here as part of an ATRAC or ATRAC3 compressed data stream. Points P1 and P2 are set up illustratively as sampling points with respect to the content data stream. Sound unit (shown shaded in FIG. 29) data are extracted from these sampling points. Each sound unit may be constituted by, say, 424 bytes of data equivalent to one sound group explained above with reference to FIG. 8. The sound unit may obviously be established in any other way desired.

The content ID is computed using part of the content data sampled as described. Sampling points should preferably be avoided at the beginning and at the end of a content data item because these portions tend to comprise soundless data. In addition, not one but two sampling points P1 and P2 should preferably be established in order to enhance the probability of unique data getting sampled from the target data item. Taking these measures ensures computation of a content ID serving as a sufficiently useful item-by-item identifier. Obviously, three or more sampling points may also be established. In practice, however, a single sampling point alone can serve the purpose adequately as long as the beginning and end of each piece of music are avoided in setting up the sampling point.

It is preferred to locate the sampling points P1 and P2 not randomly but in positions each determined as a fixed ratio of the length (data size) of the content data item in question. Any specific content data item, when sampled at fixed sampling points thereof, yields the same content ID regardless of the number of times the content ID is computed. In other words, even if content IDs are not retained on the secondary storage medium, as long as content data are recorded thereon, the same content IDs can be computed from the sampling points established in constant relation to the content data. This eliminates the need for recording content IDs onto the Mini-disc 100 as the secondary storage medium for content identification purposes.

More specifically, the sampling points P1 and P2 may be set up respectively at a one-third and a two-thirds ratio location relative to the content data size (length). However, this is not limitative of the invention. Any other relatively located points may be selected with respect to a given data length, e.g., at a half ratio location, a quarter ratio location, a three-fourth ratio location, a one-fifth ratio location, a two-fifths ratio location, a three-fifths ratio location, a four-fifths ratio location, a one-sixth ratio location, a five-sixths ratio location, and so on.

Described below is a typical method for obtaining a content ID by applying a hash function to content data. Expression (1) below summarizes the method:

$$\text{Content ID}=\text{CBC}_{MAC}(\text{Key hash, IV, Stream(P1)//Stream(P2)}) \quad (1)$$

where, "Key hash" denotes eight-byte unique key data, "Stream(P1)" stands for data in the sound group sampled at the sampling point P1, and "Stream(P2)" represents data in the sound group sampled at the sampling point P2. Two slashes "//" indicate a combination. That is, the term "Stream (P1)//Stream(P2)" indicates 424×2 bytes of data combining the two sound units at the sampling points P1 and P2. Value "IV" denotes an eight-byte initial value of CBC mode. The value is given by expression (2) below using a four-byte content size "length" and one-byte track information "TrackModeByte":

$$IV=\{length//TrackModeByte//\text{32 bit Padding with Zero}\} \quad (2)$$

where, the four-byte content size "length" and the one-byte track information "Track Mode Byte" can be represented by the four-byte content size "content size" and one-byte track mode "track mode" reported in the record object control command shown in FIG. 18.

Such content ID generation is effected by a hash engine incorporated illustratively in the decryption unit 28 of the recording/reproducing apparatus 20A. As indicated by expressions (1) and (2) above, the apparatus 20A can compute the value "IV" upon receiving the record object control command (in step F106 of FIG. 26) during a check-out session. Because the content data length can be known from the "content size" data in the record object control command prior to transfer of the content data, it is possible to verify the sampling points P1 and P2 established illustratively at one-third ratio location and two-thirds ratio location relative to the content data length, for example. It follows that after the content data transfer has started and data have been sampled from the sampling points P1 and P2, the content ID can be computed based only on expression (1) above.

Since the size of the content data recorded on the Mini-disc 100 can obviously be computed from the data in U-TOC sector 0, the locations of the sampling points P1 and P2 can be ascertained accordingly. During a check-out session, the "track mode" data reported in the record object control command is written to the track mode region in U-TOC sector 0. Thus the U-TOC data permit computations based on expression (2) above. As a result, the content ID of a given content data item recorded on the Mini-disc 100 can be computed at any point in time.

In the manner described above, the recording/reproducing apparatus 20A may by itself generate content IDs of content data that have been checked out. For practical use, these content IDs must be suitably associated with other content IDs generated by the personal computer 1 and retained on the HDD 5.

The content IDs held on the HDD 5 have been generated with respect to content data by an application program running on the personal computer 1. The content IDs acquired by the application program are constituted by information specific to the apparatus (e.g., PC 1) equipped with the primary storage medium such as the HDD 5. Such specific information includes a unique ID of the application program installed in the apparatus, as well as time information and random numbers held on the HDD 5.

The content IDs generated by the personal computer 1 (i.e., first content IDs) are arranged to correspond with the content IDs generated by the recording/reproducing apparatus 20A (i.e., second content IDs) in a data table on the side of the PC as shown in FIG. 30. The data in the table are thus made up of data combinations unique to the apparatus incorporating the primary storage medium such as the HDD 5.

During a check-out session, the content ID generated by the recording/reproducing apparatus 20A is reported to the personal computer 1 in step F211 of FIG. 27 using the record object response command. The personal computer 1 processes its table data in step F108 of FIG. 27. These steps are carried out to generate elements of the table data shown in FIG. 30 in a manner matching the content ID generated by the personal computer 1 regarding the content data to be checked out, against the content ID generated by the apparatus 20A with respect to the content data in question. FIG. 30 shows three content data items each being associated with a first and a second content ID.

When such table data are managed by the personal computer 1 (e.g., recorded and updated on the HDD 5), the content data checked out to the Mini-disc 100 can be managed using the content IDs. That is, check-out and check-in transfers can be managed properly. While the Mini-disc 100 has no space in which to retain content IDs, the recording/reproducing apparatus 20A can compute content IDs with regard to the content data recorded on the disc 100.

In the above setup, when the personal computer 1 is to check in a given content data item, the PC requests the recording/reproducing apparatus 20A to send a second content ID about the content data in question. Upon receipt of the transmitted second content ID, the personal computer 1 compares what is received with the second content ID which was sent back from the apparatus 20 upon the preceding check-out and which is being held in the table of FIG. 30. In case of a match in the comparison, the personal computer 1 proceeds to check in the content data item managed on the PC side using the first content ID. These processes correspond specifically to steps F151, F152, F252 and F253 of FIG. 28.

As described, the content ID management scheme above allows the inventive system suitably to provide check-out/check-in management, i.e., content right management over SDMI-noncompliant secondary storage media (such as the Mini-disc 100).

12. Process of Generating Content IDs Upon Check-out and Before Check-in

There are two occasions on which the recording/reproducing apparatus 20A needs to generate content IDs: where a content ID is to be sent to the personal computer 1 upon check-out (i.e., transmitted by use of the record object response command so that the personal computer 1 may execute table data management as shown in FIG. 30); and when a content ID is requested by the personal computer 1 for check-in purposes.

As discussed above, the content ID is generated using part of the content data extracted from the sampling points P1 and P2. It follows that for a check-out transfer, the usual procedure would involve first sampling data from the sampling points P1 and P2 after the content data transferred from the personal computer 1 have been written to the Mini-disc 100, and then computing a content ID based on the sampled data. Upon check-in transfer, the usual procedure would also involve first sampling data from the sampling points P1 and P2 on the Mini-disc 100 in response to a request from the personal computer 1 to furnish a content ID, and then computing a content ID based on the sampled data.

The above procedures, however, require gaining access to and retrieving data from the Mini-disc 100 during the check-out session. This adds to the time needed to compute the content ID and prolongs the entire check-out communication time. During the check-in session, too, it is necessary to access and retrieve data from the Mini-disc 100 in response to the PC's request for the content ID. This also adds to the time required to compute the content ID and prolongs the whole check-in communication time.

According to the invention, the steps discussed below may be carried out to compute the content ID in a more efficient, time-saving fashion.

Figure 31:
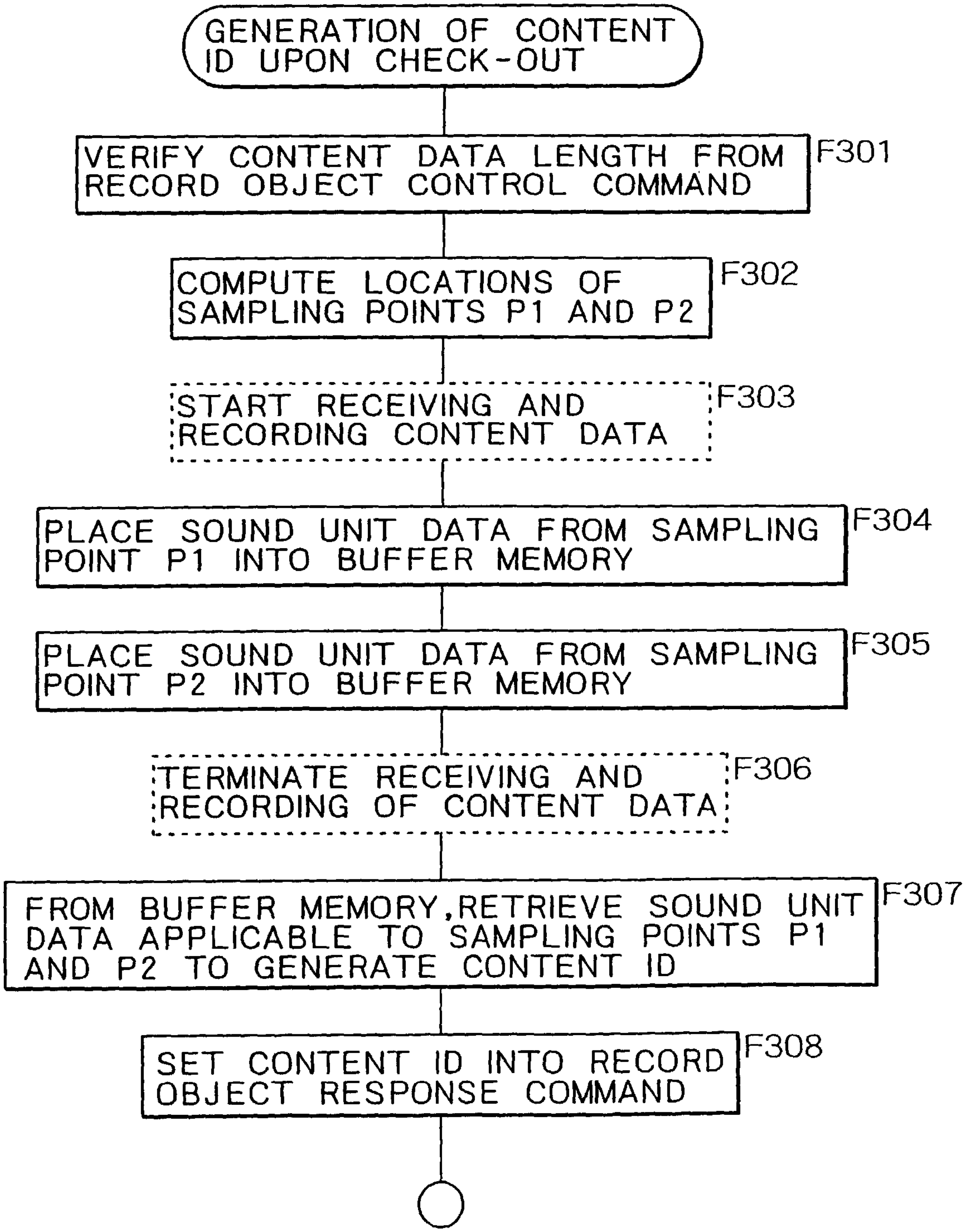
FIG. 31 is a flowchart of steps in which a content ID is generated during the check-out session by the embodiment.

FIG. 31 is a flowchart of steps in which the recording/reproducing apparatus 20A generates a content ID (CID) during a check-out session. These steps constitute a detailed process carried out in step F209 of FIG. 27 by the system control unit 32 and decryption unit 28.

In step F106 of FIG. 26, the personal computer 1 transmits to the recording/reproducing apparatus 20A a record object control command just before transferring content data. Step F106 is followed by step F209 of FIG. 27 for content ID generation, step F209 breaking down into the steps shown in FIG. 31. In step F301 of FIG. 31, the length of a given content data item to be transferred (i.e., data size) is verified from data in the received record object control command. In step F302, sampling points P1 and P2 of the content data stream are computed based on the content data length.

In step F303, the content data item in question starts being received. More specifically, as discussed above in connection with the block diagram of FIG. 7, the content data item starts getting received, decrypted, placed into the buffer memory 30 as ATRAC3 data, encoded by the encoder/decoder 24, and written to the Mini-disc 100 by the read/write unit 25.

During the reception, decryption, buffering, encoding and writing of the content data, data from the sampling point P1 are being monitored. In step F304, sound unit data from the sampling point P1 are subjected to verification illustratively in the buffer memory 30. If the verification is successful, the sound unit data are placed into another area in the buffer memory 30 apart from the data stream being buffered thereby.

With the monitoring carried out continuously, step F305 is reached in which sound unit data from the sampling point P2 are put to verification illustratively in the buffer memory 30. If the verification is successful, the sound unit data are also placed into another area in the buffer memory 30 apart from the data stream being buffered thereby.

In step F306, the reception, decryption, buffering, encoding and writing of the content data item in question are completed. With the content data written to the Mini-disc 100, step F307 is reached in which the hash engine in the decryption unit 28 retrieves from the buffer memory 30 the data derived from the sampling points P1 and P2. The retrieved data serve as a basis for computing a content ID using expressions (1) and (2) shown above. In step F308, the computed content ID is set in a record object response command. The record object response command is transmitted to the personal computer 1 in step F211 of FIG. 27.

In the steps above, the data from the sampling points P1 and P2 are set aside and stored in memory before writing of the content data to the Mini-disc 100. That means there is no need to put the Mini-disc 100 in reproduction mode upon content ID computation while executing seeks to retrieve the sampling point data from the disc. This renders the content ID computation process very efficient and shortens the check-out session time correspondingly.

Figure 32A:
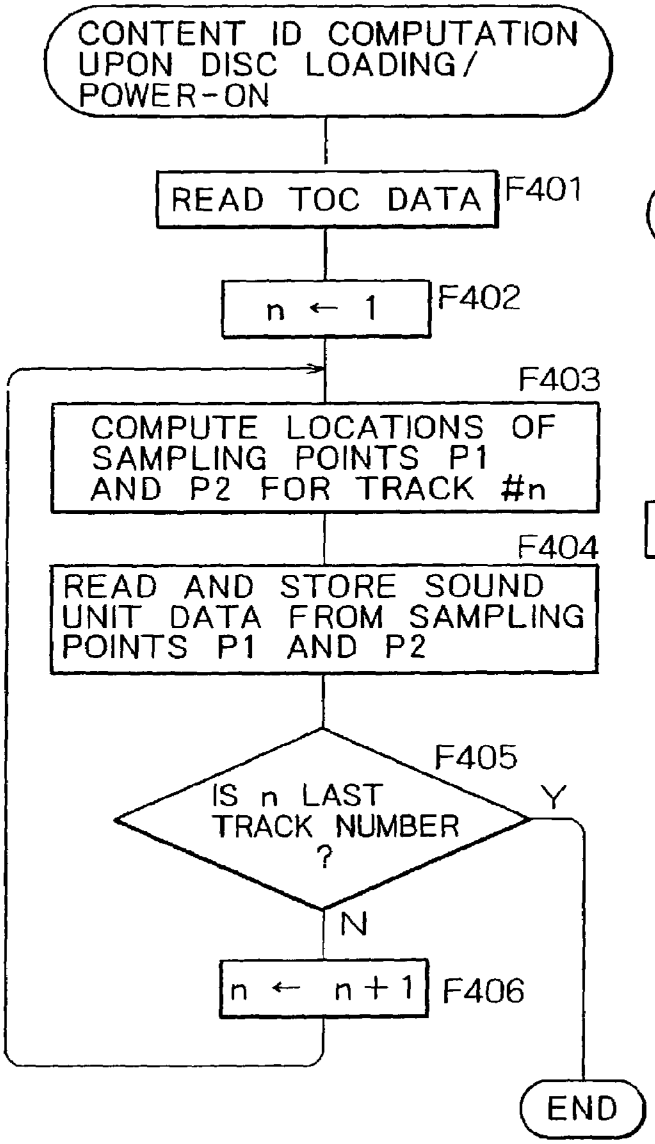
FIGS. 32A and 32B are flowcharts of steps in which a content ID is generated before the check-in session by the embodiment.
Figure 32B:
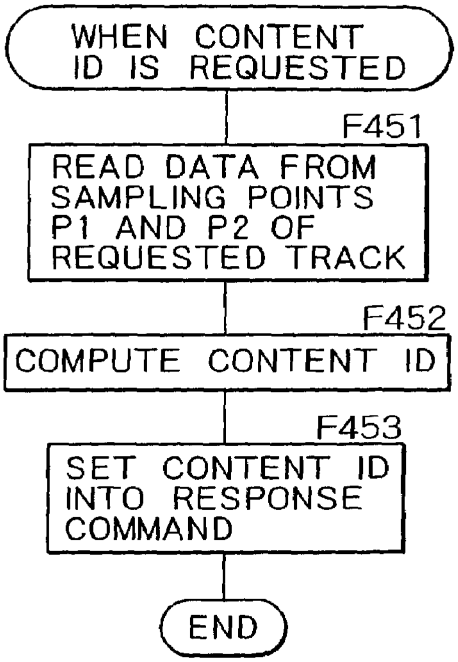

FIGS. 32A and 32B are flowcharts of steps for quickly transmitting a content ID when it is requested for check-in. A content ID can be computed on two conditions: that a content data item of interest are recorded, and that the length and track of the content data item in question are verified. In other words, if a content data item and related data in U-TOC sector 0 are retrieved from the Mini-disc 100, then data can be sampled from the sampling points P1 and P2 of the content and a content ID can be computed accordingly.

With that taken into account, the flowchart of FIG. 32A gives steps in which data at the sampling points P1 and P2 are sampled as soon as the Mini-disc 100 is loaded, or when power is applied with the Mini-disc 100 kept loaded, i.e., whenever TOC data are read out.

In step F401 of FIG. 32A, TOC data are retrieved. In step F402, a variable n is set to 1. In step F403, the sampling points P1 and P2 are computed regarding a track #n (#n represents a track number, i.e., initially denotes a first track). Since data in U-TOC sector 0 have already been retrieved, the two points P1 and P2 are readily computed regarding the track. In step F404, data at the sampling points P1 and P2 with respect to the track #n are actually retrieved from the Mini-disc 100 and placed into a special area in the buffer memory 30.

In step F405, a check is made to see if the variable n represents the last track number. If that is not the case, step F406 is reached in which the variable n is incremented by 1. Step F406 is followed by step F403. The sampling points P1 and P2 are then computed for the track #n (i.e., second track this time). Thereafter, data at the sampling points P1 and P2 are sampled and stored into the buffer memory 30. That is, a loop made up of steps F403 through F406 is carried out on all tracks held on the Mini-disc 100. The length of each of the tracks is used to compute the sampling points P1 and P2 from which data are sampled and placed into the buffer memory 30. When all tracks have been processed, step F405 is followed by an action to terminate the processing.

If the personal computer 1 requests a content ID from the recording/reproducing apparatus 20A, as in step F151 of FIG. 28, then step F252 of FIG. 28 is carried out by the apparatus 20A, step F252 breaking down into detailed steps shown in FIG. 32B. In step F451 of FIG. 32B, the data at the sampling points P1 and P2 of the track having the requested track number are retrieved from the buffer memory 30. In step F452, the hash engine in the decryption unit 28 computes a content ID based on the retrieved data. The track mode and length of the content data needed in expressions (1) and (2) above for content ID computation can be known from the U-TOC data placed already in the buffer memory 30 at this point. In step F453, the generated content ID is set in a response command. This response command is transmitted to the personal computer 1 in step F253 of FIG. 28.

The steps above eliminate the need for the apparatus 20A to retrieve the data at the sampling points P1 and P2 from the Mini-disc 100 when the personal computer 1 requests the content ID. This contributes to reducing the time it takes to respond to the PC's request for a content ID. The overall communication time required for the check-in session is shortened appreciably.

Figure 33A:
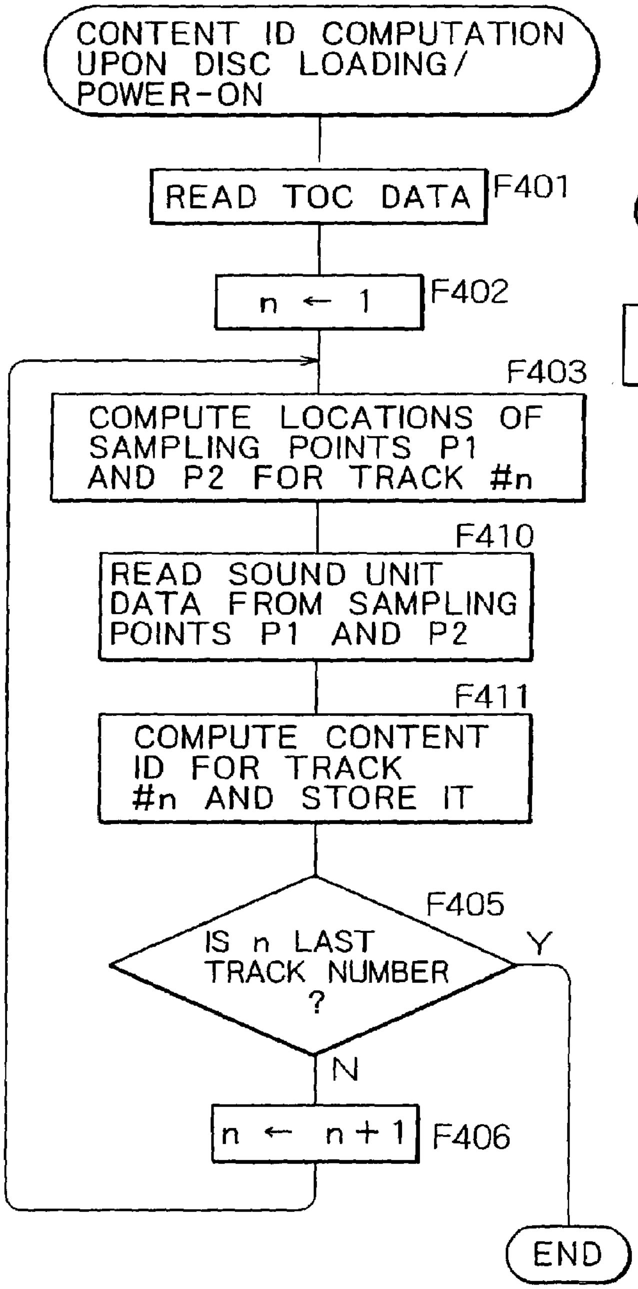
FIGS. 33A and 33B are flowcharts of further steps in which the content ID is generated before the check-in session by the embodiment.
Figure 33B:
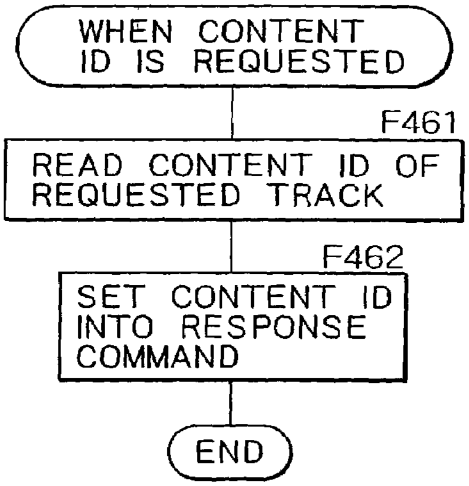

The steps shown in FIGS. 32A and 32B may be replaced alternatively by those in FIGS. 33A and 33B. In FIGS. 32A, 32B, 33A and 33B, like reference numerals designate like or corresponding steps and their descriptions are omitted hereunder where redundant. In step F403 of FIG. 33A, the sampling points P1 and P2 of track #n are computed. In step F410, data at the sampling points P1 and P2 are retrieved from the Mini-disc 100. The retrieved data are supplied to the hash engine in the decryption unit 28. In step F411, a content ID is computed based on the supplied data. The content ID thus computed is placed into the buffer memory 30.

The steps above are carried out on all tracks held on the Mini-disc 100. That is, the content IDs are generated in advance and stored into the buffer memory 30.

When a content ID is requested by the personal computer 1, step F252 of FIG. 28 is carried out as shown in FIG. 33B. In step F461 of FIG. 33B, the content ID of the track having the requested track number is retrieved from the buffer memory 30. In step F462, the retrieved content ID is set in a response command. The response command is transmitted to the personal computer 1 in step F253 of FIG. 28.

The steps above eliminate the need for the recording/reproducing apparatus 20A to read the data at the sampling points P1 and P2 from the Mini-disc 100 and compute a content ID when that ID is requested by the personal computer 1. This further reduces the time it takes to respond to the PC's request for the content ID.

The steps in FIG. 32A or 33A may be carried out by the recording/reproducing apparatus 20A upon reading of TOC data from the Mini-disc 100. Alternatively, these steps may be performed during a read or a hold process, or at any suitable idle time. Because content data are read from the Mini-disc at a high transfer rate and in an intermittent manner, the data at the sampling points P1 and P2 may be sampled at idle times between intermittently performed read operations. In any case, the check-in session is effected more efficiently than before when the steps of FIG. 32A or 33A are carried out prior to the request being made by the personal computer 1 for a content ID.

13. Content Write Control Flag

When a given content data item is checked out in steps of FIGS. 26 and 27, on the Mini-disc 100 side, the bit d1 in the track mode data is set to 1 in U-TOC sector 0 for the content data item in question, as described above. The bit d1 functions as a write control flag regarding the checked-out content data written to the Mini-disc 100.

For Mini-disc systems, the bit d1 serves as what is generally known as the write-protect flag. Any track for which the bit d1 is set is inhibited from getting erased, divided, combined or otherwise edited. This applies to the recording/reproducing apparatus 20A acting a Mini-disc recorder, as well as to other conventional Mini-disc recorders having gained widespread acceptance today.

In practice, however, the bit d1 is not automatically set for any track recorded by the Mini-disc system to the Mini-disc 100. The bit d1 serves not only as a write-protect flag for a given track but also as information declaring the content data item written on the track to be one that has been checked out from the personal computer 1.

The system of this invention utilizes the bit d1 as a write control flag that inhibits editing of checked-out content data. Upon request for a check-in session, the inventive system also checks the bit d1 to determine whether the track indicated by the bit was duly checked out previously.

When a checked-out content data item is to be checked in, it is preferred that the returned data item coincide exactly with what is preserved on the PC side from a data management point of view. As described, the recording/reproducing apparatus 20A computes the content ID using the data derived from the sampling points P1 and P2 based on the content data length. If the content data length has been changed as a result of division or combination, it is impossible to generate the same content ID in effect at the check-out. In other words, editing the checked-out content data will render adequate usage rule management impossible because of the content ID mismatch. If that happens, the system cannot accept checked-in content data; tolerating the check-in of edited content data runs counter to the principles of proper usage rule management. It is thus preferred that all checked-out content data be inhibited from being edited on the Mini-disc 100.

Figure 34:
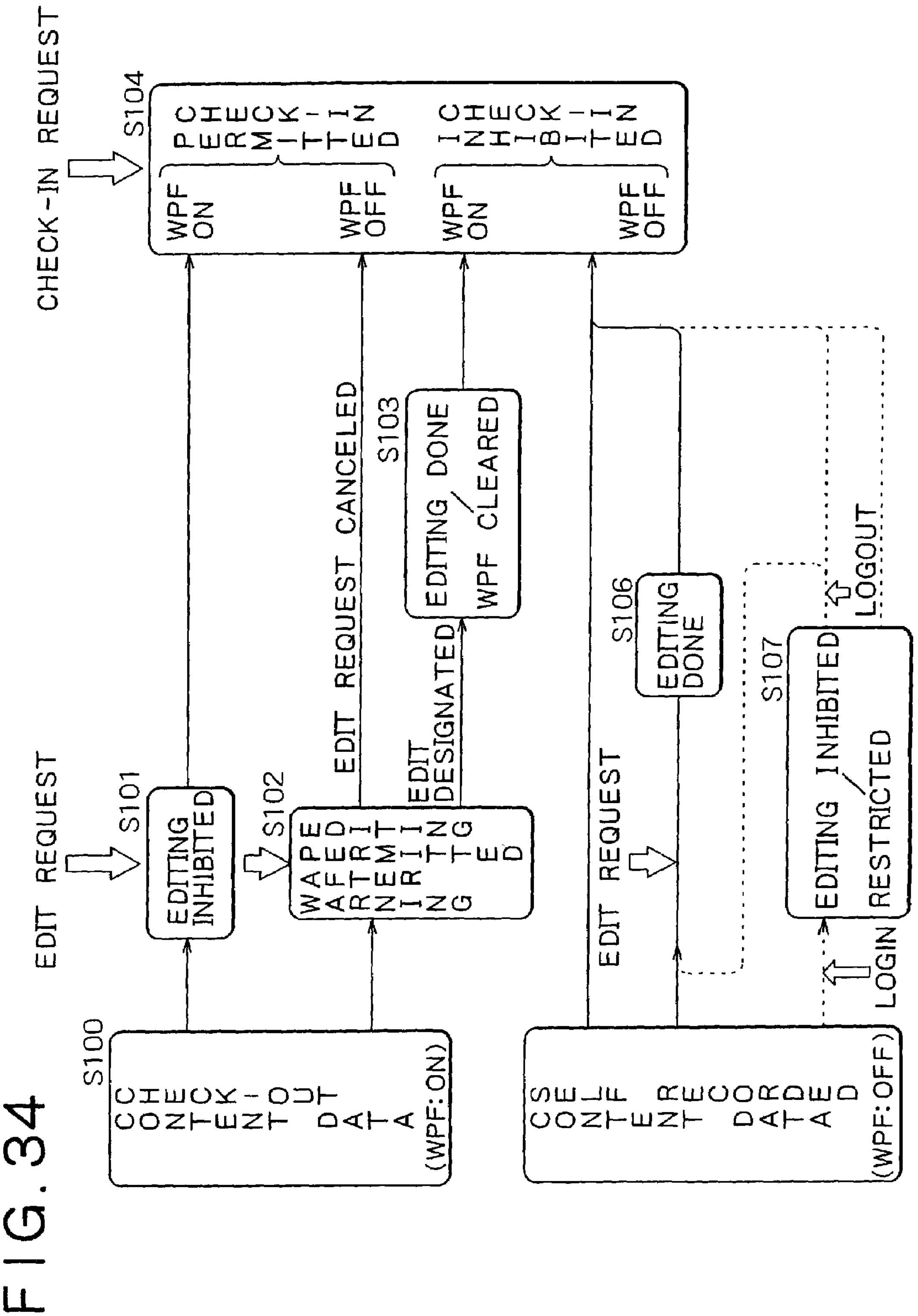
FIG. 34 is an explanatory view showing how a write control flag works in the embodiment.

FIG. 34 shows how the write-control flag is typically processed by the recording/reproducing apparatus 20A. In FIG. 34, reference characters WPF denote the write-protect flag, i.e., bit d1 in the track mode data in U-TOC sector 0. For a content data item checked out and written on the Mini-disc 100, the write-protect flag WPF is turned on (S100) during an update of U-TOC data in step F212 of FIG. 27. The flag WPF remains off (S105) for any content data item not checked out by this system but written anyway on the Mini-disc 100 by the recording/reproducing apparatus 20A or by other Mini-disc recorder from different sources (the data thus written are called the self-recorded content data hereunder).

As one management measure, any content data item (track) for which the write-protect flag WPF is turned on may be totally inhibited from getting edited so as to permit subsequent check-in. Another management measure may involve allowing the user to edit the content of interest after giving him or her a warning that any subsequent check-in will be disabled if editing is done.

For total inhibition of editing on the checked-out content data, the system control unit 32 proceeds to reject any edit commands that may be issued regarding a given content data item (S101). In this case, the checked-out content data cannot be edited in any way. The write-protect flag WPF remains on (S101 to S104).

Self-recorded content data remain freely editable (S106). Given edit commands from the user or from other sources, the system control unit 32 instructs the MD control unit 21 to edit the content data of interest and update the U-TOC accordingly. Whether or not editing is carried out, the write-protect flag WPF stays off for all self-recorded content data (S105 to S104, or S105 to S106 to S104).

It may be desired to let checked-out content data be edited following the above-described warning. In that case, the system control unit 32 causes a display feature, not shown in FIG. 7, to issue a warning message (S102) in response to any edit command that may come from the user or from other sources. The message is worded to warn the user of the unavailability of eventual check-in subsequent to the editing.

If the user cancels the edit command in reply to the warning, then editing obviously will not take place (S102 to S104). If the user proceeds to edit data despite the warning, then the user is deemed to have accepted the eventuality and is allowed to edit the data of interest on condition that the data will no longer be checked in. That is, the system control unit 32 instructs the MD control unit 21 to edit the content data of interest as designated by the user or by other sources and update the U-TOC accordingly. In this case, the write-protect flag WPF for the track that will be edited, specifically, the bit d1 in the track mode data in U-TOC sector 0 is turned off (S103) What the steps above bring about is summarized as follows: the write-protect flag WPF is turned on for any checked-out content data as long as they are not to be edited. The flag WPF is turned off for the checked-out content data that have been edited and for all self-recorded content data, despite they edited Or not. With that taken into account, when the personal computer 1 requests a content ID of any content data item to be checked in from the recording/reproducing apparatus 20A in step F151 of FIG. 28 during the check-in session, the apparatus 20A in step F251 need only check whether the write-protect flag WPF (bit d1) is on in the track mode data in U-TOC sector 0 with respect to the target content data.

If the flag WPF is off for the content data item about which the content ID has been requested, the recording/reproducing apparatus 20A simply notifies the personal computer 1 that the check-in is impossible to accomplish. This eliminates the need for carrying out steps F253 and F152 of FIG. 28 in an ultimately wasteful manner, i.e., having the content ID reported and verified leading eventually to a check-in rejection. That is, steps F253 and F152 of FIG. 28 are performed solely with regard to unedited checked-out content data for content ID verification. The wasteful detour is thus averted, and the check-in communication session and the ID verification process are effected more efficiently than before.

Basically, the self-recorded content data remain freely editable. There are cases, however, tin which checked-out content data and self-recorded content data reside in mixed fashion on the Mini-disc 100 and in which it is desired to restrict free editing of the self-recorded content data as well. For example, it may be desired to manage content data held on the Mini-disc 100 by use of an application program running on the personal computer 1. Such restrictive editing of the self-recorded content data is implemented by the inventive system using an exclusive login control command of FIG. 24 and an exclusive logout control command of FIG. 25. These commands allow the personal computer 1 to effect exclusive control over the recording/reproducing apparatus 20A.

When the personal computer 1 transmits the exclusive login control command of FIG. 24 to the recording/reproducing apparatus 20A, the system control unit 32 enters edit inhibition/restriction mode depending on the value constituted by the "priority" data in the command. With this mode in effect, as shown in FIG. 34, editing of the self-recorded content as designated by the user is subject to inhibition or restriction (S107). To what extent the user-initiated operations (including power-on and disc ejection) is rejected is dependent on the value of the "priority" data in the exclusive login control command; the "priority" value establishes one of the control levels discussed earlier.

When the exclusive logout control command is transmitted, the inhibition or restriction imposed so far on editing is lifted. This allows the self-recorded content data to become again editable (S107 to S106).

As described, the exclusive login control command affords the personal computer 1 exclusive control over the recording/reproducing apparatus 20A. Editing controlled at the discretion of the system allows the system to operate in a manner more convenient than ever.

14. Accounting Information Processing

Figure 36:
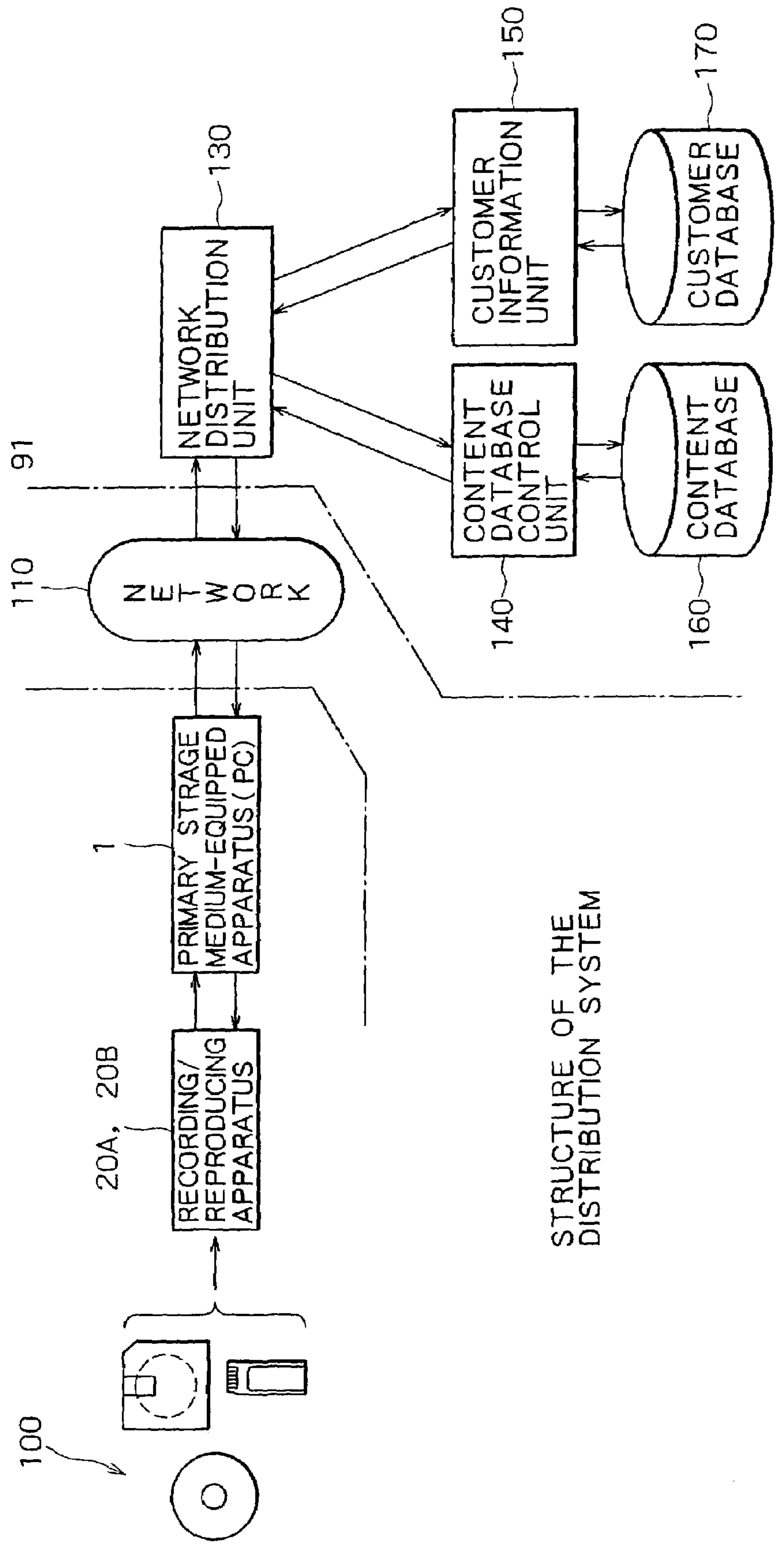
FIG. 36 is an explanatory view of an accounting management system for use with the embodiment.

How the inventive system processes accounting information will now be described. FIG. 36 depicts a typical system structure for carrying out accounting processing with regard to distributed content data. This system structure is the same as that in FIG. 4, except that the content server 91 is shown more detailed in its structure.

As discussed above, the inventive system is capable of downloading content data such as pieces of music from the content server 91 to the primary storage medium (HDD 5) and of checking out the downloaded data to the secondary storage medium (Mini-disc 100). The content server 91 may offer content data as a fee-based service.

The content server 91 is run by an organization or by an individual implementing a content-offering service. Basically, the content server 91 comprises three functions: a content retaining function that accumulates diverse kinds of content data; a content providing function that provides retained content data to the personal computer 1 through a communication link over the network 110; and an accounting function that manages accounting information about the users receiving the content data. These functions may be run as a whole by a single organization, a single company or the like. Alternatively, the functions may be managed separately by different organs, firms or individuals in a well-coordinated fashion. For example, the functions may each be run as a website on the Internet and may be coordinated through links.

The Mini-disc 100 and memory card furnished on the user's side were described above as the secondary storage medium on which to record content data eventually. The secondary storage medium has prepaid information, to be described later, recorded thereon in an unwritable manner. The content server 91 receives the prepaid information from the secondary storage medium when processing accounting information on individual users.

The content server 91 is made up of a network distribution unit 130, a content database control unit 140, a customer information unit 150, a content database 160, and a customer database 170. The network distribution unit 130 implements the content offering function whereby retained content data are distributed to the personal computer 1 or the like over the network 110. The content database control unit 140 and content database 160 bring about the content retaining function whereby diverse kinds of content data are stored. The customer information unit 150 and customer database 170 realize the accounting function for effecting accounting management on users who receive the distributed content data.

The content database 160, constituted illustratively by such storage media as hard discs or optical discs, stores large quantities of data such as music content data in a music library format ready for distribution to users. The content database control unit 140 causes the content database 160 to record, retrieve or otherwise control content data. For example, given a request from the network distribution unit 130, the content database control unit 140 causes the content database 160 to retrieve the requested content data and forward the retrieved data to the network distribution unit 130.

The customer database 170, constituted illustratively by such storage media as hard discs or optical discs, has accounting information registered therein corresponding to the prepaid information recorded on individual secondary storage media 100. The customer information unit 150 causes the customer database 170 to register and retrieve accounting information. For example, given a request from the network distribution unit 130, the customer information unit 150 causes the customer database 170 to newly register accounting information therein or to retrieve specific accounting information therefrom and supply the retrieved information to the network distribution unit 130.

As mentioned above, these components of the content server 91 may be run either by a single organization, company or individual; or may be managed separately by different entities. For example, the network distribution unit 130 may be run by a distribution service company, the content database control unit 140 and content database 160 by a record company or a record label company, and the customer information unit 150 and customer database 170 by an accounting service firm. Alternatively, multiple content database control units 140 and content databases 160 may be established, with the network distribution unit 130 working to distribute content data derived from any of these content databases 160.

In the inventive system of the above setup, the personal computer 1 communicates with the content server 91 and receives a list (menu) of available content data from the server 91. Given the list, the user performs necessary operations to select a desired content data item. In turn, the content server 91 transmits the selected content data item to the personal computer 1. The user gets the received content data recorded to the secondary storage medium 100 through the check-out session discussed above. This allows the user to obtain, say, a desired piece of music.

Charges for the content data item thus obtained are processed using the prepaid information retrieved from the secondary storage medium 100. As will be described later in more detail, each different secondary storage medium 100 contains a unique medium ID and a prepaid amount constituting part of the prepaid information.

The personal computer 1 receives the prepaid information from the recording/reproducing apparatus 20A (20B) and sends the information to the content server 91. The network distribution unit 130 causes the customer database 170 to effect accounting processing based on the prepaid information received. Broadly speaking, the customer database 170 has accounting information registered therein with regard to the prepaid information written on individual secondary storage media 100. When a given content data item is distributed to a specific secondary storage medium, the prepaid amount within the prepaid information on that medium is decremented by a predetermined value in consideration of the distributed item. That is, the distributed content data item is paid for by updating the applicable accounting information in the customer database 170. No update is made on the prepaid information written on the secondary storage medium 100.

The customer database 170 accommodates accounting information in a manner shown in FIG. 37. The accounting information refers to groups of data items, each group corresponding to a single piece of prepaid information (regarding each secondary storage medium 100). Illustratively, one piece of accounting information is made up of a medium ID, a remaining amount, and a purchase history FIG. 37 shows registered accounting information items K1 through K5 each corresponding to medium IDs ID1 through ID5 respectively.

Medium IDs included in the accounting information correspond to those within the prepaid information, as will be described later. The remaining amount represents the current remainder of the prepaid amount and is decremented by a fee paid for each content data item purchased. The purchase history is composed of such past records as the date and time of a purchase, name of the content data purchased, amount paid for the content data, and ID of a terminal used for the purchase. In other words, the purchase history constitutes information about the circumstances under which purchases were made.

The accounting information may also include diverse kinds of items such as the initial amount prepaid, type of the medium used, name of the medium vendor, and name of the copyright holder to the content data purchased. Alternatively, the purchase history may be omitted altogether. For content data distribution by the inventive system, the accounting information should at least include medium IDs and remaining amounts; inclusion of the other items of the information may be determined from a system performance point of view and in accordance with the service offerings in effect.

Figure 38:
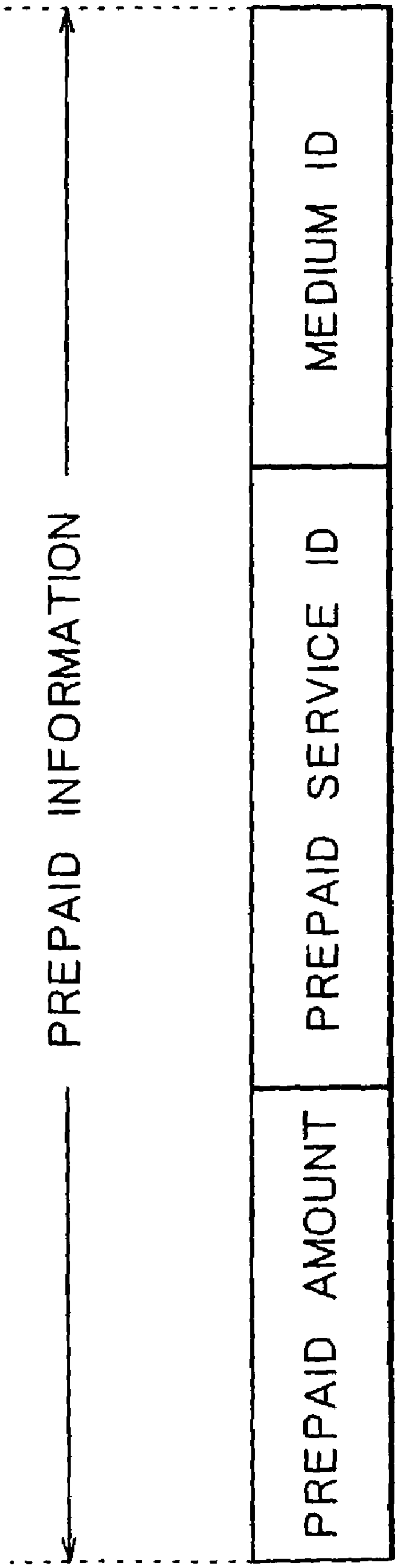
FIG. 38 is an explanatory view of prepaid information for use by the embodiment.

The prepaid information, recorded unchangeably on the secondary storage medium 100, is constituted basically by a prepaid amount, a prepaid service ID, and a medium ID for each item, as shown in FIG. 38. The prepaid amount stands for the amount the user has paid in advance. While the secondary storage medium 100 is marketed as an unused Mini-disc or a blank memory card, i.e., with nothing recorded thereon, its price nevertheless includes the prepaid amount. For example, if a blank secondary storage medium 100 usually selling for ¥500 carries a prepaid amount of ¥5,000, then the medium is purchased by the user basically for ¥5,500. Obviously the price of such a medium 100 may be varied at the discretion of the vendor; it may sell for ¥5,000 with the medium itself offered free of charge, or it may sell at a markdown price of ¥4,800. In any case, the user who bought the secondary storage medium 100 carrying the prepaid amount of ¥5,000 has paid the indicated nominal amount that may be used for the content distribution service offered by the distribution system of the invention.

The prepaid service ID denotes the address of the content server 91 that offers the content distribution service. The address is illustratively that which is used to establish communication with the network distribution unit 130 over the network 110, such as an IP address over the Internet.

Upon receipt of the prepaid information from the secondary storage medium 100 loaded in the recording/reproducing apparatus 20A, the personal computer 1 gains access to the content server 91 for communication based on the prepaid service ID in the information.

Depending on the structure of the content server 91, the prepaid service ID may be the address of the content database control unit 140 or that of the customer information unit 150 instead of the address of the network distribution unit 130. For example, suppose that the network distribution unit 130, content database control unit 140 and customer information unit 150 have their Web pages established and linked over the Internet. In that case, the prepaid service ID may be the address of the content database control unit 140, allowing the personal computer 1 to access the unit 140 for communication. Depending on how far the data distribution process has progressed, the customer information unit 150 may be linked to the current setup, with the network distribution unit 130 acting to control all connected units in a unified manner.

As another alternative, the prepaid service ID may be the address of the customer information unit 150, allowing the personal computer 1 to gain access to the unit 150 for communication. In this case, depending on the progress of the data distribution process, the content database control unit 140 may be linked to the current setup, with the network distribution unit 130 working to control all connected units in unified fashion.

The medium ID is a unique identification number attached to each individual secondary storage medium 100. For example, if a user purchases two secondary storage media 100 as prepaid media, the two media 100 still carry a different medium ID each.

The prepaid information may illustratively have eight bits assigned to the prepaid amount, 22 to 32 bits to the prepaid service ID, and 32 to 40 bits to the medium ID. Such bit counts may be determined from a prepaid system design point of view. The prepaid service ID may be assigned a sufficient number of bits for designating server addresses. The medium ID may be assigned a number of bits large enough to allocate unique ID numbers to the expected total number of prepaid media to be marketed from now on. At least one byte (8 bits) should preferably be assigned to the prepaid amount, three or four bytes to the prepaid service ID, and three or four bytes to the medium ID in a data format of eight bytes or thereabout.

What follows is a description of relations between the prepaid information written on the secondary storage medium 100 and the accounting information shown in FIG. 37. Suppose that the user purchases a secondary storage medium 100 having a medium ID of ID1 and a prepaid amount of ¥5,000 and starts using the medium 100. When the secondary storage medium 100 is used for the first time, on the side of the content server 91, accounting information K1 shown in FIG. 37 is registered to the customer database 170. The medium ID and the remaining amount registered at this point are the same as those initially held in the prepaid information. More specifically, the accounting information K1 is currently composed of the medium ID of ID1 and the remaining amount of ¥5,000.

When a content data item is subsequently downloaded (i.e., checked out) to the secondary storage medium 100, the fee for the content data item is subtracted from the remaining amount in the accounting information K1. That is, every time a content data item is downloaded (checked out), the medium ID in the prepaid information on the currently loaded secondary storage medium 100 is used as a basis for accessing the corresponding accounting information in the customer database 170, and the remaining amount is reduced by the fee for the downloaded item in the accounting information. For example, the remaining amount of ¥3,700 in the accounting information K1 of FIG. 37 signifies that a content data item priced at ¥1,300 was purchased and downloaded to the secondary storage medium 100 having the medium ID of ID1, the purchased amount being reduced from the initial prepaid amount.

Under the accounting processing scheme described above, the prepaid information on the user-owned secondary storage medium 100 is never updated. In other words, the prepaid information need only be written unchangeably on the secondary storage medium 100. Unlike conventional setups where prepaid information can be updated on the secondary storage medium 100, the inventive scheme with its unchangeable prepaid information on the marketed media prevents abuses of the service by falsification of prepaid amounts or medium IDs and thereby forestalls system malfunction attributable to the tampering of prepaid service IDs.

There are three major ways to render the eight-byte prepaid information unchangeable on the Mini-disc used as the secondary storage medium 100:

(1) Record the prepaid information within the P-TOC.

(2) Record the prepaid information in a manner making the information immune to updates in the U-TOC.

(3) Record the prepaid information in a way making the information unchangeable within the management area outside the U-TOC.

If the prepaid information is to be recorded in the P-TOC, a suitable eight-byte area may be allocated illustratively in the P-TOC sectors of the lead-in area shown in FIG. 9A. The allocated area may be used to accommodate the prepaid information.

If the prepaid information is to be recorded in the U-TOC, it is possible, for example, to utilize unused regions in the already formatted sectors 0, 1, 2, 3, and 4. As another alternative, unformatted sectors may be employed so as to eliminate the possibility of the prepaid information getting tampered with.

Illustratively, an eight-byte area in U-TOC sector 5 may be set aside as a prepaid information recording area. In this case, a bit representing the sector use status (i.e., "used sectors" bit) is set to 0, which indicates that the sector is not used and thereby renders the prepaid information immune to updates. The bit designation causes ordinary Mini-disc players to recognize that U-TOC sector 5 is an unused sector. This prevents any updates from being made on U-TOC sector 5, whereby the prepaid information is kept unchangeable on the side of users. The recording/reproducing apparatus 20A of this invention retrieves the prepaid information by reading U-TOC sector 5 using a special application program for prepaid information retrieval. Obviously, sector 5 may be replaced by sector 6, 7, or any other sector for accommodating the prepaid information.

If the prepaid information is to be recorded in the management area shown in FIG. 9B but outside the U-TOC, then sectors such as those shown shaded PD in the figure in an unused cluster may be utilized to accommodate the information. The management area includes the power calibration area PCA and U-TOC area. The locations of these areas are indicated by the P-TOC in the manner described above. Referencing the P-TOC thus allows ordinary Mini-disc recorders to access the power calibration area PCA and U-TOC area. In contract, the shaded area PD not indicated by the P-TOC cannot be accessed by ordinary Mini-disc recorders (i.e., the area is regarded as insignificant if accessed). That means the prepaid information written in the shaded area PD cannot be updated by the user.

Using a specific application program for prepaid information retrieval, the recording/reproducing apparatus 20A of this distribution system can read the prepaid information from the shaded area PD whose location is suitably identified in advance. Illustratively, the starting location of the shaded area PD may be defined by the start address of the U-TOC (indicated in P-TOC) supplemented with a predetermined offset. This allows a recording unit of the apparatus to read the prepaid information. For example, because the U-TOC is recorded over three clusters, the location obtained by adding five clusters to a U-TOC start address USTA may be established as the starting location of the prepaid information recording area.

In the manner described, the Mini-disc may be utilized as a prepaid medium 4. As the prepaid storage medium, the Mini-disc may be replaced by any other suitable media including memory cards and optical discs such as CD-Rs, CD-RWs and DVDs. In any of these alternative media, the recording location of prepaid information having a data size of eight bytes or more may be determined in keeping with a data management format specific to each of the media in use.

Where the above-described type of data distribution system utilizing prepaid information is to be set up, the personal computer 1 needs to retrieve the prepaid information from the secondary storage medium (Mini-disc 100) loaded in the recording/reproducing apparatus 20A. When making a request for the prepaid information from the apparatus 20A, the personal computer 1 designates the request in the "subfunction" data in the check-in control command discussed earlier with reference to FIGS. 21 and 22. The apparatus 20A utilizes the check-in response command of FIG. 23 when reporting the prepaid information on the Mini-disc 100 loaded therein to the personal computer 1.

Figure 35:
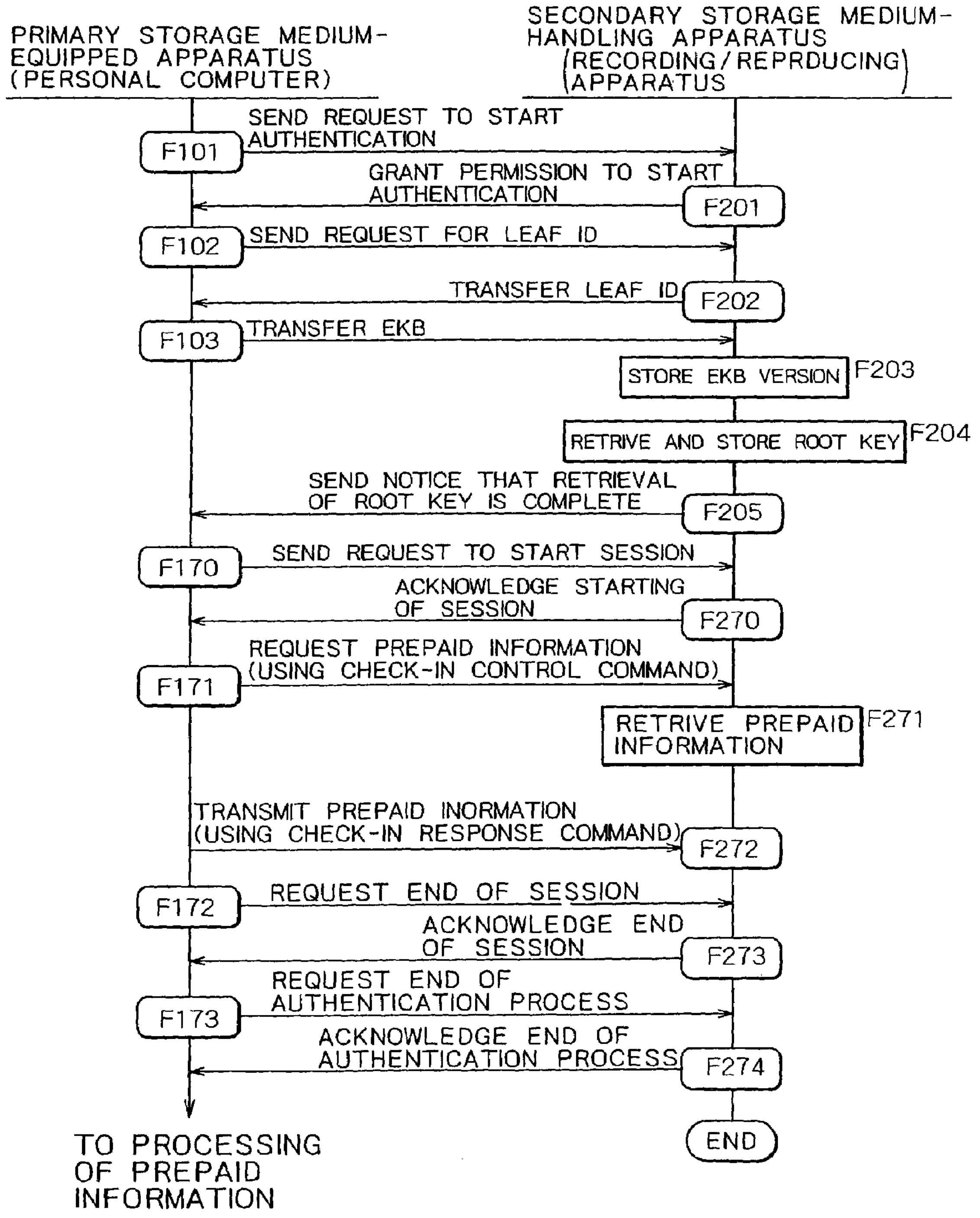
FIG. 35 is a flowchart of steps for retrieval of accounting information by the embodiment.

FIG. 35 outlines steps for processing prepaid information. In FIG. 35, the control steps carried out by the CPU 2 of the personal computer 1 are represented by reference numerals F101 through F173, and the steps executed by the system control unit 32, MD control unit 21, etc., of the recording/reproducing apparatus 20A are denoted by reference numerals F201 through F274. The communication session is effected using various control commands and response commands issued in response to the control commands.

During the session, the start of an authentication process, EKB transfer, and root key retrieval are carried out in the same manner as during the check-out explained earlier. That is, steps F101 through F103 and F201 through F205 in FIG. 35 are the same as those in FIGS. 26 and 28 and represent the same processes that will not be described further.

In step F170, the personal computer 1 transmits a control command requesting start of the session to the recording/reproducing apparatus 20A. In step F270, the apparatus 20A returns a response command to the personal computer 1. At this point, the authentication process discussed above with reference to FIG. 12 is carried out likewise.

With the session started and with the recording/reproducing apparatus 20A duly authenticated, the personal computer 1 reaches step F171 and requests prepaid information. That is, the PC transmits the check-in control command described with reference to FIG. 20. In this command, the "subfunction" data denote neither "00h" nor "01h"; the data represent some other value requesting the prepaid information (see FIG, 21).

Upon receipt of the check-in control command, the recording/reproducing apparatus 20A reads the prepaid information in step F271 from an area allocated specifically on the Mini-disc 100. In step F272, the apparatus 20A sets the retrieved prepaid information of, say, eight bytes into the check-in response command as shown in FIG. 23 and sends the command back to the personal computer 1.

On receiving the prepaid information in the check-in response command, the personal computer 1 transmits in step F172 a control command requesting an end of the session to the recording/reproducing apparatus 20A. In step F273, the apparatus 20A sends to the personal computer 1 a response command acknowledging the end of the session. In step F173, the personal computer 1 transmits to the apparatus 20A a control command terminating the authentication process. In step F274, the apparatus 20A returns a response command acknowledging the end of the authentication process. This completes the whole series of communication steps for prepaid information transfer.

Thereafter, the personal computer 1 causes the communication unit 8 to connect to the content server 91 over the network 110 and proceeds to transfer the prepaid information received to the content server 91. When the prepaid information is sent to the content server 91 along with identification information about the content data checked out to the secondary storage medium 100, the server 91 executes accounting processing about the applicable user, i.e., the server 91 makes relevant updates in the database of FIG. 37.

The accounting processing of the inventive system based on prepaid information is thus implemented by the personal computer 1 requesting the recording/reproducing apparatus 20A to transfer prepaid information specific to the secondary storage medium 100 loaded therein.

Although the personal computer 1 was shown acquiring the prepaid information as unique information from the secondary storage medium 100, this is not limitative of the invention. Alternatively, control and response command settings may be arranged appropriately so as to obtain various kinds of specific information. For example, other unique information written on the secondary storage medium 100, such as the use status of the user and the user ID, may be obtained by the personal computer 1 in order to manage the storage medium 100. Such unique information, when transmitted to the content server 91, may be utilized by the server 91 in offering various services to the users or implementing diverse control measures.

The embodiments and examples above have been discussed only for purposes of illustration and are not limitative of the invention. Other variations and modifications of the invention may be conceived and practiced without departing from the spirit and scope of this invention, covering such aspects of system operation as encryption, data paths, check-out/check-in sessions, authentication, content ID generation, content ID management, write control flag arrangements, edit management, and prepaid information.

The SDMI content data are not the only data that may be transferred from the primary storage medium to the secondary storage medium by the inventive system. Other kinds of content data may also be handled in like manner by the system. The primary storage medium is not limited to the HDD but may be practiced by any other suitable devices or elements. The secondary storage medium is not limited to the Mini-disc, nor is the secondary storage medium-handling apparatus 20A limited to the Mini-disc recording apparatus. Illustratively, the secondary storage medium 100 may be any one of CD-Rs, CD-RWs, DVD-RAMs, DVD-Rs, DVD-RWs, and memory cards. Accordingly, the secondary storage medium-handling apparatus 20A may be any recording device compatible with such media. The invention may also be applied to the SDMI-compliant recording/reproducing apparatus 20B discussed above. That is, the process of transferring content data to the apparatus 20B is suitably managed using the inventive measures.

According to the invention, as described, the data transfer apparatus (i.e., primary storage medium-equipped apparatus) manages the transfer rights of stored content data while further managing the transfer rights of given content data transferred to the data recording apparatus (i.e., secondary storage medium-handling apparatus) through generation of table data associating a first content identifier corresponding to the transferred content data with a second content identifier transmitted from the data recording apparatus.

That is, even if no content identifier (content ID) can be recorded on the secondary storage medium, the content ID (second content identifier) generated by the secondary storage medium-handling apparatus is used to identify the content data on the secondary storage medium in association with the content ID (first content identifier) retained by the primary storage medium-equipped apparatus. This feature provides a setup conducive to effecting appropriate copyright management during check-out and check-in sessions based on content IDs. In other words, where unencrypted content data are copied to or reproduced from the SDMI-noncompliant secondary storage medium, copyright management is properly carried out while the convenience on the user's side is ensured.

As described, the data recording apparatus for writing and reading data to and from the secondary storage medium extracts part of unencrypted content data in order to generate the second content identifier through computations based on the extracted data. This makes it possible to generate a content ID unique to each content data item being handled.

In particular, sampling points are set on each content data item in a predetermined manner based on its data length. Because part of the content data is extracted from the well-defined sampling points of each data item, the unique content ID derived from the sampled data remains the same at all times. That is, a specific second content identifier is made available steadily from the content data on the secondary storage medium without having to get that identifier stored on that medium. The identifier thus generated is particularly advantageous for use in copyright management.

At least one and preferably a plurality of sampling points are set anywhere on each content data item except the beginning and the end of the data item in question. The beginning and the end of each content data item are avoided in view of the fact that these portions, especially of audio content data, tend to comprise soundless data. The remaining portions of the content data are almost always different from one data item to another and are thus suitable as a basis for data item identification.

When content data coming from the data transfer apparatus are recorded to the secondary storage medium, the data recording apparatus writes to the secondary storage medium control flag information indicating that the content data in question have been transferred from the data transfer apparatus. The data recording apparatus further inhibits or restricts editing of the content data recorded on the secondary storage medium depending on the presence or absence of the control flag information corresponding to the recorded content data. These measures make it possible to protect checked-out content data held on the secondary storage medium against any attempt at editing. When the checked-out content data remain unedited, it facilitates verification of the data identify upon check-in (i.e., return of reproduction rights) by keeping unchanged the second content identifier derived from the content data. With the check-out and check-in sessions thus performed without unpredictability, the consistency of system operation is guaranteed.

When the data transfer apparatus issues a command (check-in command) to cancel reproduction rights of given content data recorded on the secondary storage medium, the data recording apparatus checks for the presence or absence of the control flag information about the content data in question, before determining whether or not to comply with the cancel command. The control flag information is cleared if the applicable content data have been edited. Because the presence or absence of the control flag information indicates whether editing has been done on the content data of interest, it is very easy to determine whether the content data item can be checked in, and the time required for the check-in session is shorted appreciably. Illustratively, there is no need to compute a content identifier based on retrieved data from the disc and to have the data transfer apparatus ascertain the viability of the check-in session accordingly.

If there exists control flag information, the corresponding content data need not be totally inhibited from getting edited but may be allowed to be edited in a suitably limited manner. For example, it is possible to permit the checked-out content data to be edited following issuance of an appropriate warning. This enables the user who specifically wants to edit certain content data to do so after being properly warned. Illustratively, if the user has no wish to check in a given content data item from now on, that content data item may be edited by the user after acknowledgement of the inability to check in the data as warned. This feature enhances the convenience on the user's part.

When a command for either inhibiting or restricting editing of any content data recorded on the secondary storage medium is transmitted to the data recording apparatus by the data transfer apparatus, editing by the data recording apparatus of the content data recorded on the secondary storage medium becomes controllable by the data transfer apparatus. That means not only the checked-out content data but also other content data recorded separately on the secondary storage medium may be subjected to inhibition or restriction of editing. Where the data recording apparatus (with its secondary storage medium) functions as a system component, this feature ensures the consistency of system operation by restricting or inhibiting unrestrained editing of data recorded on the medium.

When a command for canceling either inhibition or restriction of editing of the content data recorded on the secondary storage medium is transmitted to the data recording apparatus by the data recording apparatus, it is possible to cancel the inhibition or the restriction of editing by the data recording apparatus of the content data written on the secondary storage medium. Canceling all restrictions on editing makes it possible to let the data recording apparatus (with its secondary storage medium) function as a stand-alone device when so desired.

As many apparently different embodiments of this invention may be made without departing from the spirit and scope thereof, it is to be understood that the invention is not limited to the specific embodiments thereof except as defined in the appended claims.

What is claimed is:

1. A data recording apparatus for selectively receiving either first content data which are encrypted or second content data which are unencrypted, the received data being recorded to a storage medium, said data recording apparatus comprising:

first receiving means for receiving the encrypted first content data;

second receiving means for receiving the unencrypted second content data;

decrypting means for decrypting said encrypted first content data received by said first receiving means;

recording means for selectively recording either said first content data, in a decrypted state, decrypted by said decrypting means or said second content data received by said second receiving means to said storage medium, said recording means further recording an identifier to said storage medium, said identifier indicating a write protect status identifying a recorded content data as being either the decrypted first content data or said second content data received by said second receiving means; and controlling means for, when given a command for editing the content data recorded in said storage medium, either permitting or inhibiting editing of the recorded content data in accordance with said identifier recorded in said storage medium.

2. A data recording apparatus according to claim 1, wherein the editing command designates at least one of a dividing operation, a combining operation, and an erasing operation on the recorded content data.

3. A data recording apparatus connected via a communication line to a data transfer apparatus equipped with a primary storage medium accommodating first content data which is encrypted, said data recording apparatus exchanging the encrypted first content data with said data transfer apparatus over said communication line, said data recording apparatus comprising:

first receiving means for receiving said encrypted first content data transferred over said communication line from said data transfer apparatus;

second receiving means for receiving second content data which are unencrypted;

decrypting means for decrypting said encrypted first content data received by said first receiving means;

recording means for selectively recording either said first content data, in a decrypted state, decrypted by said decrypting means or said second content data received by said second receiving means to a storage medium, said recording means further recording a first identifier to said storage medium, said first identifier indicating a write protect status identifying a recorded content data as being either the decrypted first content data or said second content data received by said second receiving means;

identifier generating means for generating a second identifier based on part of said encrypted first content data; and transmitting means for transmitting said second identifier generated by said identifier generating means to said data transfer apparatus over said communication line.

4. A data recording apparatus according to claim 3, wherein said communication line is a universal serial bus.

5. A data recording apparatus according to claim 3, further comprising:

controlling means for, when given a command for editing the content data recorded in said storage medium, either permitting or inhibiting editing of the recorded content data in accordance with said first identifier recorded in said storage medium.

6. A data recording apparatus according to claim 5, further comprising:

judging means for, when given a command for editing the content data recorded in said storage medium, judging whether the content data to be edited are said first content data or said second content data based on said first identifier recorded in said storage medium; and announcing means for, if said content data to be edited are judged to be said first content data by said judging means, announcing that return of said first content data to said data transfer apparatus will become impossible following said editing.

7. A data recording apparatus according to claim 6, wherein, if a user persists in executing the editing command following the announcement by said announcing means, then said controlling means permits editing of said first content data and changes accordingly said first identifier corresponding to the edited first content data.

8. A data recording apparatus connected via a communication line to a data transfer apparatus equipped with a primary storage medium accommodating first content data which are encrypted, said data recording apparatus exchanging the encrypted first content data with said data transfer apparatus over said communication line, said data recording apparatus comprising:

first receiving means for receiving said encrypted first content data transferred over said communication line from said data transfer apparatus;

second receiving means for receiving second content data which are unencrypted;

decrypting means for decrypting said encrypted first content data received by said first receiving means;

recording means for selectively recording either said first content data, in a decrypted state, decrypted by said decrypting means or said second content data received by said second receiving means to a storage medium, said recording means further recording a first identifier to said storage medium, said first identifier indicating a write protect status identifying either the decrypted first content data recorded in said storage medium or said second content data received by said second receiving means;

identifier generating means for generating a second identifier based on part of said encrypted first content data;

transmitting means for transmitting said second identifier generated by said identifier generating means to said data transfer apparatus over said communication line;

changing means for, if said decrypted first content data recorded in said storage medium have been edited, changing said first identifier recorded in said storage medium; and controlling means for, if said decrypted first content data recorded in said storage medium are to be returned to said data transfer apparatus, either permitting or inhibiting said return of said decrypted first content data depending on a result of matching between said second identifier held by said data transfer apparatus and said second identifier held by said data recording means; wherein, if said decrypted first content data to be returned are judged to have been edited, then said controlling means either permits or inhibits said return of said first content data not in accordance with said result of said matching but in keeping with said first identifier recorded in said storage medium.

9. A data recording apparatus according to claim 8, wherein the editing refers to at least one of a dividing operation, a combining operation, and an erasing operation on the recorded content data.

10. A data recording apparatus according to claim 8, wherein said communication line is a universal serial bus.

11. A data transfer apparatus connected via a communication line to a data recording apparatus for selectively receiving either first content data which are encrypted or second content data which are unencrypted, said data transfer apparatus exchanging the encrypted first content data with said data recording apparatus over said communication line, said data transfer apparatus comprising:

first memory means for storing said encrypted first content data;

transmitting means for transmitting said encrypted first content data from said first memory means to said data recording apparatus over said communication line;

receiving means for receiving at least either a content identifier, indicating a write protect status, transmitted from said data recording apparatus or said encrypted first content data returned from said data recording apparatus;

second memory means for storing said content identifier received by said receiving means;

matching means for causing said receiving means to receive said content identifier corresponding to said encrypted first content data when said encrypted first content data are returned from said data recording apparatus, said matching means further matching the received content identifier against said content identifier stored in said second memory means; and controlling means for either permitting or inhibiting said return of said encrypted first content data from said data recording apparatus depending on a result of the matching.

12. A data transfer system comprising:

a data transfer apparatus including first memory means for storing first content data which are encrypted, and transmitting means for transmitting the encrypted first content data from said first memory means; and a data recording apparatus comprising:

first receiving means for receiving said encrypted first content data transmitted by said transmitting means of said data transfer apparatus;

decrypting means for decrypting said encrypted first content data received by said receiving means;

second receiving means for receiving second content data which are unencrypted; and recording means for selectively recording either said first content data, in a decrypted state, decrypted by said decrypting means or the unencrypted second content data received by said second receiving means to a storage medium, said recording means further recording to said storage medium an identifier, indicating a write protect status identifying either said first content data or said second content data;

wherein said data recording apparatus further comprises:

content identifier generating means for generating a content identifier based on part of the decrypted first content data recorded in said program area of said storage medium; and transmitting means for transmitting to said data transfer apparatus said content identifier generated by said content identifier generating means; and wherein said data transfer apparatus further comprises:

second memory means for storing said content identifier transmitted by said transmitting means of said data recording apparatus;

receiving means for, when said decrypted first content data are to be returned from said storage medium of said data recording apparatus to said data transfer apparatus, receiving the content identifier corresponding to said first content data to be returned;

matching means for matching said content identifier received by said receiving means against said content identifier stored in said second memory means; and controlling means for either permitting or inhibiting said return of said first content data from said data recording apparatus depending on a result of the matching by said matching means.

13. A data transfer system according to claim 12, wherein said data recording apparatus further comprises:

controlling means for, when given a command for editing the content data recorded in said storage medium, either permitting or inhibiting editing of the recorded content data in accordance with said identifier recorded in said storage medium, said identifier identifying either said first content data or said second content data.

14. A data transfer system according to claim 12, wherein said data recording apparatus further comprises:

judging means for when given a command for editing the content data recorded in said storage medium, judging whether the content data to be edited are said first content data or said second content data based on said identifier recorded in said storage medium, said identifier identifying either said first content data or said second content data; and announcing means for, if said content data to be edited are judged to be said first content data by said judging means, announcing that return of said first content data to said data transfer apparatus will become impossible following said editing.

15. A data transfer system according to claim 14, wherein, if a user persists in executing the editing command following the announcement by said announcing means, then said controlling means permits editing of said first content data and changes accordingly said first identifier corresponding to the edited first content data.

16. A data transfer system according to claim 13, wherein the editing command designates at least one of a dividing operation, a combining operation, and an erasing operation on the recorded content data.

17. A data transfer system according to claim 14, wherein the editing command designates at least one of a dividing operation, a combining operation, and an erasing operation on the recorded content data.

18. A data transfer system according to claim 12, wherein, if said decrypted first content data recorded in said storage medium are to be returned to said data transfer apparatus, then said controlling means either permits or inhibits said return of said decrypted first content data depending on a result of the matching by said matching means; and wherein, if said decrypted first content data to be returned are judged to have been edited, then said controlling means either permits or inhibits said return of said first content data not in accordance with said result of said matching but in keeping with said identifier recorded in said storage medium.

19. An edit controlling method for selectively receiving either first content data which are input encrypted upon transfer from a data transfer apparatus or second content data which are input unencrypted, in order to record the received data in an unencrypted state to a storage medium and recording an identifier, indicating a write protect status, corresponding to the recorded content data to said storage medium, said identifier identifying either said first content data or said second content data, whereby the content data recorded said storage medium are edited, said edit controlling method comprising the steps of:

reproducing said identifier identifying either said first content data or said second content data;

judging, when given a command for editing the recorded content data, whether the recorded content data are said first content data or said second content data in accordance with the reproduced identifier; and either inhibiting or restricting said editing if the content data to be edited in said storage medium are judged to be said first content data in said judging step.

20. An edit controlling method according to claim 19, wherein the editing command designates at least one of a dividing operation, a combining operation, and an erasing operation on the recorded content data.

21. An edit controlling method according to claim 19, further comprising the step of:

if the content data to be edited are judged to be said first content data in said judging step, then announcing that return of said first content data to said data transfer apparatus will become impossible following said editing.

22. An editing controlling method according to claim 21, further comprising the step of:

if a user persists In executing the editing command following the announcement in said announcing step, then permitting editing of said first content data while updating said storage medium in such a manner as to change said identifier corresponding to the edited first content data.

23. A data processing method for causing encrypted content data to be exchanged between a data transfer apparatus and a data recording apparatus over a communication line which connects the two apparatuses, said data processing method comprising the steps of:

causing, when said data transfer apparatus transmits said encrypted content data to said data recording apparatus, said data transfer apparatus to receive a content identifier, indicating a write protect status, generated by and transferred from said data recording apparatus;

storing the received content identifier into a memory;

judging, when said data recording apparatus is to return said encrypted content data to said data transfer apparatus, whether or not said encrypted content data to be returned have been edited;

inhibiting the return of said encrypted content data, if said encrypted content data are judged to have been edited in said judging step;

matching the content identifier corresponding to said encrypted content data to be returned against the content identifier stored in said memory if said encrypted content data are not judged to have been edited in said judging step; and permitting the return of said encrypted content data, if the matching in said matching step reveals a match.

* * * * *

UNITED STATES PATENT AND TRADEMARK OFFICE

CERTIFICATE OF CORRECTION

PATENT NO. : 7,191,346 B2
APPLICATION NO. : 10/167923
DATED : March 13, 2007
INVENTOR(S) : Miki Abe et al.

It is certified that error appears in the above-identified patent and that said Letters Patent is hereby corrected as shown below:

In claim 19, column 59, line 16, “recorded said” should read --recorded in said--.

In claim 22, column 60, line 3, “In” should read --in--.

Signed and Sealed this

Third Day of July, 2007

JON W. DUDAS
*Director of the United States Patent and Trademark Office*